US008578695B1

(12) United States Patent
Fluhler

(10) Patent No.: US 8,578,695 B1
(45) Date of Patent: Nov. 12, 2013

(54) METHODS AND DESIGNS FOR INCREASING EFFICIENCY IN ENGINES

(76) Inventor: Herbert U. Fluhler, Huntsville, AL (US)

( * ) Notice: Subject to any disclaimer, the term of this patent is extended or adjusted under 35 U.S.C. 154(b) by 811 days.

(21) Appl. No.: 12/398,182

(22) Filed: Mar. 5, 2009

Related U.S. Application Data

(60) Provisional application No. 61/190,982, filed on Sep. 4, 2008, provisional application No. 61/134,324, filed on Jul. 9, 2008, provisional application No. 61/068,074, filed on Mar. 4, 2008.

(51) Int. Cl.
*F02G 3/00* (2006.01)
*F02C 5/00* (2006.01)

(52) U.S. Cl.
USPC ............... 60/39.01; 60/39.6; 60/650; 60/660; 60/682

(58) Field of Classification Search
USPC ......... 60/39.01, 772, 773, 650, 660, 682–683
See application file for complete search history.

(56) References Cited

U.S. PATENT DOCUMENTS

| | | | | |
|---|---|---|---|---|
| 6,198,174 | B1 * | 3/2001 | Nims et al. | 290/52 |
| 6,202,782 | B1 * | 3/2001 | Hatanaka | 180/301 |
| 6,418,707 | B1 * | 7/2002 | Paul | 60/784 |
| 2001/0052228 | A1 * | 12/2001 | Rakhmailov | 60/39.02 |
| 2006/0248886 | A1 * | 11/2006 | Ma | 60/517 |

* cited by examiner

*Primary Examiner* — Hoang Nguyen
(74) *Attorney, Agent, or Firm* — Mark Clodfelter

(57) ABSTRACT

An efficient thermal engine is disclosed. In some embodiments, a remainder of energy remaining after an expansion cycle is used to power a subsequent compression cycle. In other embodiments, novel configurations for a larger expansion volume than compression volume are provided. In addition, work of compression may be reduced in a compression cycle, and recovered in an expansion cycle.

19 Claims, 40 Drawing Sheets

Conventional Otto/Diesel

Otto Cycle

Diesel Cycle

| | |
|---|---|
| Brayton | 1-2-5-6-1 |
| Humpnrey | 1-2-3-4-1 |

IMPROVEMENT OF THERMAL EFFICIENCY

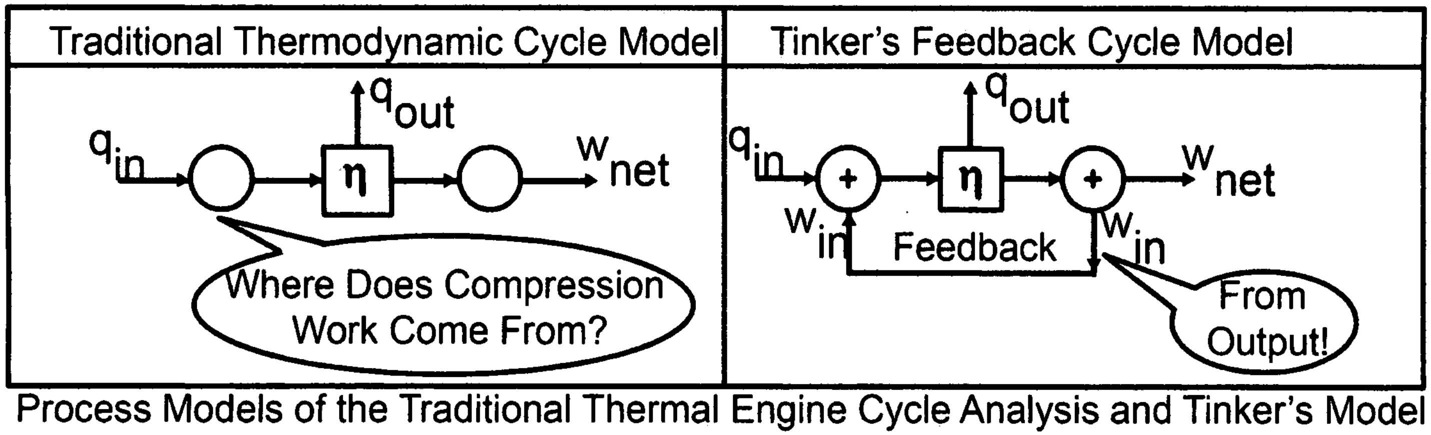

Process Models of the Traditional Thermal Engine Cycle Analysis and Tinker's Model

FIG. 11a

| Traditional Efficiency Equation | Tinker's Efficiency Equation |
| --- | --- |
| $\eta = \frac{w_{net}}{q_{in}} = \frac{q_{in}-q_{out}}{q_{in}} = 1-\frac{q_{out}}{q_{in}}$ | $\eta=\left(\frac{q_{in}-q_{out}\ w_{in}}{2q_{in}}\right)\left(1\pm\sqrt{1-\frac{4w_{in}q_{in}}{(q_{in}-q_{out}+w_{in})^{2}}}\right)$ |

Comparison of Traditional/Conventional Efficiency Equation and Tinker's [1]

FIG. 11b

Example Trochoids

*Thermal to Mechanical Conversion Efficiency of New Engine.*

Change of Equation of State via Mechanical Means

Extremely Hgih Efficiency 4-Cycle, 7-Phase Engine

ENHANCE EXPANSION WITH TURBINES
(SHARED EXHAUST PORTS)

- Lower Efficiency Versus 1 Turbine per Exhaust Port due to loss of Enthalpy in Exhaust Channel between Exhaust Valve and Turbine
- But considerabe Cost Savings from Fewer Turbines and Power Capture Means

METHODS AND DESIGNS FOR INCREASING EFFICIENCY IN ENGINES

CROSS REFERENCE TO RELATED APPLICATIONS

This application claims the benefit of provisional application No. 61/068,074, filed Mar. 4, 2008, provisional application No. 61/134,324, filed Jul. 9, 2008, and provisional application No. 61/190,982, filed Sep. 4, 2008, these three provisional applications being each incorporated in their entirety by reference.

FIELD OF THE INVENTION

This application relates to thermal engine efficiency, and more particularly to methods and engine designs for increasing thermal engine efficiency significantly while also achieving or retaining other particular desirable attributes of such engines needed to meet their systems requirements and use imposed constraints.

BACKGROUND OF THE INVENTION

The prior art to the current invention is embodied in particular by one recent published paper by Tinker, "Occult Parasitic Energy Loss in Heat Engines", Frank A. Tinker, International Journal of Energy Research, 2007:31, 1441-1453 [1], U.S. Pat. No. 7,441,530 to Tinker [2], and US patent publication 2007/0227347, also to Tinker [3]. This paper by Tinker and his two patent publications are incorporated in their entirety by reference. The prior art on thermal engines is immense, but a subset most pertinent to the current disclosures is presented in the listing of prior art patents.

After decades of large research and engineering investments, thermal engines, to include Diesel engines, are indeed improved from their earlier designs. But the improvements in efficiency have been disappointing and are disproportionate to the large amounts of time, money and intellectual energy invested. It is this applicant's contention that achievement of significant further improvements in thermal engine efficiency will require abandonment of the conventional engine designs, most of which are today well over 100 years old. In their place we will develop new, creative and innovative solutions derived from new insights into the physics of thermal engines. Recent rises in oil prices make this the right time to examine radical departures from "old engine" technology.

Thermal engines are almost as old as the science of Thermodynamics itself. Yet, after well over at least 100 years of concerted effort, there are few (arguably none) thermal engines that even come close to approaching the theoretically possible thermal to mechanical conversion efficiency. With few (if any) exceptions, they almost all suffer from thermal efficiency that is markedly below that which should be theoretically obtainable from their specific power (heat) source.

In Tinker [1], a new thermodynamic theory of thermal engines is developed and proved with experimental data. The key element of Tinker's new discovery is that remarkably, the efficiency of the Carnot Cycle has been incorrectly derived by thousands of physicists for over a hundred years. It would seem that all before Tinker have ignored the rather obvious fact that the input work for each Carnot Cycle compression phase must come from "somewhere", and that "somewhere" must be from a portion of the engine's own output work in a prior expansion phase. Therefore the real available net output work is in reality less by an amount equal to the compression work. As can be easily appreciated, this then reduces the efficiency of the thermal engine from what might have been expected otherwise. Tinker's modified new theory correctly predicts a lower engine efficiency than other prior theories. Tinker's new theory also aligns almost perfectly with carefully conducted experiments whose data have long been in the literature. Practitioners have apparently ignored these data, or at least attributed their deviations from prediction to other possible effects, no doubt in part because such other theories did not predict these data until presented in Tinker [1] and further disclosed in Tinker [2] and to a lesser extent Tinker [3] which also presented the corrected new theory.

In Tinker [2], a means is proposed to improve the efficiency of thermal engines using his new theory. Although Tinker [2] also presents elements of the new theory for the efficiency of heat engines, its focus is on a mechanical addition that is claimed to improve the efficiency of the engine by recovering energy between cycles in the engine. The mechanical addition is claimed to neutralize the compressive force through the use of a conservative force, thereby driving the compressive work to zero and hence improving the efficiency of the engine significantly. But it is not at all clear (at least to this applicant) within the context of Tinker's new theory, how the patent of Tinker [2] is supposed to work. The claimed conservative force, while indeed reducing the compression work, must also of necessity (since it is conservative) reduce the output work by the same amount saved during compression in order to "recharge" the conservative force. In effect this is the same mechanism as the venerable flywheel, and only serves to keep the engine operating more smoothly and at lower rotation speeds. To the extent that the "conservative force" might implement a custom contoured compression pressure profile resulting in improved efficiency is also not at all clear (at least to this applicant) from Tinker [2].

In Tinker [3], again the concept of neutralizing the compressive work through a conservative force is promulgated. But this time the use of orthogonal pistons and cylinders held in a specifically defined geometry is proposed to produce the claimed conservative force that exactly balances the compressive force. Again, it is not at all clear how this scheme is supposed to work, for any force applied to counter the compression force must derive from an expansion force from an earlier or later cycle.

Given the points above, one is drawn to conclude that Tinker has made a very significant discovery, but despite Tinker [2], until more evidence to the contrary, this applicant fails to see how the scheme in Tinker [2] or Tinker [3] capitalizes on this new discovery visa vie a viable physically realizable thermal engine with significantly higher efficiency. It is therefore a first objective of the current invention to disclose pragmatic, realizable and significant improvements in thermal engines either enabled by and/or inspired by Tinker [1]. These improvements may be instantiated singly for modest improvements in efficiency, but preferably employed collectively or at least in subsets of cooperative improvements which introduce synergisms to improve the efficiency than beyond that of individual improvements alone or in few.

It is a second objective of the current invention to disclose a method for deriving the design of an optimally efficient engine based on the first principles efficiency equation given in Tinker [1], combined with the systems requirements and constraints of the engine under design. This is illustrated using the well-known Calculus and Spectral Signal Processing techniques such as the Fourier Transform. It is shown how the practitioner can use this method to derive a candidate instantiation mechanism for an engine that would meet a set of top level design requirements and constraints by transforming the thermodynamic design into a set of mechanical cycle bases, not unlike the way orthogonal functions such as Sines and Cosines can be combined in Fourier Series to produce desired functional forms. In a like manner, the volume for the mechanical operation of a thermodynamic cycle can be synthesized by the intelligent combination of basis cyclic mechanisms. The result is a basic design of the mechanism that will instantiate the volume profile for an optimally efficiency engine. That is, given a set of descriptive equations for a maximally efficient engine, the current invention quantitatively determines a mechanical mechanism that will instantiate these equations into a maximally efficient thermal engine embodiment. Through this method, the practitioner of engine design may enjoy a significantly streamlined design process that both encompasses all the multiple optimization criteria needed in modern engines (emissions constraints, temperature constraints, friction constraints, etc.) as well as the most straight forward mechanical embodiments for engines which meet these multiple criteria with maximal thermal efficiency and simplicity of mechanical design.

It is a third objective of the current invention is to use the enabling theory and insights of Tinker [1], the new improvements disclosed from the first objective, as well as the combination of these and other known improvements, and through the method of design illustrated after the second objective, to then develop and disclose some specific designs of improved thermal engines that are at least significantly more efficient than other engines currently in the art, and which arguably can begin to approach the maximally efficient Carnot Cycle efficiency. Although some of these engines may bear some resemblance to current engine designs or proposals, they are significantly different in the important ways needed to optimize efficiency to the end of achieving high double digit efficiency values, nominally greater than 50%, that are otherwise not achievable without the teachings presented herein.

Back To Basics: The Carnot Cycle

We begin with a basic refresher on thermal engine thermodynamic efficiency. There is nothing new or novel in this review and the details are available in books on thermodynamics, as should be apparent to one skilled in the art. All thermal engines operate on a cycle that accepts heat in from a hot temperature source and discharges waste heat to a cold temperature sink. The intervening thermal engine converts some of the heat from the hot source to mechanical work. For maximum efficiency we seek to maximize the work extracted from the engine and minimize the waste heat. An immediate outcome of the Second Law of Thermodynamics applied to thermal engines teaches that we can never reduce the waste heat to zero, and consequently we can never realize a thermal engine with perfect (100%) conversion efficiency of input heat energy to output work. However, we can potentially achieve a theoretically limited efficiency only somewhat less than 100%. This theoretical maximum efficiency is given by the well-known Carnot Cycle as shown in FIGS. 1*a* and 1*b*.

It is a fundamental result of Thermodynamics that a Carnot Cycle gives the maximum theoretically possible efficiency for a thermal engine: there is no cycle that can be more efficient than a Carnot Cycle. FIG. 1*a* shows the Pressure-Volume, and Temperature-Entropy is shown in FIG. 1*b*. This particular cycle was computed in MATLAB using a normalized set of units to aid in seeing the relative magnitudes of the variables. Note that in what follows, all processes are assumed to be perfect and reversible in accordance with the assumptions used to analyze the Carnot Cycle.

The cycle begins at point "1" which has a Pressure, P1, equal to 1; a Volume, V1, equal to 10; a Temperature, T1, equal to 10; and an Entropy, S1, of 1.4 (related to the Specific Heat Ratio, representatively assumed to be 1.4). From point "1" the Carnot Cycle executes an Isothermal Compression that goes to point "2". During this phase of the Carnot Cycle work is done on the system and heat is extracted from the system. Compression progresses at just the right rate to compensate for the heat lost to the cold sink in such a manner to maintain the working gas of the engine at a constant temperature. Conversely, the rate of heat extracted might be adjusted to the mechanical compression performed, again to the purpose of maintaining the temperature constant.

Next, the working gas undergoes an Adiabatic Compression from point "2" to point "3". During this phase mechanical work is applied to the working gas to compress it without input or extraction of heat. Because no heat can escape, the temperature therefore rises, and as the volume decreases the pressure rises. This phase of the Carnot Cycle ends with the system in a state of maximum compression where the Volume, V3, is 1; the Temperature, T3, is 100; the Pressure, P3, is 14, and the Entropy, S3 is 0 (all in our normalized units). This point represents the most mechanically stressing part of the cycle due to the confluence of highest pressure and highest temperature in the cycle.

The third phase of the cycle takes it from point "3" to point "4" under an Isothermal Expansion. It is during this phase that the heat is added to the engine, some of which will be converted to the desired output work in accordance with the engine's efficiency. The working gas temperature during this phase of the cycle, T3→T4, is maintained at a temperature of 100 by adding just enough heat to compensate for the mechanical expansion, or conversely by expanding at just the right rate to compensate for the rate of heat being input.

Finally, an Adiabatic Expansion takes the cycle from point "4" back the beginning at point "1". More work is extracted during this phase but there is no additional heat allowed to enter, or exit, the engine during this expansion. At the end of this last phase the engine is back in the state it was in the beginning, ready for another work producing cycle.

The Carnot Cycle produces the highest theoretically possible efficiency between a given heat source and a given heat sink: no other engine cycle can exceed it. This efficiency is given by:

$$\eta = 1 - \frac{T_c}{T_h}$$

Where $\eta$ is the efficiency, $T_h$ is the temperature of the hot thermal source (T3 in FIG. 1) and $T_c$ is the temperature of the cold sink (T1 in FIG. 1).

Realization of Carnot Cycle

At this point we summarize the well-established physics described in the prior section looking for insight to higher efficiency thermal engines:

All thermal engines must execute a "cycle" to convert heat energy into work energy.

This conversion can never be done with perfection: there will always be some waste heat.

A perfect efficiency thermal engine is therefore impossible without violating physical laws.

The highest efficiency that any thermal engine might ever attain is described fully by a Carnot Cycle: no other thermal engine can ever exceed this theoretical efficiency.

The Carnot Cycle is proven to produce the highest theoretical efficiency possible for any thermal engine. So all that is needed is to use a Carnot Cycle engine, and we then know a priori that we are obtaining the highest efficiency possible. Appropriate modifications can then be made to consciously trade some of that efficiency for other desirable attributes such as power, fuel, etc.

However, there is no "Carnot Cycle Engine". And therein lies the issue. There are Otto Cycle engines, Diesel Cycle Engines, Rankine Cycle engines, Brayton Cycle Engines, Humphreys Cycle Engines, Atkinson Cycle Engines, Miller Cycle Engines and a host of lesser well-known cycles. But to our knowledge there are no overt "Carnot Cycle Engines". And therefore, we can be certain that higher efficiency thermal engines can be built than any of the engines mentioned above.

But why are there no overt Carnot Cycle thermal engines? To be sure, no machine is perfect, and therefore due to friction and other practicalities we cannot really make a perfect Carnot Cycle engine. But within the limits imposed by these practical considerations we should be able to make a Pseudo-Carnot Cycle engine with close to optimum theoretical efficiency. So the question remains, why is there not a Carnot Cycle engine?

The answer to this question appears to be foggy at best. It may simply be a perception that design and development of a Carnot Cycle engine is somehow far more difficult that other cycle engines. This perception dates back some time (at least to 1946) as evidenced by reference [4], page 180, containing the following passage regarding implementation of the Carnot cycle:

> "Although it may appear from the analysis that the Carnot Cycle is highly impractical, since an engine working under the specified conditions could not be built . . . ".

But there are no physical laws prohibiting the construction of a near ideal Carnot Cycle engine, and the success of the Otto Cycle engine is ample proof that even an imperfect Carnot Cycle engine that does not perfectly meet its theoretically limited efficiency could be quite successful.

The reason for the apparent perception of Carnot Cycle engine impracticality was perhaps because of the limited manufacturing capabilities of the day when thermo-engine research was young and at its peak development. But it is important to note that what "could not be built" back in 1946 (or earlier) can today be programmed into a CNC machine and reproduced economically a thousand-fold without error. Therefore, the constraints limiting the realization of a pragmatic and economically manufacturable Carnot Cycle or Carnot-like thermal engine that may have existed in the past, no longer necessarily constrain its development today or in the future.

Furthermore, if one seeks other attributes like power, weight, etc., one may have to trade away some of the ideal Carnot Cycle efficiency to obtain those attributes. But in doing so one will have designed in those attributes as trade-offs to the engine efficiency instead of just accepting them post facto. In such a case one can then design the highest efficiency thermal engine that also achieves the desired additional attributes, using the desired attributes as constraints to the efficiency of the now most efficient pseudo-Carnot Cycle. The difference between this engine and others before it is that it will be fully optimized.

At this point it is believed instructive to briefly review some of the more common thermal cycles so they can be compared to the Carnot Cycle and evaluated against it. Arguably the most common (and successful) thermal cycle is the Otto Cycle shown in FIG. 2, and in other detail with its intake and exhaust cycles shown, in FIGS. 4*a* and 4*b*.

Comparing FIG. 2 with FIG. 1, one thing is immediately apparent (yet seldom really fully acknowledged): The Otto Cycle is NOT a Carnot Cycle. It does not even do a particularly good job of mimicking a Carnot Cycle.

- Heat is not withdrawn gradually and isothermally in the early part of the compression stroke
- Heat is added all at once from the heat source in an Isochoric (Isovolume) process
- Heat is not added gradually and isothermally in the early part of the expansion stroke
- Heat is released to the cold sink all at once in an Isochoric process at the end of the cycle The Otto Cycle is therefore a rather poor emulation of a Carnot Cycle and so distorts the Carnot Cycle that we should be surprised that it provides any worthwhile efficiency at all! Yet, car manufacturers have spent untold millions of dollars trying to glean minute efficiency improvements from a cycle that is fundamentally and irrevocably flawed as far as optimizing efficiency is concerned. It is of course acknowledged that there are many good reasons for the Otto Cycle's success, not the least of which is ease of manufacturability as previously noted. But what we see in the above discussion is that when it comes to efficiency, we have reached a point of diminishing returns trying to improve the Otto Cycle if for no other reason that the Otto Cycle is not a Carnot Cycle nor even a good approximation of a Carnot Cycle.

The efficiency of the Otto Cycle is given by:

$$\eta = 1 - \frac{T_1}{T_2} = 1 - \frac{1}{r^{\gamma-1}}$$

where T1 is the sink temperature, T2 is the pre-combustion compression temperature, r is the compression ratio and gamma is the specific heat ratio. Because of this latter relation, it is often claimed that the efficiency of the Otto Cycle is related to the compression ratio: higher compression ratio begets higher efficiency (ergo the Diesel engine is generally (but not necessarily always) more efficient than the Gasoline Otto engine).

It should be pointed out though that this is a deduced result, not the fundamental result. It is important to now note that the Carnot Cycle's efficiency is $1-T_1/T_3$ (in the nomenclature of FIGS. 1*a*, 1*b* and 2), not $1-T_1/T_2$ as for the Otto Cycle. In other words, the Carnot Cycle's efficiency is dependent only on the temperatures of the heat sink and the heat source. But the Otto Cycle's efficiency is related only to the temperature of its heat sink and its pre-combustion compression temperature. This pre-combustion compression temperature is much lower than the peak temperature ($T_3$) in FIGS. 1*a*, 1*b* and 2 (assumed to be equal in both figures), and consequently, the Otto Cycle is guaranteed to be less efficient than the Carnot Cycle by a non-trivial amount.

Comparing the Carnot Cycle with the Other Cycles

The general conclusions discussed above are not limited to the Otto Cycle. Rather, all the currently popular thermal cycles suffer similar deleterious efficiency degradations inherent in the basic design of their cycles. This is because, by definition, they are not Carnot Cycles. The Diesel Cycle is actually quite similar to the Otto Cycle. The key difference is that it replaces the trans-ignition Isochoric compression with an isobaric (constant pressure) "cap" to the P-V diagram as illustrated in FIGS. 3*a* and 3*b*. The efficiency of the Diesel Cycle is given by:

$$\eta = 1 - \frac{1}{\gamma}\left(\frac{1}{r}\right)^{\gamma-1}\left[\frac{r_{co}^{\gamma}-1}{r_{co}-1}\right]$$

where η is again the efficiency, Gamma is the ratio of specific heats, r is the compression ratio, and rco is the (Diesel injector) cut-off volume ratio (V3/V2). This equation is a bit more difficult to assess qualitatively, but considering limits helps. In the limit where the cut off ratio, rco, goes to 1, the Diesel efficiency achieves its maximum. This should not be surprising because then the top left corner of the P-V diagram of FIG. 3*a* starts looking like a Carnot Cycle. However, if V3=V2, this means the injector never injects any fuel into the cylinder! That of course results in very low power output and a rather useless engine (even if it does have higher efficiency).

Beyond this unrealistic limit, the Diesel Cycle does generally end up being more efficient than the Otto Cycle on a comparative basis. But note why this is true. There is still no isothermal path in the beginning of the compression stroke, nor is there an isothermal expansion at the beginning of the expansion stroke, and the heat is still being pulled out at the wrong place in the cycle through an isochoric process at the end of the cycle. But at least the heat is now being added in the beginning of the expansion phase. Its still not an adiabatic expansion as called for in the Carnot Cycle, but at least the heat is being added in the correct phase of the cycle. Because of this, the Diesel Cycle more closely resembles the Carnot Cycle than the Otto Cycle, and with its higher compressing ratios is more efficient as a result.

FIGS. 5*a* and 5*b* show the Miller Cycle is a modification of the Otto and Diesel Cycles wherein some of the compressive work is lessened by letting the intake valve stay open for a short period past the bottom dead center of the intake stroke. This lets some of the air fuel mixture escape back out into the intake manifold where (assuming a good supercharger) it can return the energy on the next intake stroke. compared to the Otto Cycle. Note that other than a small corner near the start of the cycle (i.e. what we have been calling position "1"), there is no difference between the Miller Cycle and the Otto Cycle. To be sure, the Miller Cycle is indeed more efficient than a standard comparable Otto Cycle. But this is not because the cycle is fundamentally more efficient. Rather, it is simply because the Miller Cycle, if implemented correctly (which apparently is not a trivial thing to do) reduces the intake and exhaust pumping losses.

Note that we have not shown the pumping cycles in any figures to this point, because they are not part of the fundamental cycle physics that limits the efficiency. Therefore, the Miller Cycle certainly does improve the efficiency of either Otto or Diesel engines, but not because of any change real to the fundamental thermodynamic cycle. The underlying cycle is still not a Carnot Cycle and it is therefore still suboptimal. All the Miller Cycle really does is to reduce some instantiation losses to get a little closer to the theoretical efficiency of the Otto and Diesel Cycles respectively.

The Atkinson cycle (FIG. 6) produces two different compressed volumes at the two Top Dead Center (TDC) positions that occur in its 4 stroke cycle process. This manifests a slightly longer power stroke, a near zero volume at top dead center of the exhaust stroke for more complete exhaustion of the burnt gases, and a slightly lower pumping loss upon compression of the air-fuel mixture provided by a slightly shorter compression stroke that leave more volume at top dead center of the compression stroke than at top dead center of the exhaust stroke. It is this later feature that is often confused with the Miller Cycle and visa-versa. The Miller Cycle achieves lower pumping losses by cheating (leaving the intake valve open longer than typical in an Otto Cycle engine). In the Atkinson Cycle, lower pumping loss is achieved because the intake phase volume is actually smaller than the expansion phase (power stroke) volume. There is a differential embodiment of the Atkinson Engine with two pistons exhibiting in dual volumes behavior described above.

The Brayton and Humphrey Cycles are shown comparatively in FIGS. 7*a* and 7*b*. The Brayton Cycle is characterized by two constant pressure phases in the cycle. The high temperature phase mimics that of a Diesel, so we should expect some higher efficiency from that aspect of the cycle. Additionally, at least the heat is being added at the correct phase of the cycle. However, the low temperature constant pressure process is not part of the Carnot Cycle and will therefore detract from the efficiency. The efficiency of the Brayton Cycle is given by:

$$\eta = 1 - \frac{T_1}{T_2} = 1 - \frac{1}{r^{\gamma-1}}$$

Note that this is identical to the theoretical efficiency of the Otto Cycle. This supports the previous statement that claimed there should be an improvement from the high temperature and pressure constant pressure phase ("2"-"5" in FIGS. 7*a* and 7*b*) because it adds heat at the right time. But there will be a degradation in efficiency from the low pressure & temperature constant pressure phase ("6"-"1" in FIGS. 7*a* and 7*b*). The Humphrey Cycle is also shown in FIGS. 6*a* and 6*b* for comparison. It suffers the same ills (as far as efficiency is concerned) as the Otto Cycle from point "2" to point "3", and the same problem as the Brayton Cycle from point "4" to point "1". Its efficiency is given by:

$$\eta = 1 - \gamma\frac{T_1}{T_2}\frac{\left(\frac{T_3}{T_2}\right)^{1/\gamma} - 1}{\frac{T_3}{T_2} - 1}$$

This is a more complex expression than the others so far, but at its core the T1/T2 factor tells us its comparable to the Otto cycle. Additionally, the structure of the other terms have a form that is complementary to the Diesel efficiency equation with appropriate conversion of the temperatures to compression ratio. This is due to the symmetry of the P-V plot's constant pressure phase "4"-"1" path bearing a complementary relation to the constant pressure path in the Diesel Cycle. Where the Humphrey Cycle may pick up some advantage is from realistic instantiation, where T3 can be made quite high. This reduces the magnitude of the subtracted term, thereby yielding a higher efficiency value. But unless T3 is high, it is not much more efficient than the other cycles, and still much less efficient than a Carnot Cycle.

New Emerging Higher Efficiency Engines

The prior sections focused on the most common and least efficient engines. This section presents a very short discussion on two other emerging thermal engine cycles with higher potential efficiency: the Stirling Cycle and the Ericsson Cycle engines.

The Internet is rich with information on the Stirling engine which will not be repeated here. Suffice it to say that the Stirling engine is an external combustion closed cycle engine which in fact does a better job of emulating a Carnot Cycle (at least by comparison to the prior engines discussed so far). The Ericsson engine by contrast is a bit less well known. It also uses external combustion but with an open cycle that otherwise bears several similarities to the Stirling engine both in design and in efficiency. There have been some new designs in recent years that increase its potential on par with Stirling engines.

Our key reason for mentioning the Stirling and Ericsson cycle engines is that they both have a particularly interesting attribute in common with the Carnot cycle: they both have the same theoretical efficiency as the Cartnot Cycle! The key difference is that their temperature-entropy plots (T-S) are parallelograms, whereas the Carnot Cycle is a rectangle. For the Stirling Cycle the Parallelogram of the T-S plot slants to the right (toward higher entropy change) and for the Erickson it slants towards the left (toward lower entropy change). But for the same $T_c$ and $T_h$, the area under both the rectangle T-S plot of the Carnot Cyle or parallelogram T-S plots of the Stirling and Erickson Cycles is the same, and therefore so too are their efficiencies.

So if the Stirling and Ericsson cycles have the same theoretical efficiency as the Carnot cycle, why not just use them? Indeed, with the recent rise in fuel costs several efforts are underway to do just that. But there are implementation issues with both the Stirling and Ericsson engines. Both are external combustion engines. This is often considered a key advantage in a globally warming world, since it is usually presumed that external combustion will produce less pollution than internal combustion. But there are still challenges with obtaining a truly efficient external burner and regenerative heat exchangers. And if the burners/exchangers are not efficient enough (currently the case) then maximum efficiency cannot be realized. Additionally, less efficient burners/exchangers can also present pollution problems, although this is considered less challenging than with internal combustion Perhaps most important though is that external combustion imposes limits on cold start availability and load following. These two engines need to "warm up" before they can supply power. The startup time might not be all that much of an imposition with additional engineering, but in an impatient world, every second counts off points against the design. The load following limitation is perhaps the more stressing problem because it limits the applications these engines can be applied to. For example, activating an electric space heater places a dramatic load change on a 1.5 kW generator, which is easy for a gasoline or Diesel engine to follow, but very challenging for a Stirling or Ericsson engine to follow.

Finally, a closer examination of these cycles reveals that they both tend to "clip the corners" of the ideal theoretical cycle diagram (as do many engines). This is paramount to deviating from the theoretically optimum thermal cycles in a manner not unlike the way the Otto and Diesel cycles deviate from the Carnot cycle. The result is further reduction in efficiency from that which would otherwise be expected.

Summary and Assessment of Common Conventional Thermal Engines

The sections above have given P-V and T-S plots for the more common thermal cycles. These are the main cycles that companies spend millions of dollars on each year trying to improve the efficiency of. With the exception of the Stirling and Ericsson cycles, all these cycles bear more resemblance to each other than they do to the Carnot Cycle which they should attempt to emulate: sometimes these cycles even share the exact same efficiency equation, none of which is the Carnot Cycle's efficiency equation.

The reasons that these engines deviate from a true Carnot are both historical and pragmatic. Yet, after over 100 years of thermal engine development few of these cycles bear anything but a passing resemblance to the Carnot Cycle that they must follow for optimum efficiency. None of them does a good job emulating the Carnot Cycle. In some cases heat is not even added or removed during the correct phase of the cycle. In other cases the cycles deviate significantly from a Carnot Cycle. In all cases none of these cycles contain the correct isothermal and adiabatic processes needed during the compression and expansion strokes of a true Carnot Cycle.

The Stirling and Ericsson cycles have the same theoretical efficiency as the Carnot cycle, but they suffer from cold start and load following problems due to the latency of their external combustion heat source. Furthermore, both the external combustor and the details of the cycle implementation limit them from achieving their true theoretical efficiency.

The conclusion from these observations is that we should not be at all surprised that most thermal engines today have less than optimum thermal efficiency. There are many factors (mechanical friction, fuel combustion, fluid drag, etc.) that can degrade efficiency. But if one starts with a theoretically lower than optimum efficiency design, there can be no hope of making significant improvements in efficiency afterwards. We need a new fresh approach to deriving high efficiency from thermal engines, and Carnot has already told us what it needs to be: a Carnot Cycle.

BRIEF DESCRIPTION OF THE DRAWINGS

FIGS. 11*a* and 11*b* show the Tinker new efficiency equation

DETAILED DESCRIPTION OF THE DRAWINGS

Approach to Designing a Carnot Engine

The approach to creating a Carnot Engine is begun by first realizing that true perfect Carnot efficiency is not the goal, but emulation of the Carnot Cycle to a maximum pragmatic extent possible is really our goal. We therefore seek ways to emulate the Carnot Cycle as closely as possible using what ever means possible to instantiate the approximation to the Carnot Cycle. Note that since today's Otto engines are challenged to achieve 30% efficiency, and today's Diesel engines are likewise challenged to achieve 40%, and since any of the typical efficiency modifications employed in modern engines usually do not provide more than single digit efficiency improvements (if that large), it would not take that large efficiency improvement to obtain a marked improvement over the current art in efficient engine design. But the objective of the current invention is to provide a factor of 2 (100%) or more efficiency improvement, and this by itself distinguishes the current invention from others practicing in the art. The approach to achieving this dramatic improvement is to ascertain the aspects of the Carnot Cycle that differentiate it versus other cycles, then isolate and instantiate improvements in those various differentials, and then to synergistically combine those improvements into a whole which attempts to emulate the Carnot cycle to the maximum extent possible within the numerous engineering, systems requirements and user constraints levied on the engine design process. Therefore, although there are numerous particular subordinate inventions disclosed herein, the true invention that provides our goal of dramatic efficiency improvements is really the synergistic integrated whole of significant individual improvement parts which result in benefit larger than the sum of those parts.

Approach to Designing a Carnot-Diesel Cycle Engine

Figure 3B:
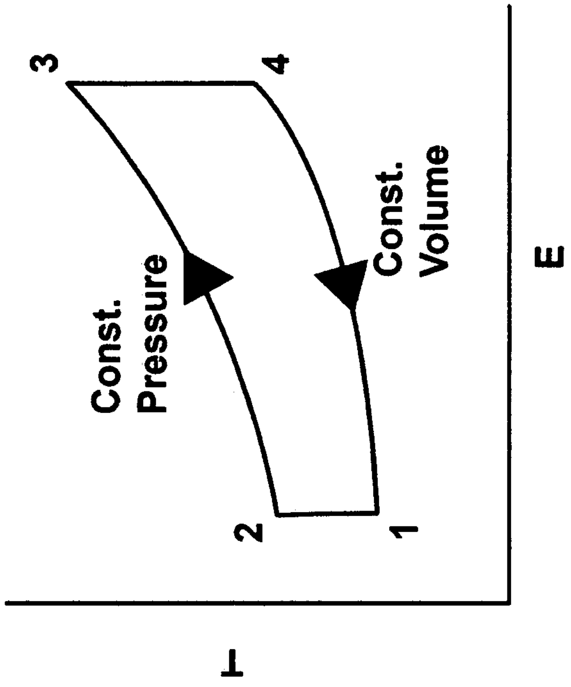
FIGS. 3*a* and 3*b* is the P-V and T-S plots of the Diesel Cycle
Figure 3A:
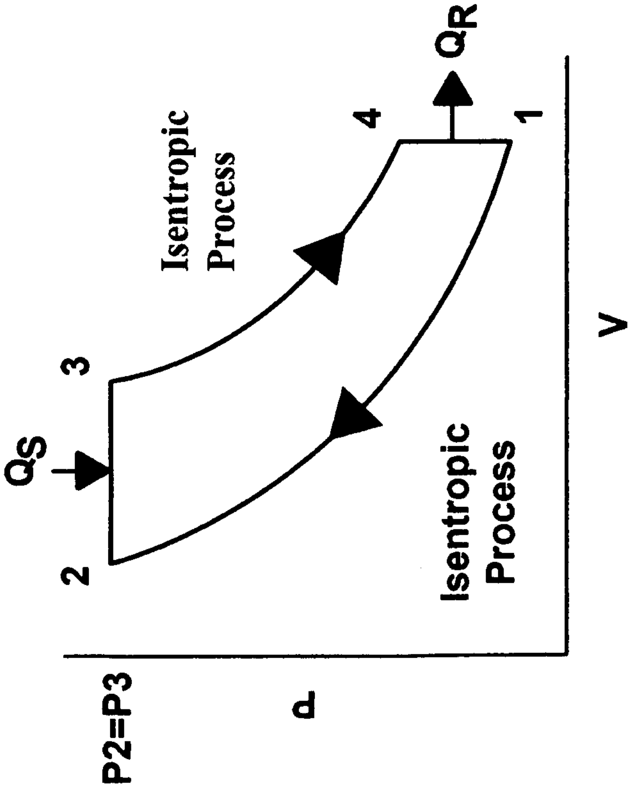
Figure 8:
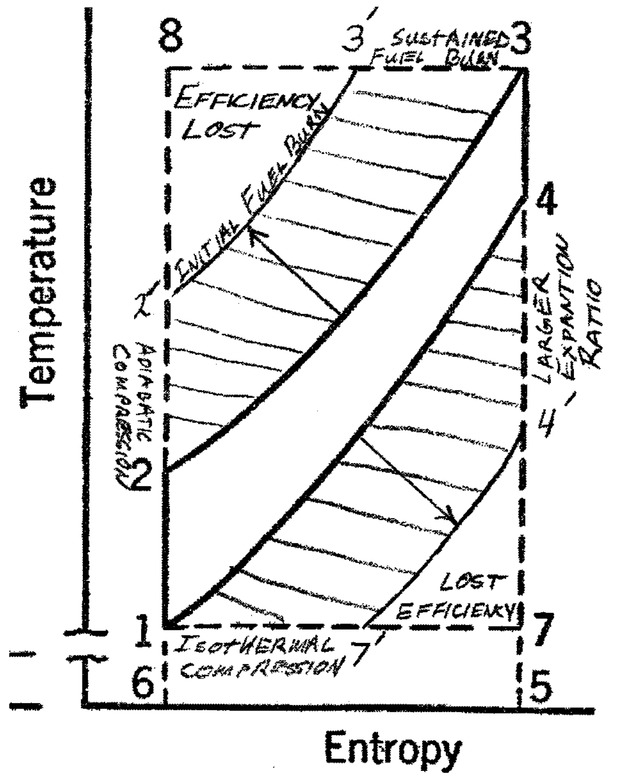
FIG. 8 shows the approach to improve the Diesel Cycle

In pursuing this high efficiency goal, it is convenient to start from a reasonably well understood starting point, such as the Diesel engine. FIG. 8 illustrates the T-S diagram previously given in FIG. 3.*b* but now with additional labeling indicating the thermodynamic processes occurring along the perimeter of the Diesel's cycle boundary. The goal is to morph the Diesel T-S diagram into the Carnot T-S diagram given by the enclosing rectangle described by traversing points 1-8-3-7-1 on the figure. In particular we wish to grow the Diesel T-S curves out into the Carnot T-S boundary, constrained within a given low and high temperature and entropy change, which are the fundamental parameters associated with our energy source and limiting materials properties. The arrows in the figure indicate the directions of possible growth of the Diesel cycle boundaries. Specifically, enhanced adiabatic compression, longer sustained fuel burn, larger expansion volume or ratio, and enhanced isothermal compression are seen as key contributors to enhancing the efficiency of our starting point Diesel cycle.

Figure 9:
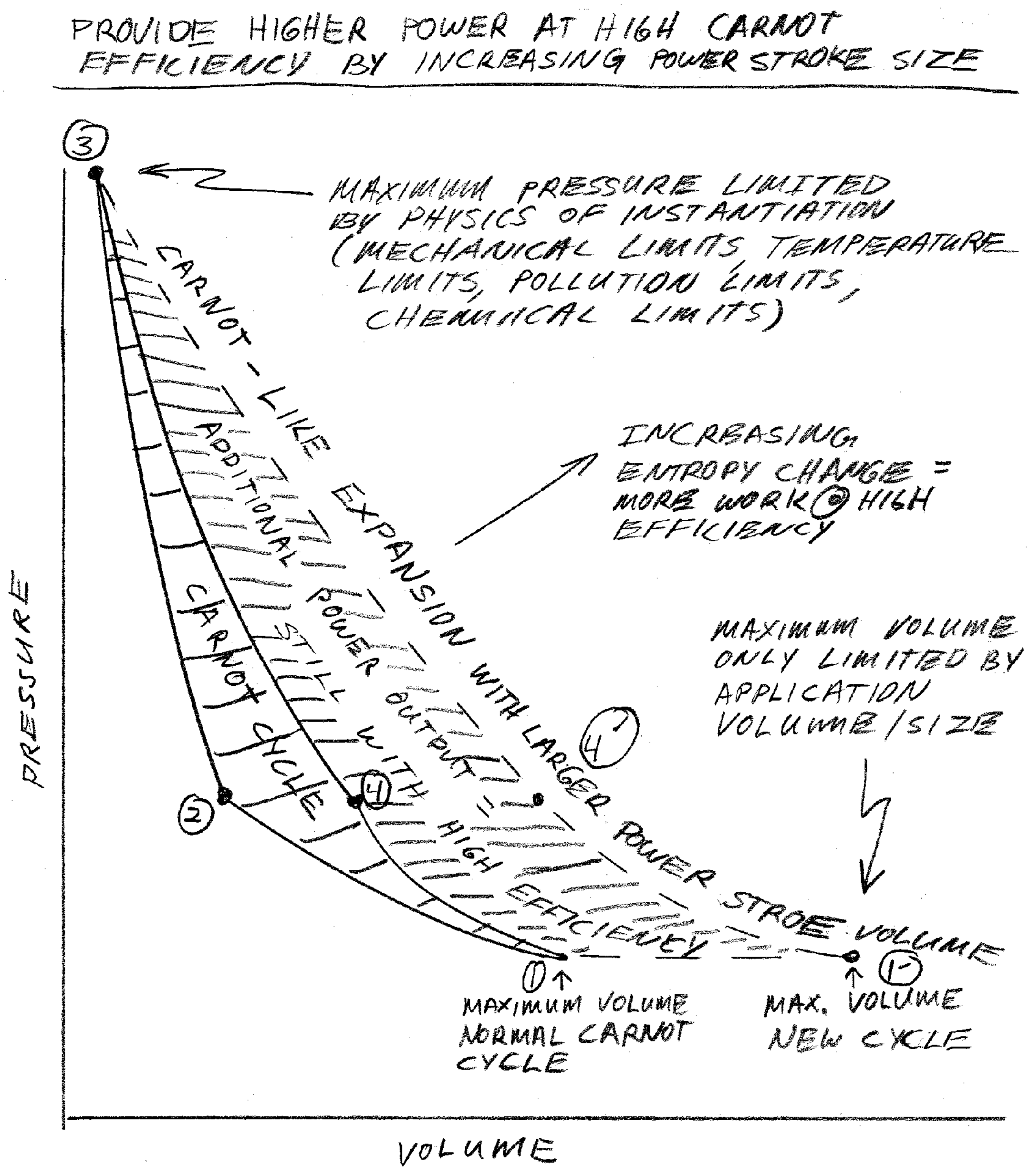
FIG. 9 shows the approach to realize a Carnot-like Cycle

A complimentary but substantially similar approach is to start with the Carnot Cycle, which is the defining maximum efficiency cycle between any pair of differing temperatures and differing entropies, and inquire not into its efficiency, since that is known to be maximized, but into modifications which would enhance its ability to produce more work per cycle. This is because the Carnot Cycle, although being of optimum efficiency, is not given to produce copious amounts of output power per cycle because its compression phase and expansion phase are so close to each other. Therefore, a pragmatic Carnot-like engine must of necessity sacrifice some efficiency in order to produce the desired power densities to be of interest for actual application. FIG. 9 illustrates that practical materials, fuel and oxidizer and mechanical considerations will limit the peak pressure that might be obtained in the Carnot Cycle. This then presents something of a boundary to significant enhancement of the Carnot compression phase towards the enhancement of power production per cycle. Conversely, there is no such limit on the upward movement of the expansion phase as indicated by the arrow pointed to the top right corner of the figure. The expansion phase curve is limited only by the maximum volume that might be tolerated in the application.

From these two prior figures, a core theme for the current invention emerges. To achieve Carnot-like efficiency with higher levels of output power than might be enjoyed from a pure Carnot engine, one needs to increase the expansion volume visa vie the original Carnot Cycle. Furthermore, there is no overt requirement that the compressed volume be the same as the expanded volume (other than absolute maximum Carnot efficiency, which as stated above we are willing to sacrifice some of to get higher power). This then introduces a core concept to the current invention, that the expansion ratio can, and indeed must, be larger than the compression ratio to achieve a practice Carnot-like efficient engine with desirable performance attributes demanded by users.

Figure 10:
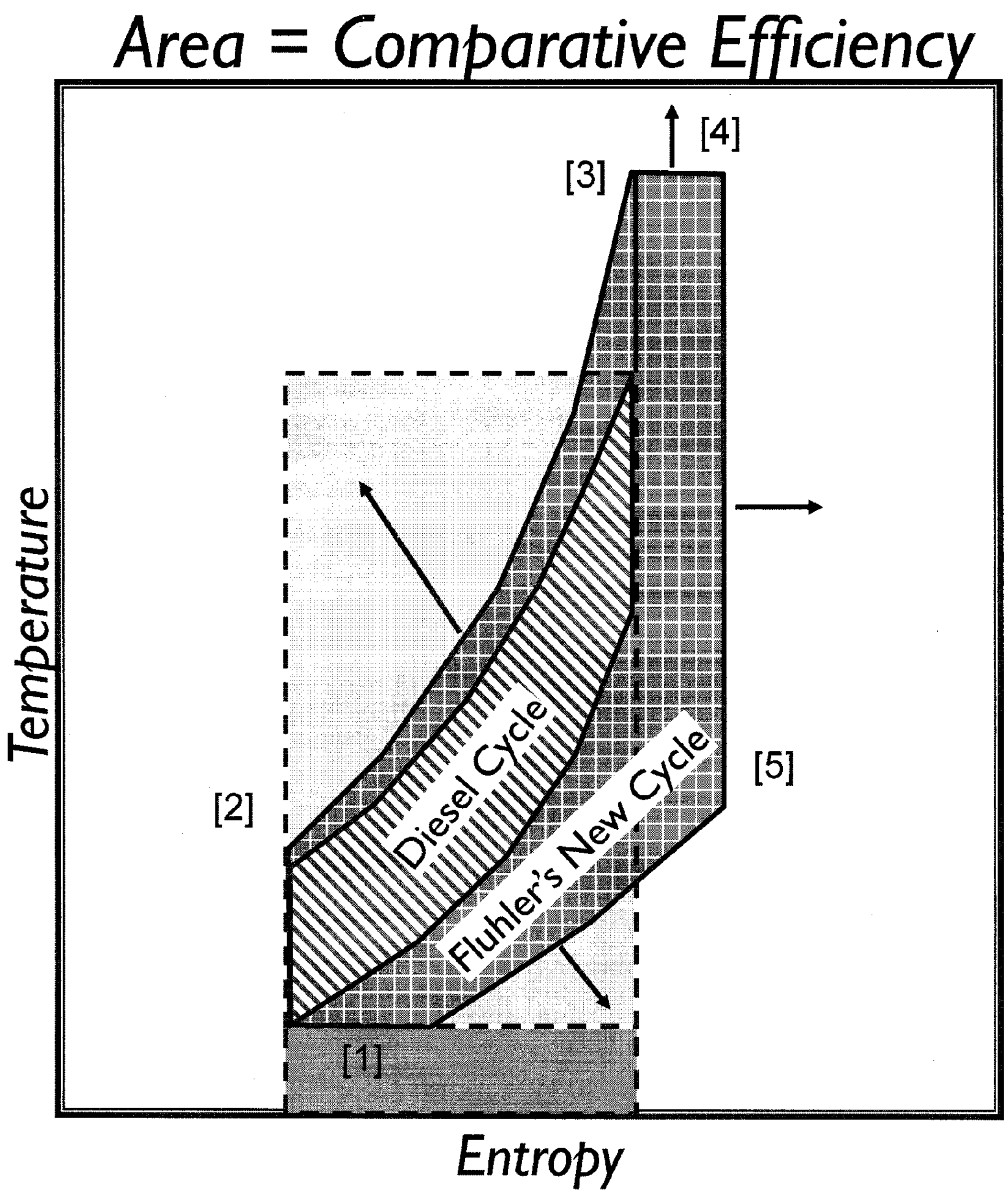
FIG. 10 shows the areas of improvement for enhanced efficiency

To achieve maximum efficiency, we must convert the standard Diesel engine into a variant we will call the Carnot-Diesel Engine (Carnot for short). Our approach to this new engine design includes the following:

- Determine which "other" conventional engines most closely resembles the desired Carnot Cycle
- Second, analyze the differences between the baseline conventional engines and the Carnot Cycle
- Third, determine how to convert the conventional Diesel engine into a Carnot-Diesel cycle engine These key thrusts for efficiency improvement are illustrated in FIG. 10. Examining the other previously mentioned engines (plus a few others not mentioned) reveals that the Stirling and Ericsson have the closest thermal cycles to the Carnot cycle. However, as previously discussed, they have some issues with cold start and load following because they are external combustion engines. We therefore assess that we want to consider here only an internal combustion engine (although it will turn out that the designs derived herein are equally applicable to external combustion variants as well). The internal combustion engine which comes closest to the Carnot cycle is the Diesel cycle. In fact, if we look closer at FIGS. 1a and 1b, we can see that the Carnot cycle is in many ways really just a Diesel cycle that is operated at less than constant pressure burning. Hence the motivation to use the Diesel cycle may be used as our baseline.

Next we assess the differences between the baseline Diesel engine and the Carnot cycle engine. The differences are as follows.

With respect to Diesel engines,

1. They do not have an Isothermal path on the early part of the compression stroke.
2. Heat is not withdrawn gradually in the early part of the compression stroke.
3. Heat is added fairly quickly from the heat source in an Isobaric (Iso-pressure) process.
4. Heat is not added gradually in the early part of the expansion stroke.
5. It does not have an Isothermal path on the early part of the expansion stroke.
6. Heat is released to the cold sink all at once in an Isochoric process at the end of the cycle.

Finally, we determine how to convert the differences to eliminate them. Differences 1 & 2 go together, and mean that we need to cool the compressing gas early during compression. This eases the compressibility of the gas and thereby reduces compression work required. Differences 3, 4 & 5 also go together and are the antithesis of Differences 1 & 2. They mean we need to slow down the rate of fuel flow, more specifically the rate of fuel buring, making it a time or a crank angle dependent function of the engine. Difference 6 is possibly the most significant as it lets a significant amount of power escape unused. It is this loss that is most reduced by higher compression ratios in the standard Diesel engine, and by the significantly larger expansion ratio to be proposed for the new engine. From the above, we see that there are basically three key changes needed:

A cooling heat exchanging means needs to be introduced in the design which only cools the working gas on the compression stroke, and preferably only during the first part of the compression stroke.

The fuel injectors need to be modified (probably also the combustion chamber) so that heat is introduced at a slower controlled rate to produce an isothermal process for the first part of the expansion stroke. Note that while this may reduce peak power and torque, as the pressure might be less, that is controllable by changing the fuel injection rate to be higher when needed at a sacrifice in efficiency for a short period.

Finally, the large hot gas residue left in the cylinder at the end of the exhaust stroke needs to be converted to work instead of being released into the environment as waste heat. The left over pressure in a combustion cylinder or chamber is considerable (hundreds of PSI) at all but the lowest power levels. This is the reason that one requires a muffler on virtually all internal combustion engines. Given a closed cycle, the only practical way to harness this left over power is to make the expansion stroke volume larger than the intake stroke. This is paramount to creating an extreme Atkinson cycle engine, as shown previously in FIG. 6.

Early Compression Stroke Cooling

Figure 2:
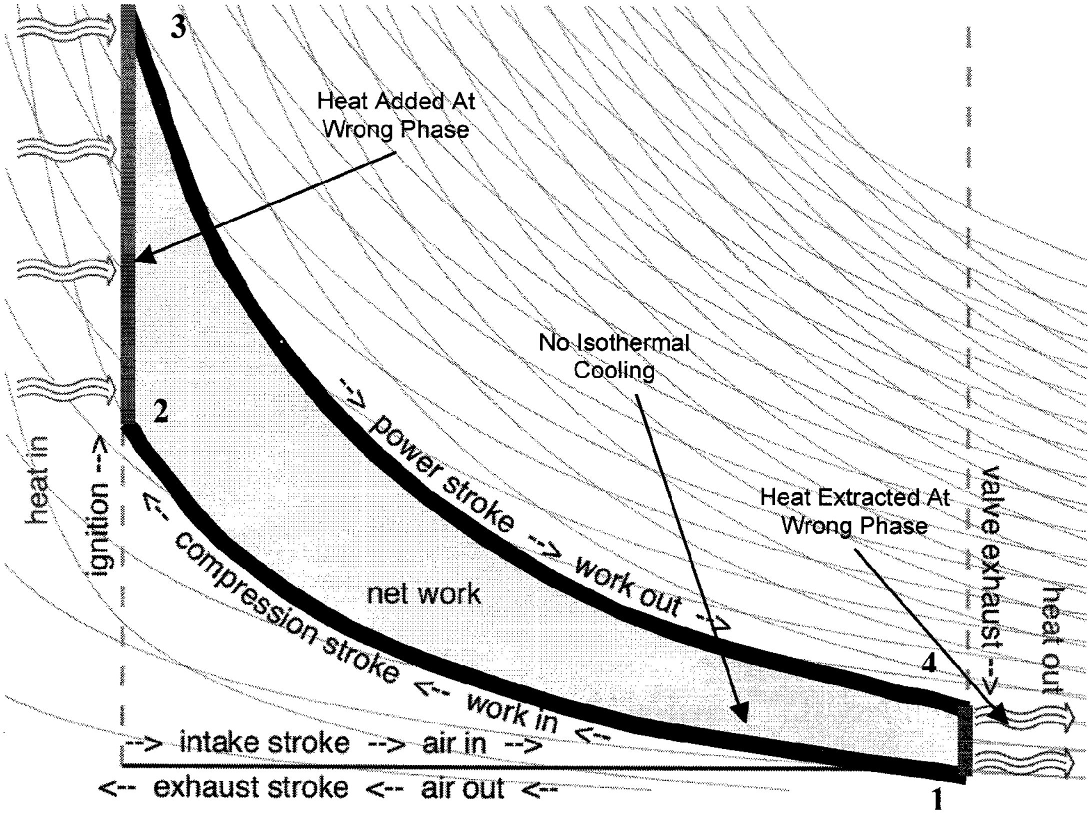
FIG. 2 is a plot of the P-V diagram for the Otto Cycle
Figure 4A:
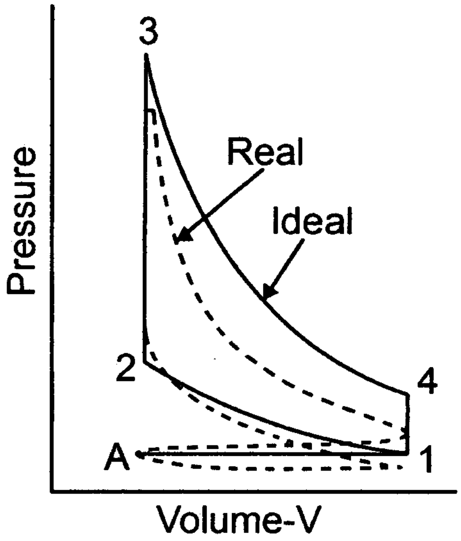
FIG. 4*a* through 4*d* are realistic plots of the Otto and Diesel Cycles FIGS. 5*a* and 5*b* compare the Miller Cycle
Figure 4B:
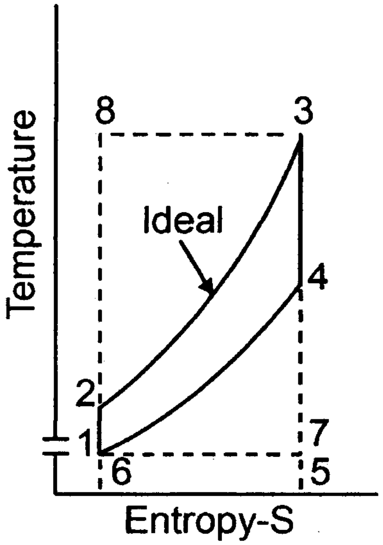
Figure 4C:
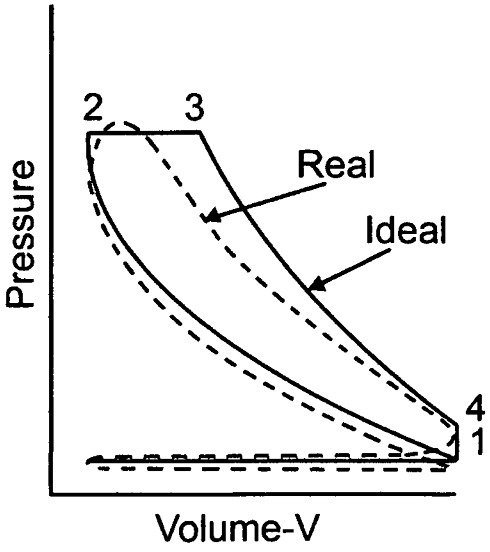
Figure 4D:
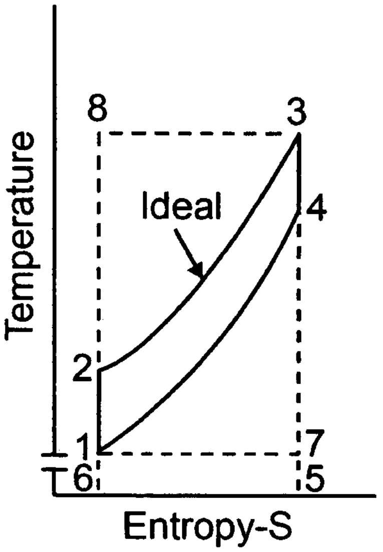
Figures 5A, 5B:
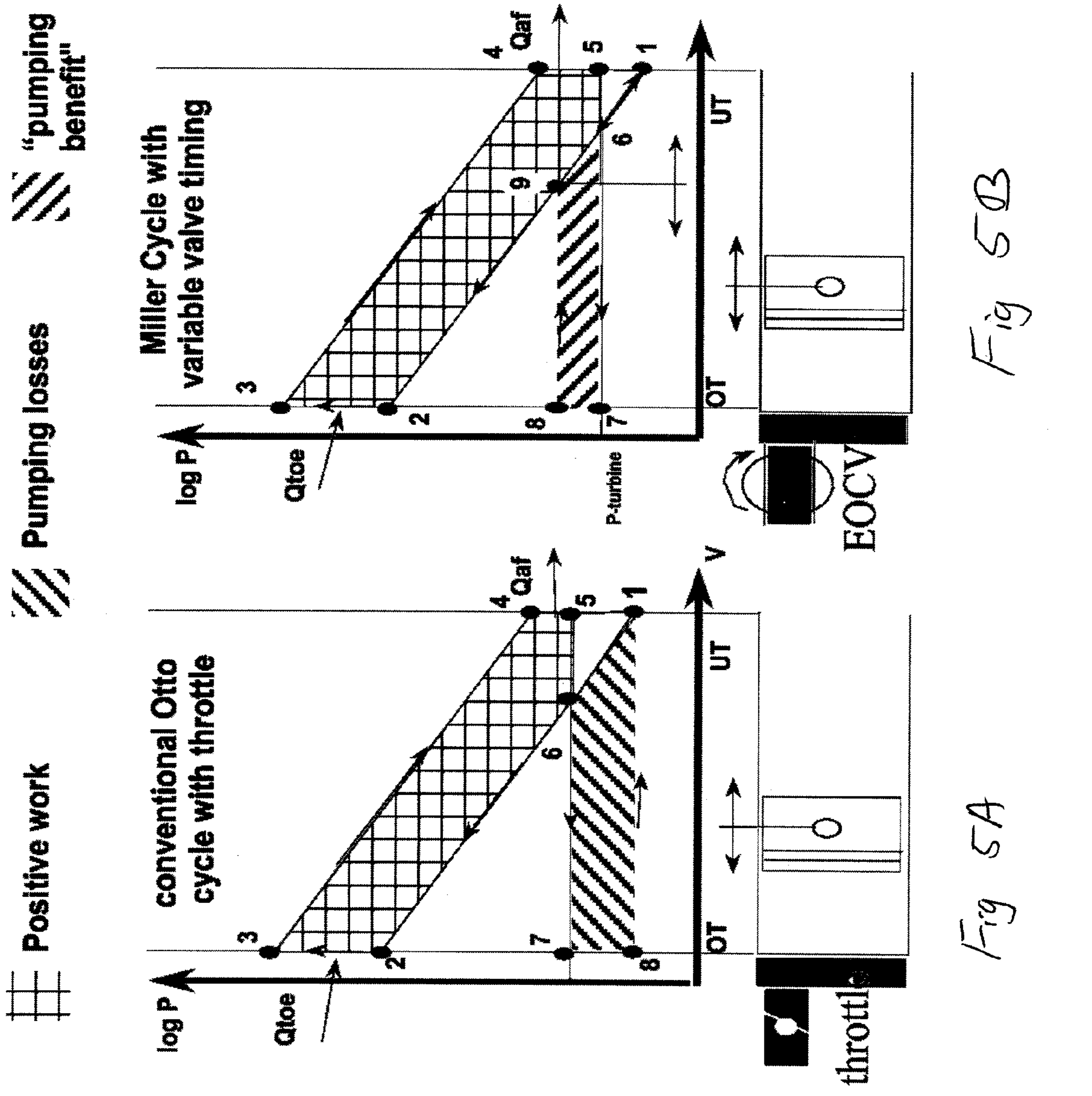

As discussed in the previous section, we first address Differences 1 & 2 in the prior numbered list, i.e. to introduce a cooling of the working fluid early in the compression stroke. This is an important attribute of a maximally efficient cycle, because it is this cooling that potentially reduces the pressure differential between the end of the power stroke and the beginning of the compression stroke, and brings the phases together at points 4 and 1 of FIG. 8 closer to each other visa vie transposition toward the corner at point 7. This early compression phase cooling would also reduce/eliminate the pressure differential between points 4 and 1 in FIG. 2 and FIGS. 4a and 4b of the Otto (and Diesel) Cycle. It is easy to see that if this pressure differential is eliminated, more power will be extracted from the fuel and less waste heat and energy will be vented out the exhaust port.

Figure 23A:
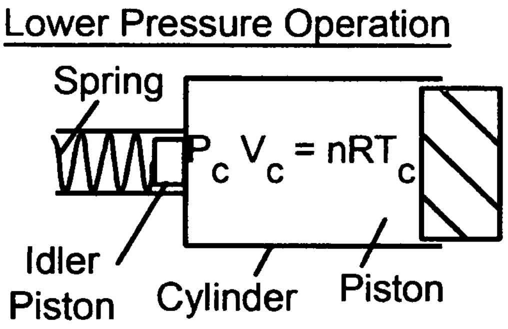
FIG. 23 shows an equation of state changed embodiment
Figure 23B:
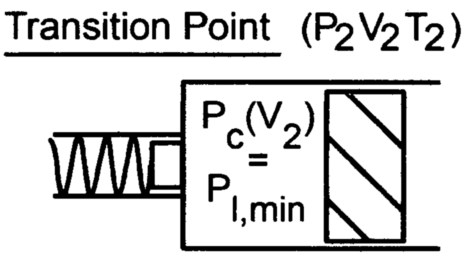
Figure 23C:
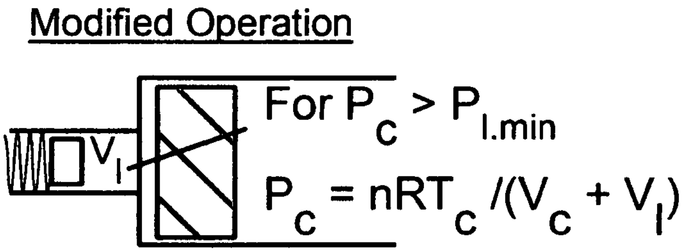

The question of course is how to instantiate such cooling. It needs to happen AFTER the working fluid has fully entered the cylinder and the cylinder is sealed. Cooling before the intake valve may help improve power density by its effective supercharging effect, but it is not the same as the required in-compression phase cooling. This cooling also has to happen very quickly during the early part of the compression phase, which in a fast turning engine is measured in milliseconds One solution may be to introduce an in-chamber heat exchanger or cooling radiation as illustrated in FIG. 23 by appropriate design of the engine. Such a design could be implemented any number of ways. One such design would include a cooling block disposed within the cylinder possessing crossed but non-intersecting coolant channels to pull heat away and channels passing the working medium of the engine to effect the desired cooling. The piston or other mechanical artifice might employ “fingers” which block the working medium’s path during burn and exhaust phases. If the engine is of a multi-chamber design, the engine could be designed so the working medium passes only in one direction (upon compression) and does not pass through the cooler upon heat addition or exhausting. Other embodiments employing fins and channels in the engine cylinder could be provided alternatively or in addition to the cooling radiator approach However, a more interesting and potentially more effective approach is to use “evaporative cooling”. We propose to use a similar scheme by spraying cool atomized fuel into the air charge after the intake valves have closed but before significant compression takes place. This cools the air, reducing its pressure and reducing the compression work needed for the compression stroke, particularly in its early phase of compression where needed most. Note this is quite different from injecting fuel into the air before ingestion into the cylinder. In the former, the evaporative cooling of the fuel cools the air charge to make compression easier. In the latter the fuel cools and increases air density before indigestion into the cylinder: this increases the air-fuel charge weight, which increases engine power, but it will not reduce the compression work required to compress the fuel-air charge (in fact it will increase it).

It is expected that only a partial charge of fuel is needed to get meaningful cooling, and such a low fuel-air ratio charge is anticipated to not be rapidly combustible. This is because even with Diesel compression ratios a partial charge injection of fuel into the chamber will, after suitable atomization and absorption of heat from the air./oxidizer in the chamber, be vary lean in mixture, thereby not readily supporting a predestination combustion. However, if necessary, the compression ratio can be lowered to eliminate any risk of pre-combustion, and, by using the mechanical designs to be shown subsequently, this reduction in compression ratio will not result in a significant reduction in efficiency.

It is also interesting to entertain the concept of using this early compression stroke fuel injection as THE method for fuel introduction in a modified Otto Cycle engine. All that would be required is the addition of Diesel-like fuel injectors and the elimination of the carburetor or manifold fuel injection system.

Time/Phase Profile Metered Fuel Injection

Figure 1A:
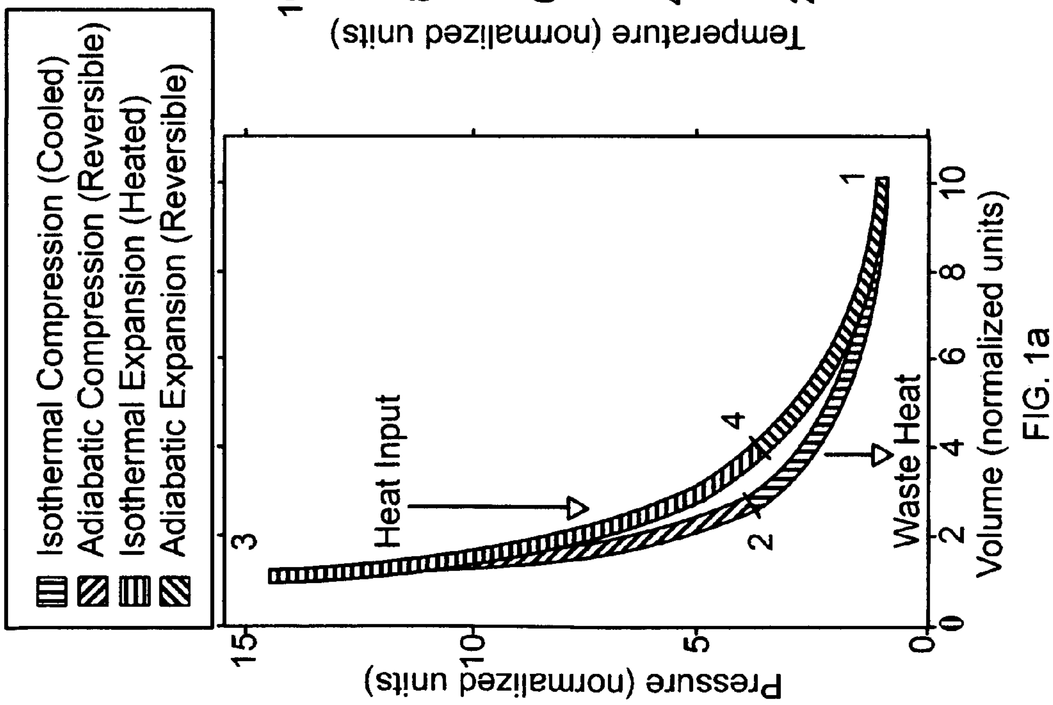
FIG. 1*a* and *b* are plots of the Carnot Cylce P-V and T-S disgrams
Figure 1B:
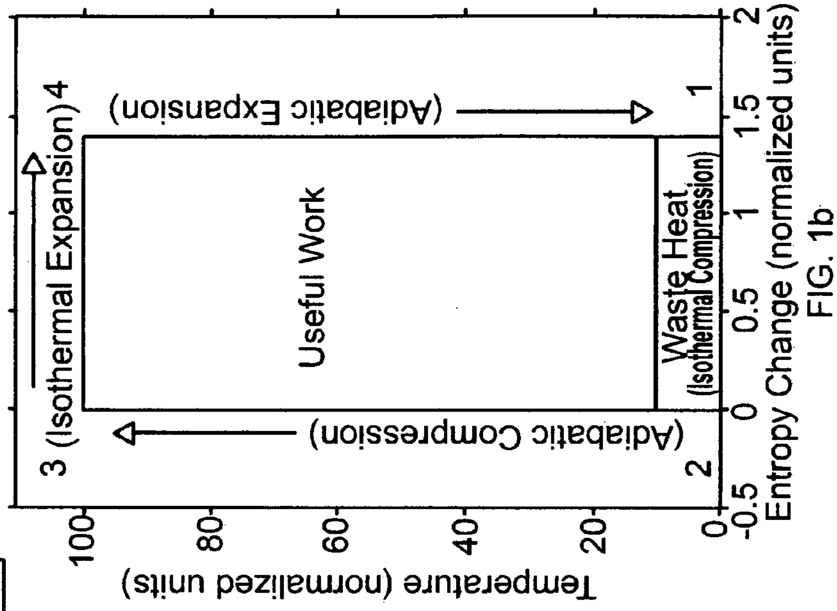

As mentioned previously, we now address Differences 3, 4 & 5 in the aforementioned numbered list of differences between the Carnot Cycle and the Diesel cycle, specifically, that which requires instantiation of the isothermal expansion profile shown in phase 3-4 of the Carnot Cycle illustrated in FIGS. 1*a* and 1*b*. This is where heat is input into the engine. The key characteristic of the Otto engine in this phase is the almost instant dumping of all the heat input at once upon the spark plug firing. There may be advantages in power with this burn profile, but it certainly is not the same as the Carnot Cycle's burn profile and therefore its suboptimal for efficiency. The standard Diesel is really not that much better, because although the Diesel is touted as a "Constant Pressure" burning engine, in reality, most Diesels are not that much different from the Otto engine's burn profile, at least from the perspective of the Carnot Cycle.

In the past, significant modification of this quick burn time has been limited by the technical constraints of high-pressure fuel injection, and perhaps an absence of motivation to change it other than for pollution reduction reasons. But recent advances in Common-Rail Fuel Injection (CRFI) introduce the potential for significant modifications to the burn profile. CRFI has come so far as to be featured in the July 2006 issue of Popular Science (page 44) describing how the Audi R10 TDI racecar became the first Diesel-powered car to win a major auto-racing event, Florida's 12-hour Sebring endurance race. They claim a key technology was their piezoelectric (PZT) CRFI system that closely followed prescribed controls for maximum power, efficiency and low emissions, while simultaneously helping to eliminate slow starts. A quick survey reveals some of the newer PZT CRFI systems can produce over 5 fuel pulses during one injection cycle. It therefore appears feasible to use a variant of this technology to meter out a precise heat input profile as called for in FIGS. 1*a* and 1*b*, thereby further increasing the similarities between Applicant's new engine and the Carnot Cycle required for maximum efficiency.

Deriving Carnot-Diesel Cycle Engine Mechanics

We finally address the aforementioned Difference 6 in the numbered list of differences between the Carnot and Diesel cycles, which is arguably the largest loss mechanism found in conventional engines. This mechanism is the loss of potentially useable residual power that is allowed to escape out the exhaust port during process "4"-"1" in FIGS. 2 and 3*a* and 3*b*. This happens both because there is no isothermal compression stroke cooling as is called for in the Carnot cycle and because subsequently the power stroke is not long enough to extract all the power in the heated working medium.

References [1] and [2] focus more on the compression aspect of the efficiency problem rather than the expansion part of the problem. This is no doubt because Tinker's revelation was about the dynamic (versus static) role of the compression work in the efficiency of an engine as illustrated in FIG. 11*a*. Tinker's key realization is that the compression work for the next cycle has got to come from somewhere and that it has causal relationship with the prior cycles, thereby setting up a feedback loop. Essentially the compression work for the next cycle must be subtracted from the work output of the working medium in the current cycle, thereby reducing the net work from the current cycle. This would naturally show up as a reduction in efficiency versus a cycle that did not have such a compression requirement. However, its worse. That same compression work derived from the prior cycle and passed onto the next cycle, had to have been generated from some of the heat (fuel) consumed in the prior cycle, and the conversion of that heat into the compression work for the next cycle was taxed by the efficiency of the engine in converting that heat (fuel) to work in the first place. Therefore, we see that the compression work feedback loop model reveals what is in fact a double penalty for the compression work: 1) The compression work must be subtracted from the potential net work that the working medium might be able to produce without having to provide the compression work for the next cycle, but then too, that compression work must derive from a quantity of heat (fuel) that is larger than the compression work by the factor of the inverse of the efficiency of the engine. It is this process that takes what might have been a 50% efficient Otto engine as computed under the old classical thermodynamic efficiency equations, to a 25% efficient engine as computed by Tinker's efficiency equation which is shown in FIG. 11*b*.

Figure 12A:
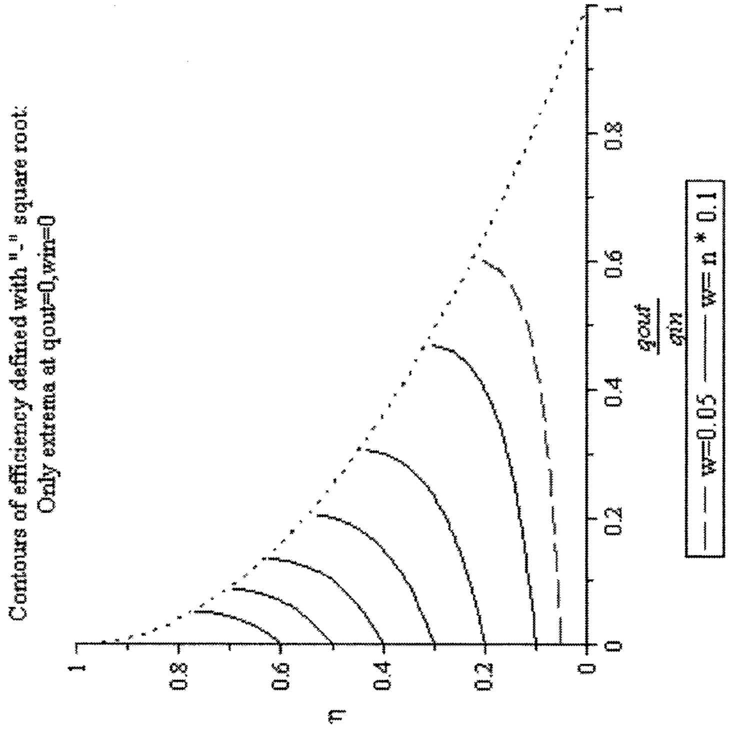
FIGS. 12*a* and 12*b* show optimization plots of the Tinker equation
Figure 12B:
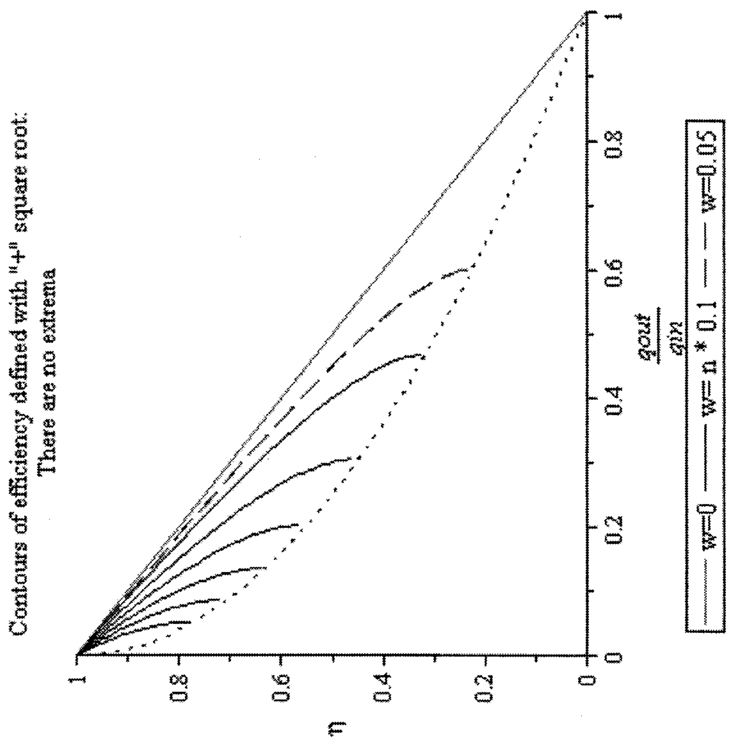

A key interesting aspects of Tinker's efficiency equation is the triple dependence on the input heat Qin the output (waste) heat Qout, and the compression work, Win; the admission of two solutions, and the admission of possible complex efficiency via the square root of possible negative numbers. These are all discussed to some extent in reference [1], further characterization is possible such as shown in FIG. 12 which plots the equation of FIG. 11*b* with respect to its constituent variables mentioned above. The dual values of efficiency are clearly visible in this plot, but so too is the realization that certain operating regimes can promote efficiency enhancement easier than others. For example, an operating regime on a flat area of a curve with respect to efficiency will be harder to optimize with respect to the ordinate, whereas are area of the plot with a large gradient between curves that take us to higher effieiciency quicker via the alternate variable would be preferred. By taking the derivative from the well known Calculus of the new equation of FIG. 11*b* from [1], one may then optimize the engine as a function of its core thermodynamic variables and then too its state variables as well. For example, examination of the new Tinker equation from FIG. 11*b* through the analyses of FIG. 12 shows that reduction of compression work and decrease of waste work by recovery of more net work from the cycle produces a significant increase in efficiency.

In fact reference [2] has proposed a related method for improving the efficiency of reciprocating heat engines they call the "Engine Cycle Interdependence Frustration Method" (ECIFM). The theory on which the method is based claims unprecedented success in modeling internal combustion engine (ICE) efficiencies as reported in the scientific literature. It claims to nearly exactly reproduce the as-yet-unresolved, 1959 discovery of a 17:1 compression ratio efficiency peak. Specifically, this method claims to identify a flaw in all existing ICE implementations that prohibits them from achieving the efficiencies predicted by the universally accepted fuel-air cycle model. This purported flaw is claimed remedied by the ECIFM using current ICE designs on new and, with aftermarket products, even existing engines. This is claimed to equate to an approximately thirty percent increase in heat engine efficiency.

Figure 6:
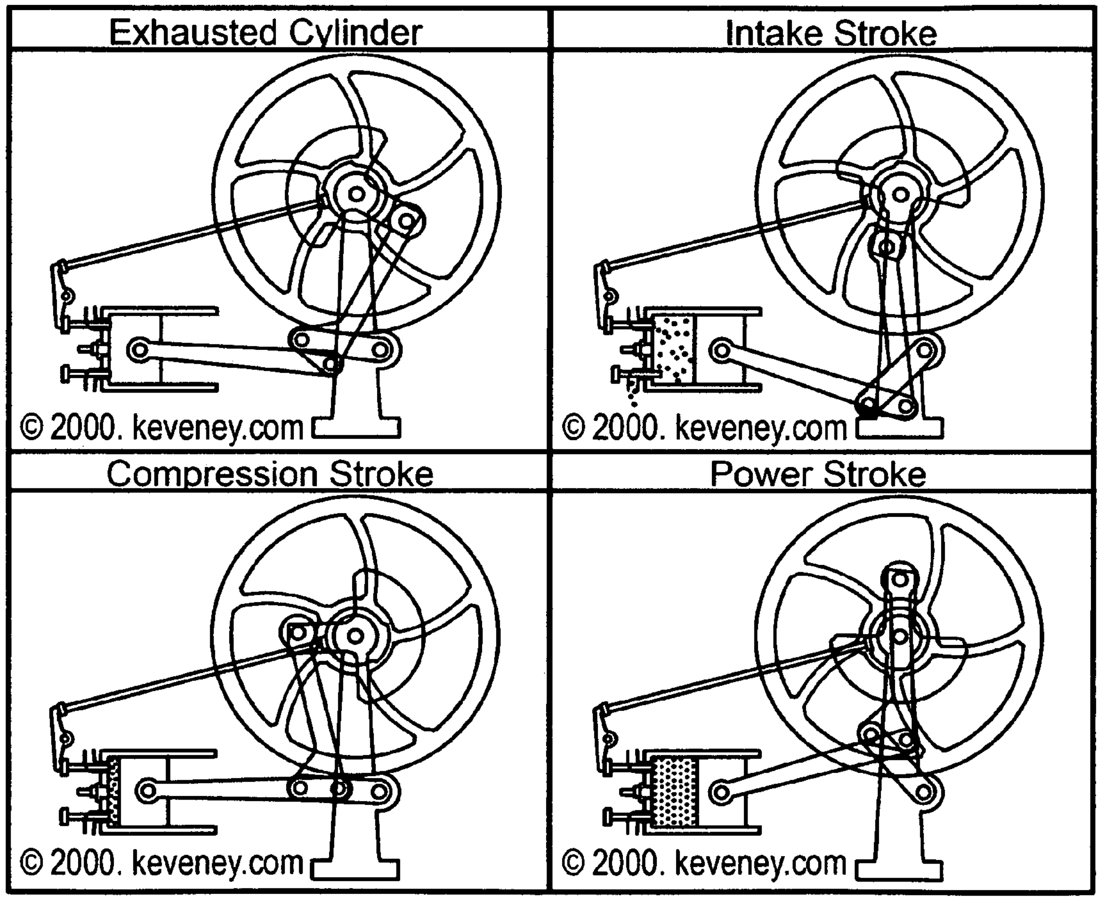
FIG. 6 is shows the Atkinson Cycle
Figure 7A:
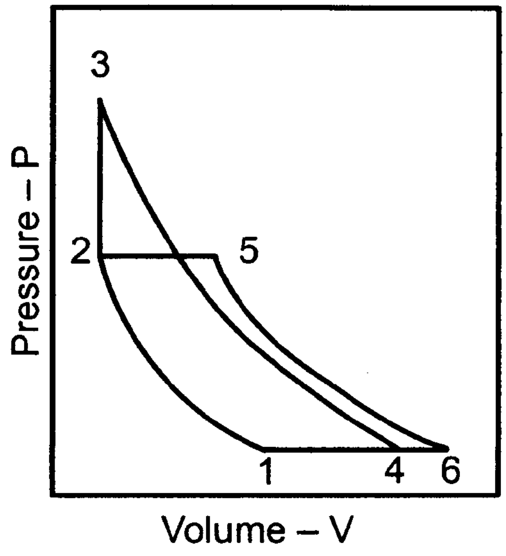
FIGS. 7*a* and 7*b* show the Humphys and Brayton Cylces
Figure 7B:
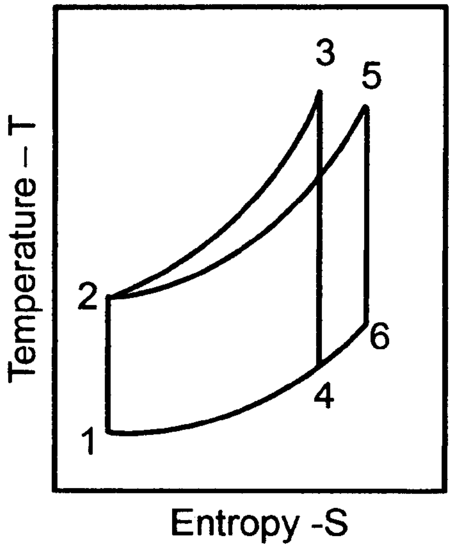

These revelations are intriguing and worthy of further investigation. But Applicant's examination of the ECIFM concept revealed possible conceptual as well as possible mechanical implementation issues with the ECIFM approach proposed in [2]. However, this examination also led to the belief that Tinker has done the Physics correctly. Consequently, we look for other methods for achieving Tinker's goal, via not lose the energy out the "4'-"1" phase (i.e. out the exhaust port). Towards this end, Applicant recognizes that just as with the Atkinson cycle, if the power stroke can be made larger with respect to the intake stroke, as shown in FIG. 6.

Various means have been proposed to instantiate differences between the compression stroke and the power stroke, the method of Atkinson just one of many. But these all fail to produce but a small token increase in efficiency, typically measured as single digit percentage increases (or less). The reason for this is both a matter of conception and a matter of degree. The matter of conception is that with few if any exceptions, all methods to decrease compression work and/or increase expansion work center their conceptual reference around the concept of compression ratio. This is no doubt because they have been taught in school that the efficiency equations for the Otto and Diesel engines described earlier are functions of the compression ratio. That is, the prevailing conception in the art is that it is the compression ratio that needs to be increase in order to increase the efficiency of engines. This is at best a limited view of the efficiency, and at worst, it is most generally a false view because those efficiency equations containing the compression ratios are derived equations, not fundamentally defining equations. Tinker's equation of FIG. 11*b* is a fundamentally defining equation because it applies to ALL thermal engines regardless of type. The efficiency equations with compression ratios are specifically derived formula for a specific type of engine under specific construction and operating cycle method. In other words, it cannot really be fully optimized because its design and operating method and regime have already been fixed and are no longer variable: otherwise they could not have employed the compression ratio parameter in the first place since that by itself is not a fundamental thermodynamic parameter, but a subsequently defined parameter defined by the specifics of the engine.

The matter of degree mentioned above comes about partially because of the matter of conception. That is, given that we have a compression ratio, then in an Otto cycle engine the prevailing art holds that the compression ratio cannot be made greater than about a factor of 10, or else the engine will suffer the deleterious effects of preignition and knocking. So one is held to the believe that one cannot raise the compression ratio above 10, and since the compression ratio is the defining term in the efficiency equation for Otto engines, that limits the efficiency to low values. Compression ratio increases are thereby limited to small increases of one out of 10 or so, and then only with copious very careful engineering to ensure avoidance of engine damage as well as possible emissions control problems. The same holds true with other methods such as the Miller cycle where only a few percent of the intake stroke gas volume is allowed to regurgitate through the intake valves. The efficiency improvement is measureable, but hardly likely to solve the energy crisis.

It is a purpose of the current invention to teach that dramatic increases in efficiency require dramatic changes in the operating parameters and schema of current engines (or new engines). It is a further purpose of the current invention to teach that viable efficiency improvement means have been rejected or not applied to obtaining significant efficacy improvements (defined as large double digit percentage improvement values) due to practitioner discriminate against doing so because of their extremism, and this has placed those efficiency improvement means completely outside of the practice of the art due to the perceived unheard of large values involved: that is, the new recognition that many prior improvements in efficiency were small, simply because the practitioners did not realize or did not believe that larger gains could be had simply by extrapolating their techniques to the extreme.

By way of example, consider a Diesel-like engine with a very high compression ratio of about 20:1. Better yet, consider a gasoline Otto engine with the same high ratio. Such an engine, if it could be built, would present a huge increase in efficiency over standard Otto engines, well over 60%. But most schooled in the art would claim such an engine could not be built. And they would be right IF we insist that the compression ratio must be the same as the expansion ration. But why? Why must the compression ratio be the same as the expansion ratio? There is no physical reason that these two parameters must be coupled, as they do not show any codependence in the thermodynamic relations except those that we might impose as a constraint. So consider an engine that has an acceptable compression ratio of 10:1 and a highly desirable expansion ratio of 20:1. That is, we desire the air (or a fuel-air mix) to be compressed by a factor of 10, but we want the expansion to exceed that to a factor of 2. These numbers are used just to keep the math simple: more realistic values might be preferred in an actually specific application.

Figure 13A:
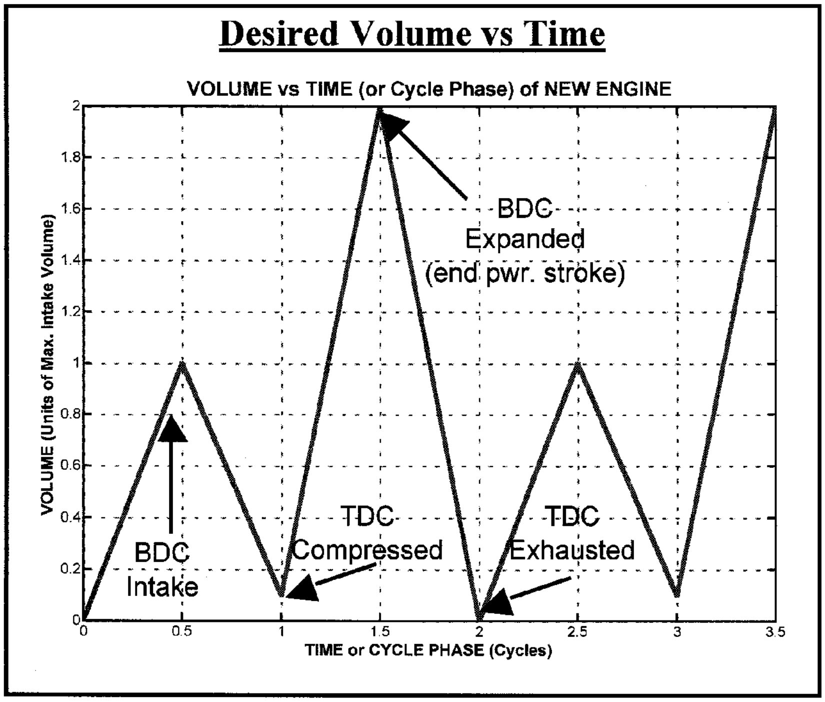
FIGS. 13*a* and 13*b* show the Carnot-Diesel cycle and Fourier Transform

Such an engine would have a dramatically reduced compression work visa vie its expansion work cycle. This has a direct and significant impact on the efficiency as measured with Tinker's equation. A simplified "stick" drawing of the volume profile of such an engine is illustrated in FIG. 13*a*. It follows most closely after the Atkinson cycle, leaving a small volume for the air at the end of the compression stroke, but interestingly not retaining any volume upon the end of the exhaust stroke, thereby expelling the exhaust gases fully. We are therefore confronted with the need to devise an engine with one volume for compression and another for expansion. Our solution approach is somewhat unorthodox as we will use Signal Processing techniques to design our engine.

Figure 13B:
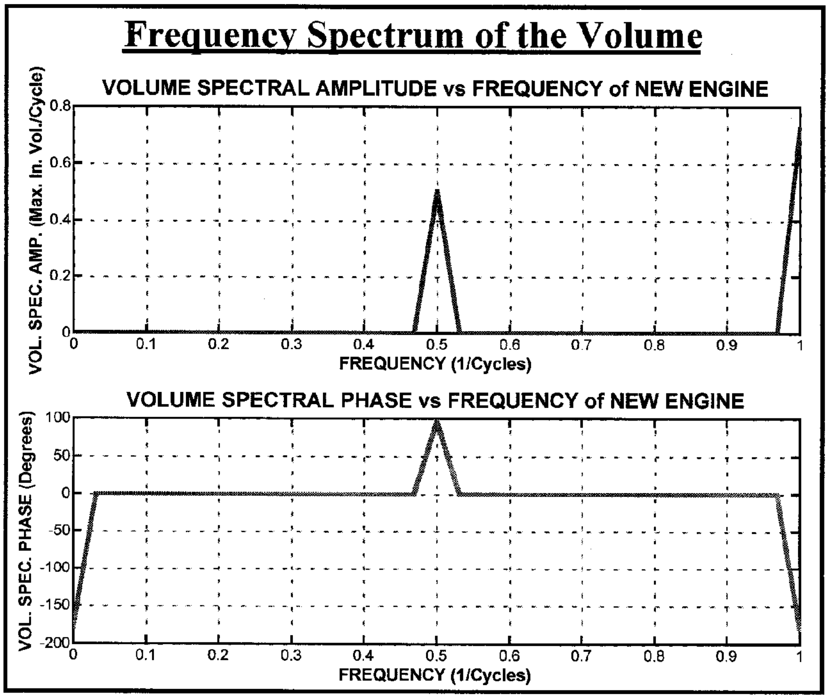

To mechanically realize this volume profile, shown in FIG. 13*a*, (or any other profile we might desire) we take the Fourier Transform and produce the amplitude and phase spectrum of the volume profile. The results are shown in FIG. 13*b*. What we have just done is somewhat obvious and yet somewhat subtle. We have just taken an arbitrary desired volume versus time profile, specifically the volume profile needed to produce our new Carnot-Diesel engine, and we have decomposed it into sinusoidal cycles through Fourier decomposition. We see in the amplitude spectrum of FIG. 13*b* that there are only two frequencies present in the spectrum of the volume profile, one at the fundamental rate of revolution of our engine, and one that is half as fast. Furthermore, the second slower frequency is about ⅔ the amplitude of the faster frequency, and it has about a 90 degrees phase shift. In approximation, and for simplicity of discussion, and without any loss of generality, the amplitude of ⅔ can be approximated as ½.

Consider that cylinders in pistons produce cyclic stroke motions, and the meaning of the two frequencies in FIG. 13*b* becomes clear. FIG. 13*b* is telling us that if we combine two cylinders, one having a volume about twice the other and the piston in the larger cylinder geared to oscillate twice as fast as the smaller, and with an initial phase difference between them of about 90 degrees, then they can together produce the desired volume profile of FIG. 13*a*. In other words, FIG. 13*b* is describing what some might call a split cycle engine (one nominally with a "U" head) dual crank shafts that rotate with a 1:2 rational rate differential. Except in this case the cycle is not split, but joint. We further note that this Fourier Transform can (at least theoretically) reduce any desired volume profile into a mechanical embodiment of oscillating pistons that will faithfully reproduce the volume profile. Obviously as the volume profile gets more complicated, it infers more cylinders added to the Fourier decomposition. But as long as the volume profile is not too complex, it can be accurately embodied with this method.

Figure 14A:
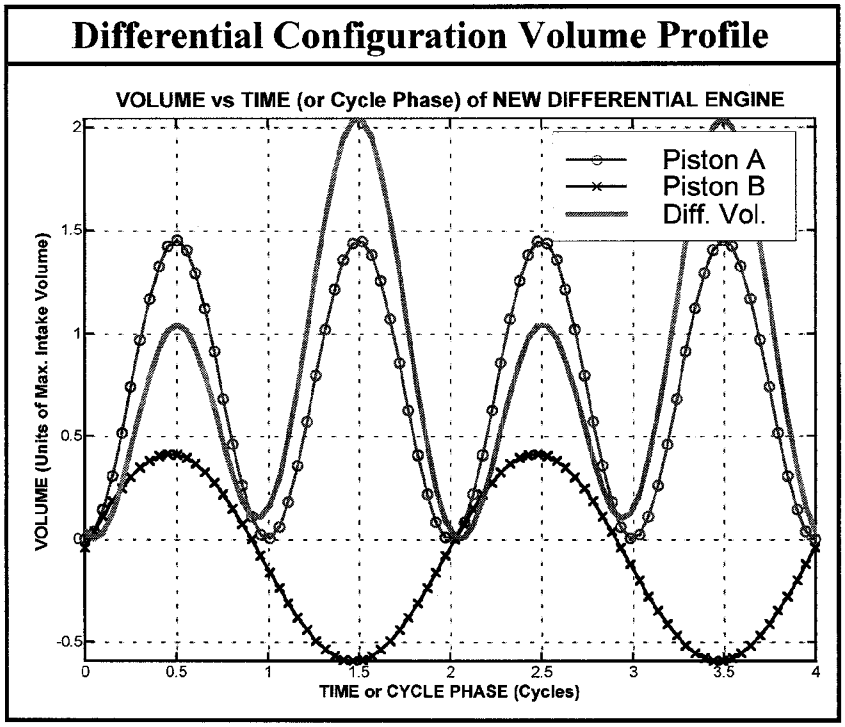
FIGS. 14*a* and 14*b* show the Differential and Non-Diff Volume Profiles
Figure 14B:
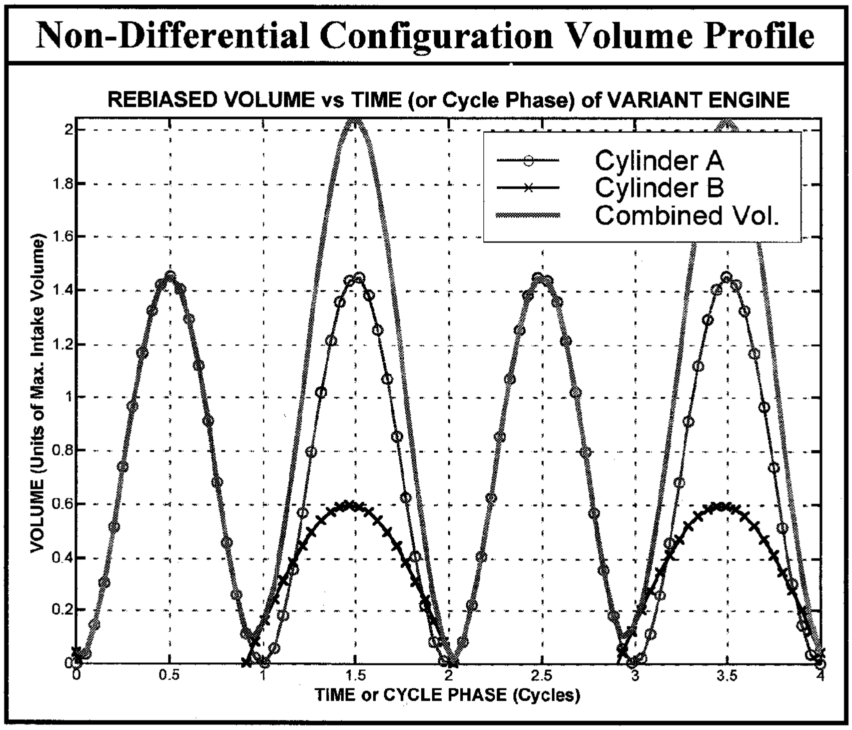

FIGS. 14*a* and 14*b* show the cycle volume profiles reconstituted from the amplitude and phase values of the two peaks in FIG. 13*b*. FIG. 14*a* shows the volume profile for a Differential Configuration of the new engine. This is mathematical generated using the amplitude and phase coefficients from the Fourier Transform values in FIG. 13*b* in a cosine series. If two diametrically opposed pistons (labeled "Piston A" and "Piston B" in FIG. 14*a*) occupy the same cylinder, and if a point inside the cylinder is designated as the zero displacement point (corresponding to zero on the vertical axis of FIG. 14*a*), and if Pistons A and B are made to follow the aforementioned cosine series terms in their displacement, then the vertical axis of FIG. 14*a* traces out the displacement of the two pistons A and B inside the common cylinder, and the volume trapped between the two cylinders is the "Diff. Volume" curve. Therefore the volume between the two pistons follows exactly the volume profile required of our Carnot-Diesel engine, i.e. a volume profile containing an expansion ratio that is twice as large as the compression ratio.

FIG. 14*b* shows what we call a "Non-Differential Configuration" Volume Profile. This profile has had the "negative volume" values eliminated from the Cylinder B volume profile (since negative volume is not physically realizable in a non-differential configuration), and replaced with zero volume values. This changes the Combined Volume profile to something different from the original in FIG. 13*a*, but we still have a desirable trait of the expansion ratio being larger than the compression ratio. It is obvious that by suitable modification of the Cylinder B stroke and/or area, that one may modify the expansion volume to most any physically realizable value desired. Not shown are other design variants that may have pragmatic value. For example, shifting the Piston B curve 90 degrees to the right in FIG. 14*a* can be made to produce a double humped combined volume curve which would at first appear less useful. But if one judiciously connects Piston B in and out of the combined volume with suitable valves, one can also get larger expansion ratios.

Figure 15:
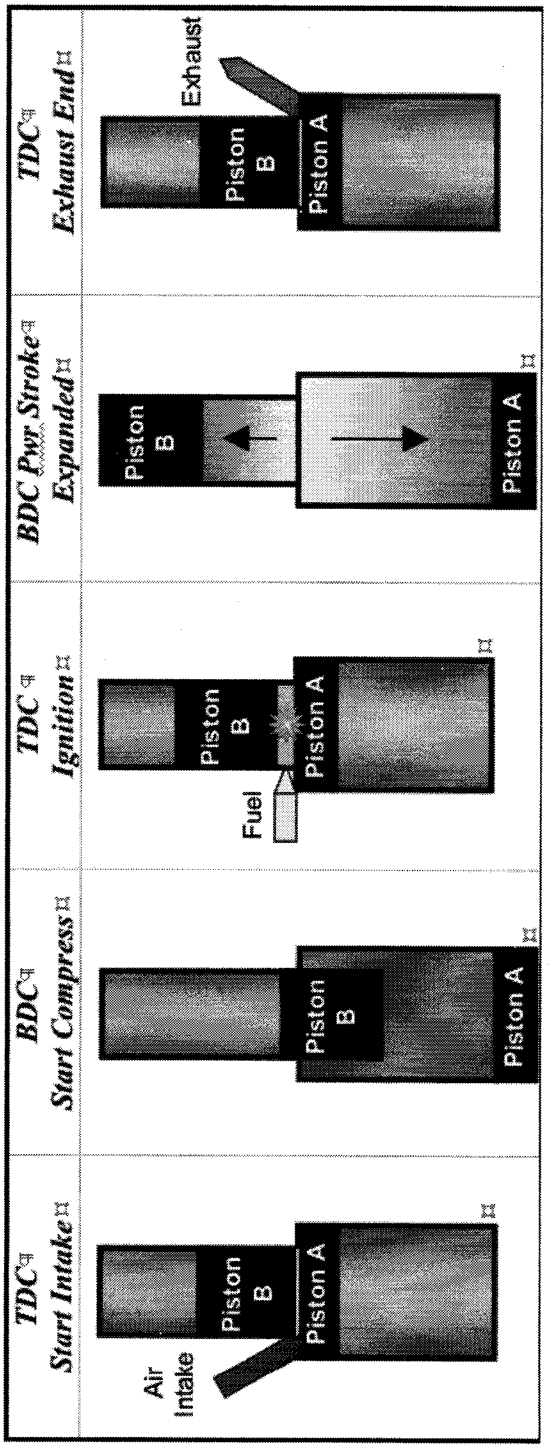
FIG. 15 shows a dual piston embodiment of the Carnot-Diesel Engine

FIG. 15 shows a possible embodiment of the aforementioned Carnot-Diesel Cycle engine where FIG. 15 corresponds to the Differential Configuration Volume Profile shown in FIG. 14*a*. Any of the myriad of different drive and linkage mechanism known in the engine, motor and mechanical linkage art may be used to coordinate the movements of pistons A and B and enforce their positions with respect to one another and with respect to the required displacement profile as a function of engine cycle time or phase angle as required by FIG. 14*a*. This set includes but is not limited by electromotive means such as linear or rotational motors, hydraulic means including hydraulic pistons and rotators, mechanical cams, mechanical leavers, mechanical channel followers, crank shafts, gears and pinions, and the myriad of possible combinations of these all purposed to enforce a substantially similar volume profile as shown in FIG. 14*a*.

A particularly interesting embodiment of FIG. 15 is wherein the motion of the pistons is defined by a simple crankshaft or cam driving the lower piston from below in FIG. 15 in identical fashion as in most Otto and Diesel engines, and a similar but different one driving the upper piston from above in similar but opposed manner. The difference between these two cylinders and associated pistons is that one pair maps out the volume profile of Piston A in FIG. 14*a* while the other maps out the volume profile of Piston B is FIG. 14*a*. The diameters and the piston travel may be selected to meet other engineering requirements of the engine design, so long as the combined volume between the two pistons follows the Differential Volume curve or FIG. 14*a* which through its extreme differentiation between compression and expansion ratios, combined with the resultant extremely high expansion ratio thereby instantiates our improved efficiency cycle. This gives the engine designer reasonable flexibility in defining cylinder diameters and piston travels to meet the various system requirements and user requirements. A similar design holds for the non-differential volume profiles of FIG. 14*b*.

Figure 16:
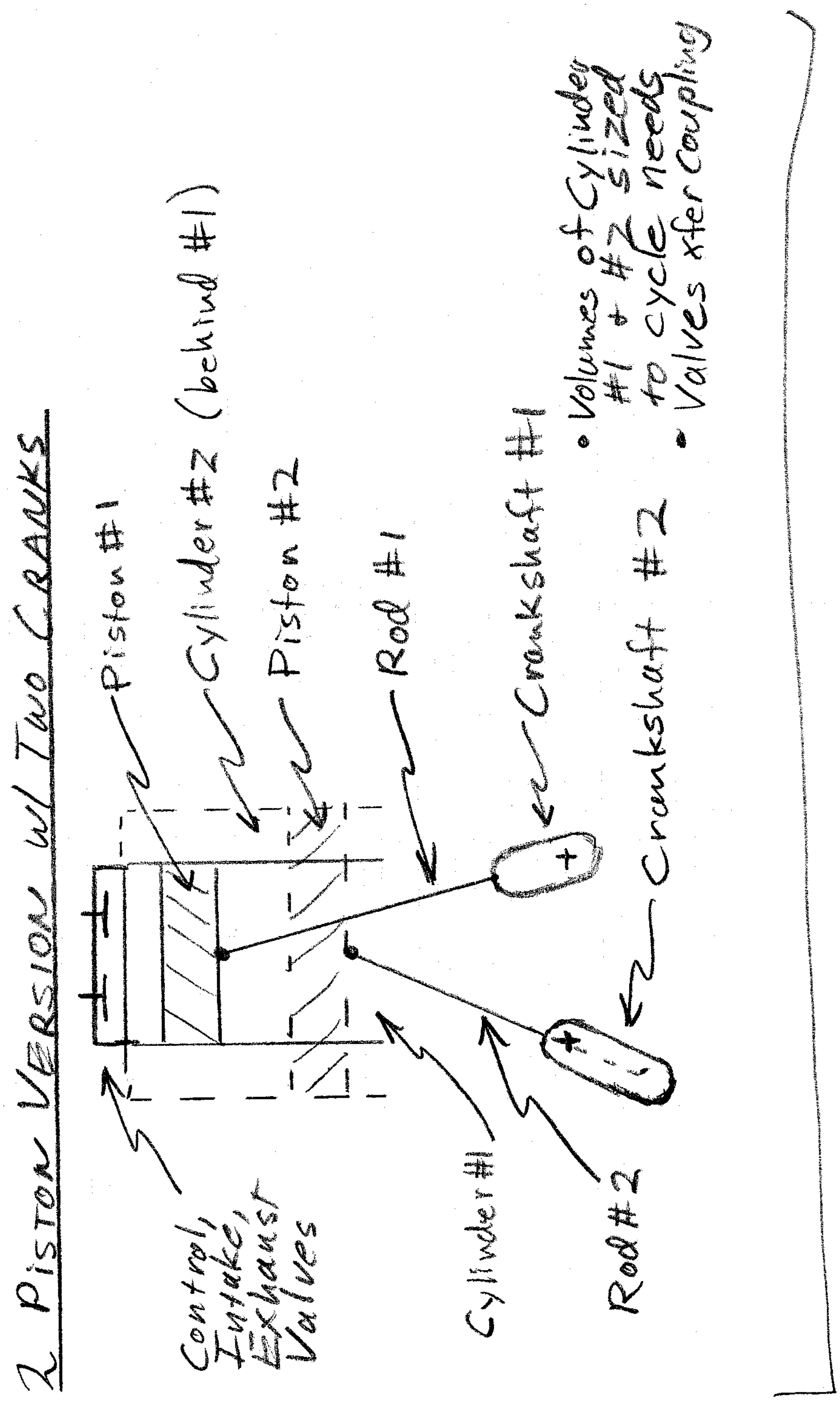
FIG. 16 shows a dual cylinder embodiment of the Carnot-Diesel Engine
Figure 17:
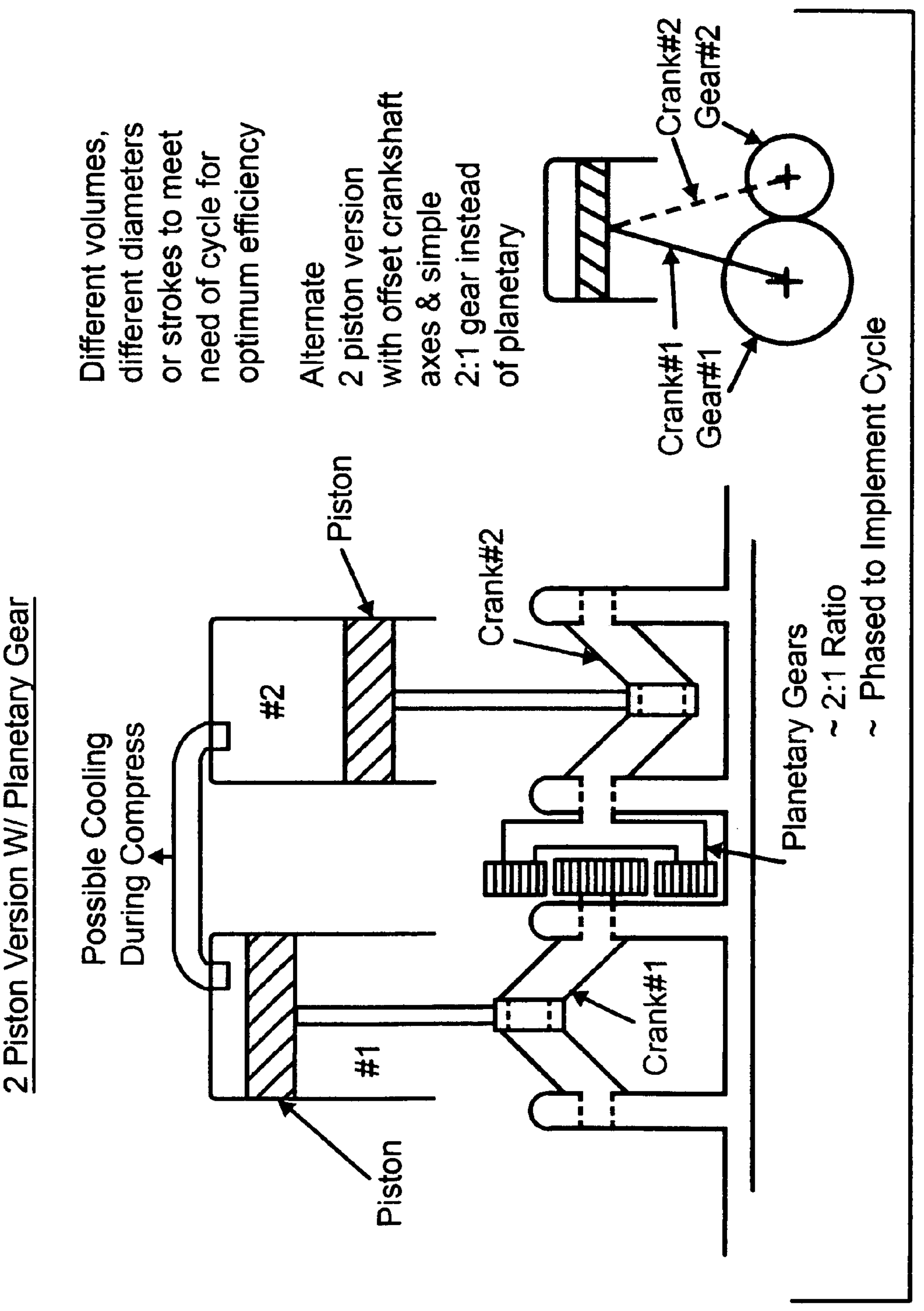
FIG. 17 shows a dual cylinder with planetary gear drive embodiment

Although FIG. 15 shows one particular embodiment of the improved efficiency engine, there are myriad other electro-hydrolic-mechanical instantiations that might be devised that could map out the volume profiles that produce high efficiency such as exemplified in FIGS. 14*a* and 14*b*. To cover them all would be impossible in this disclosure although their existence is acknowledged as one skilled in the art of such devices will attest. But by way of example, Figure illustrates a similar arrangement to that of FIG. 15 except that the cylinders are separate as opposed to conjoined as in FIG. 15. This would embody the Non-differential form of FIG. 14*b*. Two crank shafts are used and joined to the two (in this case) inline cylinders. The cranks have different throws in accordance with the different amplitudes related to the volumes from FIG. 13*b*. Additionally they are slaved together with gears or toothed chains or toothed belts or other means, the joining slaving means also instantiating the period differences as called for in FIG. 13*b*, and their relationship has a substantially 90 degree phase differential with respect to their placement of their respective pistons on to the other also as called for in FIG. 13*b*. FIG. 17 shows a similar again relationship between the similar cylinders of FIG. 16, but this time the two pistons are made cooperative via a planetary gear system that instantiates the required periodicity difference required by the cyclic amplitudes of FIG. 13*b*. The phase differential of FIG. 13*b* is set by the position of the pistons one to the other at the time the planetary gears are meshed.

Figure 18B:
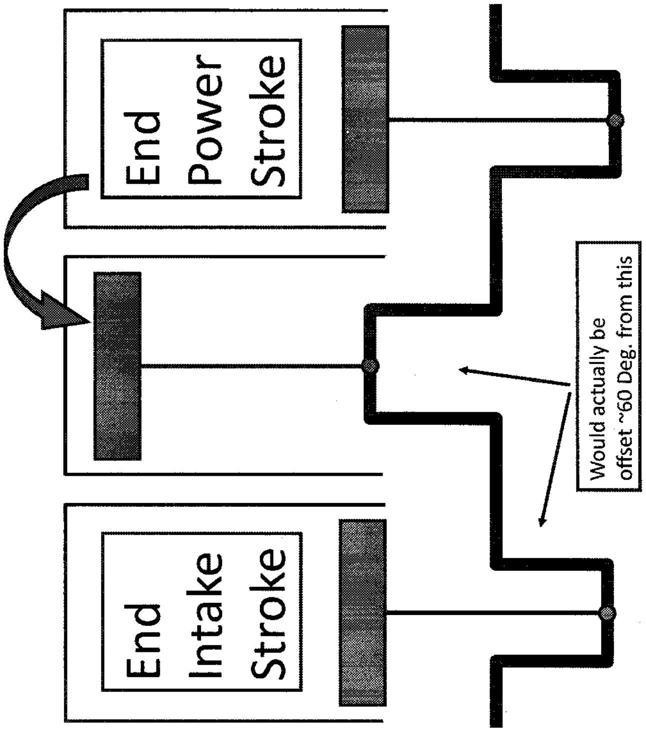
FIG. 18 shows a three cylinder embodiment
Figure 18A:
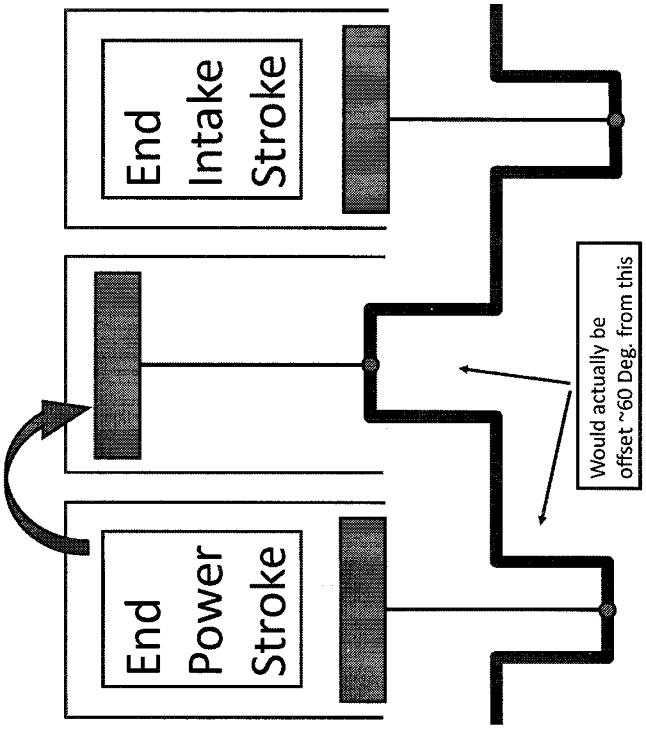

A related but somewhat different instantiation is shown in FIGS. 18*a* and 18*b*. In this arrangement the middle of 3 cylinders is an extra expansion cylinder for the other two cylinders on either side. Each of the two end cylinders alternately share the middle cylinder for providing the extra expansion called for in our new engine after FIGS. 13*a*-14*b*. For balance purposes, the crank might be offset by 120 degrees for each crank through as indicated in the figure with the remark of the it being shown 60 degrees off of what is illustrated. This would incur a slight loss in the optimum timing but for the gain of better vibration performance. But it could and ideally would operate best in opposition as shown in the figure. By this means, the middle cylinder operates essentially like a 2-stroke cylinder having a power stroke alternatively for the left and the right cylinders. Alternatively the left and right cylinders open their exhaust valves at BDC but the exhaust is rounted to one of the middle cylinder's intake ports with or without the valve being present, but if present working in unison with the left and right cylinder's exhaust valves respectively. The hot and still pressurized exhaust gases move to the middle cylinder and then provide additional expansion and thereby power to increase the efficiency of the engine. At the BDC of the middle cylinder, its exhaust valves open to let the pressure finally escape. Meanwhile, the original left or right cylinder would have closed its first exhaust valve connected to the middle cylinder and opened possibly its second exhaust valve to the atmosphere for final venting. The cycle of the middle cylinder repeats for the other end cylinder in opposition phase to the first. This is all coordinated to provide significantly more expansion ratio as called for in the design. An added benefit of this arrangement is that the carburetion and emissions systems for the outer cylinders can be left substantially intact. Other multi-cylinder alternatives are now also immediately obvious.

One thing that is not so obvious in any such arrangement is that the distance from the exhaust port from the outer cylinders to the intake port of the middle cylinders should be made as short as possible to ensure minimal enthalpy loss which would translate to thermal efficiency loss. This applies equally to the use of turbines as shown later in this disclosure. The solution is to simply arrange the cylinders so that there is a shortest possible distance between the cylinders along the connecting ports with also a smallest volume of that channel that does not restrict flow detrimentally. Other than close proximity, placing the valves on the sides of the cylinder walls nearest the other cylinders is one arrangement. Placing the cylinders with heads opposing is another possible arrangement to minimize this distance.

Another arrangement not shown is where the head of one cylinder is arranged to the tail of another cylinder, said cylinders arranged end to end in a circling of the wagon train arrangement. These cylinders would employ double acting pistons and be phased one to the other so that the exhausting from one's head then powers the tail (opposed side of its piston) of the cylinder in front of it, thereby providing the same high expansion ratio as desired herein.

One particular class of instantiations though is particularly worthy to call out since it is easy to realize with simple rotary mechanisms such as cams, wheels, gears and crank shafts, all of which are well demonstrated in the art of engine and mechanical design. Referring back to FIG. 13*b*, the mathematical interpretation of this spectrum is that of the sum of a series (a series of 2 in FIG. 13*b*) of cyclic constituents, completely in accord with the mathematics of Fourier Series. Therefore, any conceivable volume profile of FIG. 13*a* may be constructed with a coherent summation of base cyclic elements, the said summation either being performed by each cyclic elements independently influencing the volume of the engine as demonstrated by the example in FIG. 15, or alternatively or in partial cooperation with the methods such as the example in FIG. 15, a summation of the cyclic motions together first, and then that resultant being applied at a single or few points to the engine volume, such a one piston in a cylinder. Stated another way, we can have multiple pistons each driven by one of the cyclic constituents and each applying this constituent to a mutually shared volume (example of FIG. 15), or, we may add all the constituents together and then apply their sum to a single cylinder applied to a single cylinder. One could also envision combinations of these methods, although with two cyclic constituents, its either one or the other.

Figure 19:
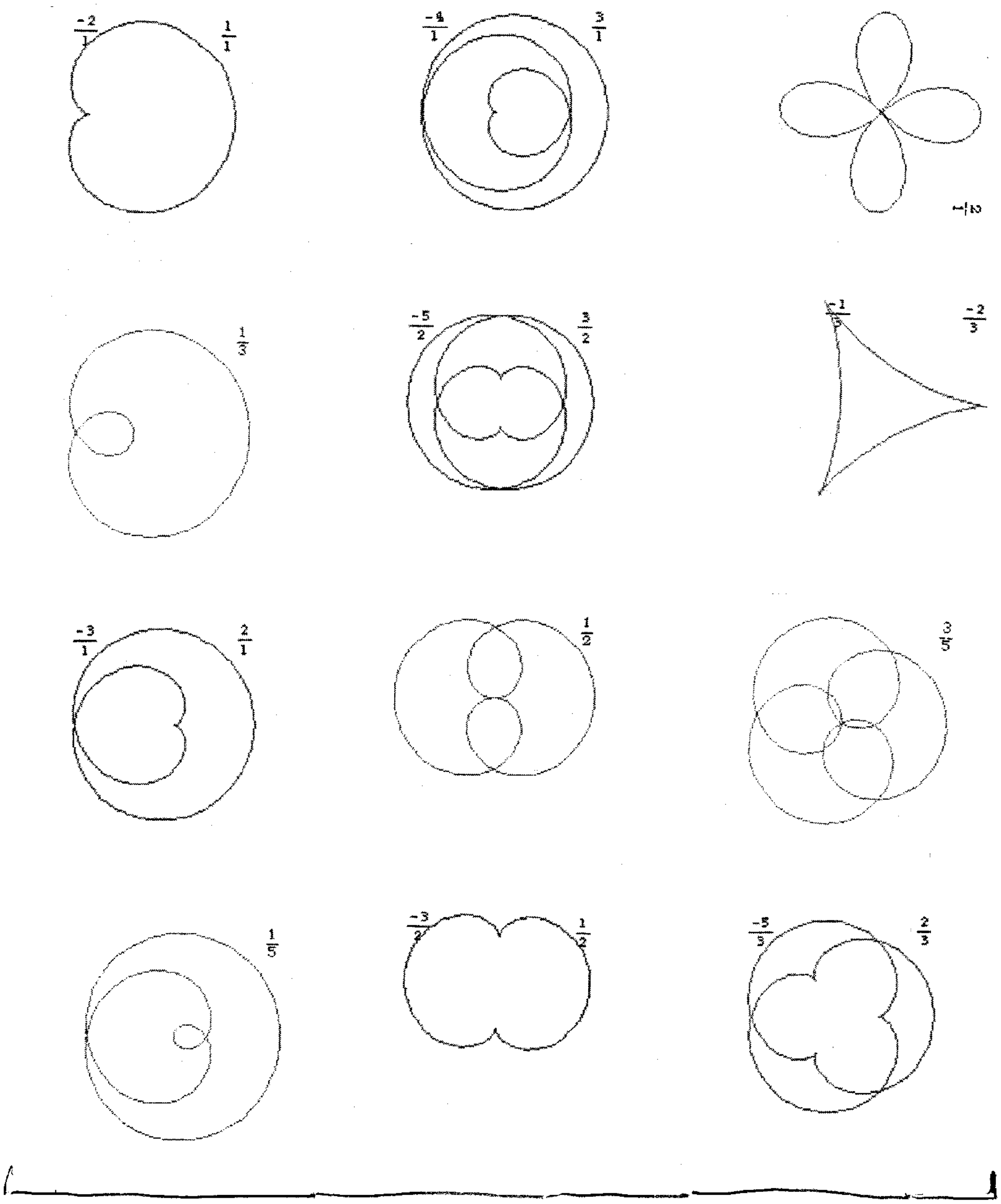
FIG. 19 shows example Trochoids

Of particular interest in instantiating the single application method described above is the class of cyclic addition mechanism described by the mathematics of the Trochoid and its subordinate classes. A Trochoid is class of Roulette defined by the tracing of a point on a circle that is rotated with friction upon the perimeter of another circle. The generating point of this curve is any point fixed with respect to the circles in question. Further definition of the radii and generating point creates subclasses of the Trochoid, such as Hypotrochoids, and Epitrochoids, and thence Epicyclodes, and Hypocloids and further Limacons, Rosettas/Rose, Trisectrix, Cycloids, Cayleys, Tricuspoids, and Trifoliums, to name but some of the major subclasses. By changing the defining parameters for these Trochoids, one can generate a myriad of different cyclic shapes with many interesting properties. Some examples off potentially interesting (for the current application) Trochoids is shown in FIG. 19, although this by no means a limiting set. By examining these different possible Trochoids, one can invariably find one or more that will sweep out a pattern via their evolution as a function of the sweep angle, almost any profile one might desire, or a close approximation to said profile, visa vie, the displacement necessary to instantiate the volume profile of FIG. 14*a* or more crudely 13*a*. Conversely, and in particular, if we look at the amplitude and phase relationships of the constituent cycles on FIG. 13*b*, the amplitudes and phases of the constituents really define the parameters of the specific Trochoid needed to instantiate that spectrum, and by coherent addition of motions produced by the Trochoids, instantiate the volume of FIG. 13*a* or more smoothly 14*a!*

That one specific Trochoid or another may be used for the purpose of engine design is not specifically new: the Wankel engine is a particular well known Trochoid used to instantiate a successful (if not particularly efficient) engine design. Nor is it all all true that all Trochoids can be used as the basis for an engine with any particular desirable qualities. What is true, is that through the spectral decomposition of the volume as illustrated in FIGS. 13*a* and 13*b*, we can now specify which particular Trochoid or subset of Trochoids will produce a specific volume displacement profile that will give us a maximally efficient Carnot-like design. And, since Trochoids are defined by the linked relative motions of circles, it is immediately obvious with this method of design what mechanical instantiation will render this desired volume displacing motion. Further, by stacking Trochoids one to another in a daisy chain fashion, one may enact more complex motions for more complex volume profiles in an engine. By example, we might choose to add two additional points to the volume curve of FIG. 13*a*: one that would embody the end point of the desirable aforementioned isothermal cooling phase in the early compression phase of the cycle, and one that may embody the desirable aforementioned isothermal heating phase in the early part of the expansion phase. These two additional points will, by the Nyquist Theorem, result in an additional cyclic frequency component in the spectrum of FIG. 13*b*. This spectral component would represent an additional wheel or gear to be added to a 2 wheel Trochoid. In this manner, any number of mechanical cyclic mechanisms may be designed to instantiate a theoretically arbitrary volume provile in FIG. 13*a*, albeit our strong preference is for Volume profiles that produce high efficiency while still meeting the other system requirements.

Figure 20:
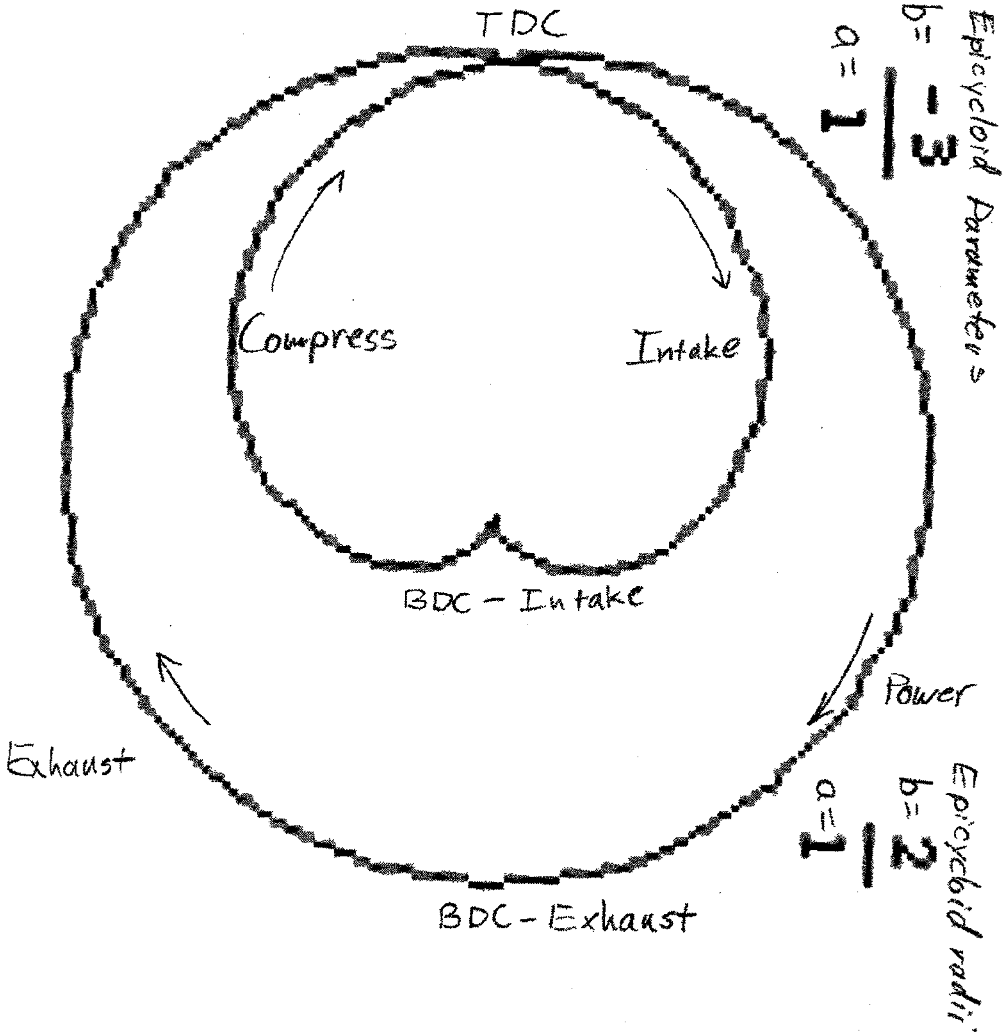
FIG. 20 shows a Epicycloid used to instantiate the very high expansion ratio

By way of example, FIG. 20 illustrates the motion of an Epicycloid set of gears generally configured to produce the motions needed to sweep a piston in a cylinder to produce the volume profile of FIGS. 13*a* and 14*b*, and how those motions would manifest if for example, the motion were that of the end of the piston rod in a piston/cylinder engine arrangement. Thus, a single cylinder and piston, can when driven by this Epicycloid drive, map out the same or similar volume profile as instantiated with the two piston version illustrated in FIG. 15. This has potential benefits in a smaller engine design, albeit with likely a somewhat more complex and costly gearing mechanism, since gears are likely more expensive to produce than the double journaled crankshafts that might be used in the drive mechanism of FIG. 15. But that is the trade to be performed by the design engineer to achieve the design objectives with a very high efficiency embodiment. The Epicycloid can be chosen from the available parameters of such Trochoids to include the radii of the circles, and whether one circle runs inside or outside the other. Additionally, there are selections of Hypocyloids which can also map out the same type of pattern as given in FIG. 20. Therefore, there are a number of different Trochoids that can provide the volume profile that instantiates very high efficiency engines, all so derivable from the amplitude and frequency spectrum of FIG. 13*b*.

Figure 21:
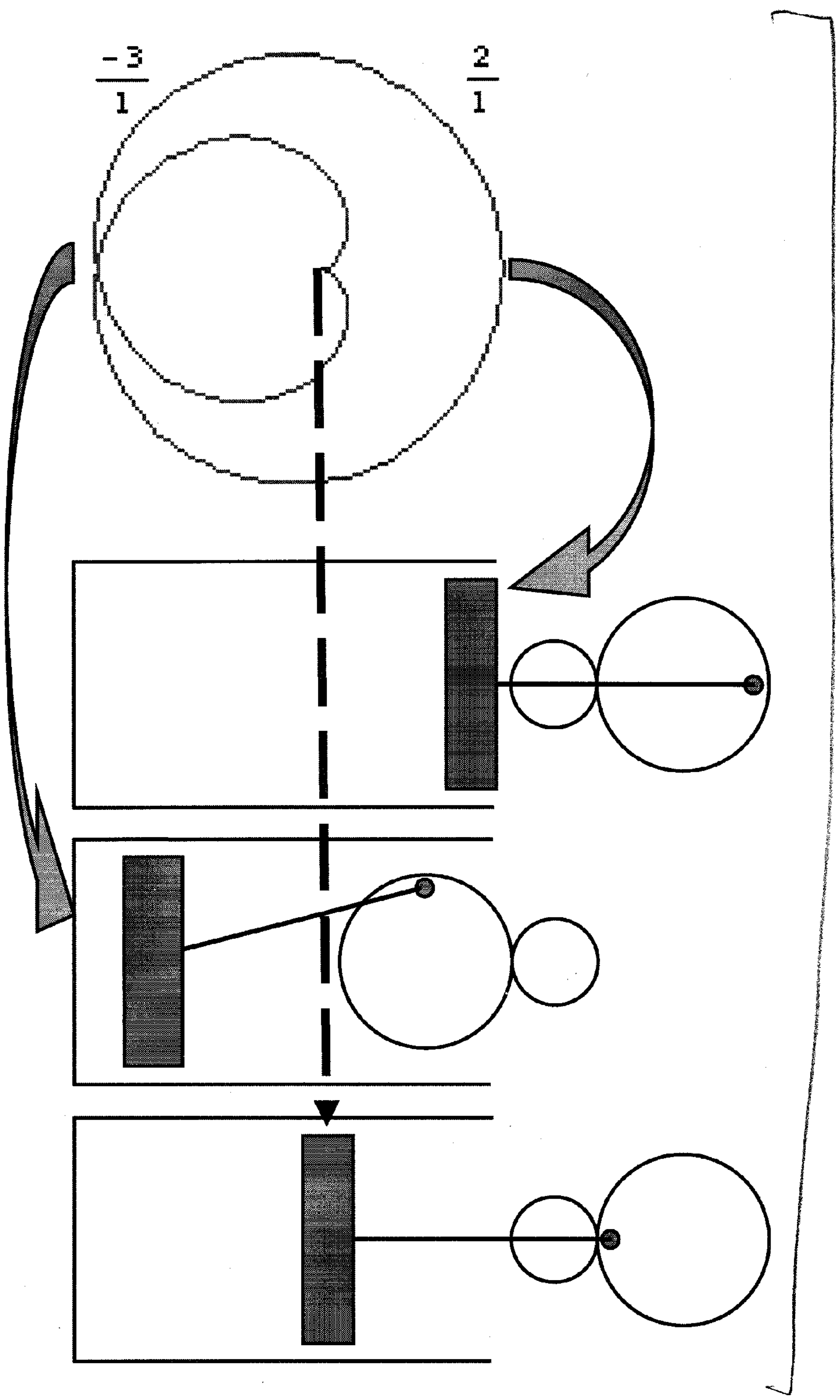
FIG. 21 shows use of the Epicycloid to drive to the motion of the pistons
Figure 22:
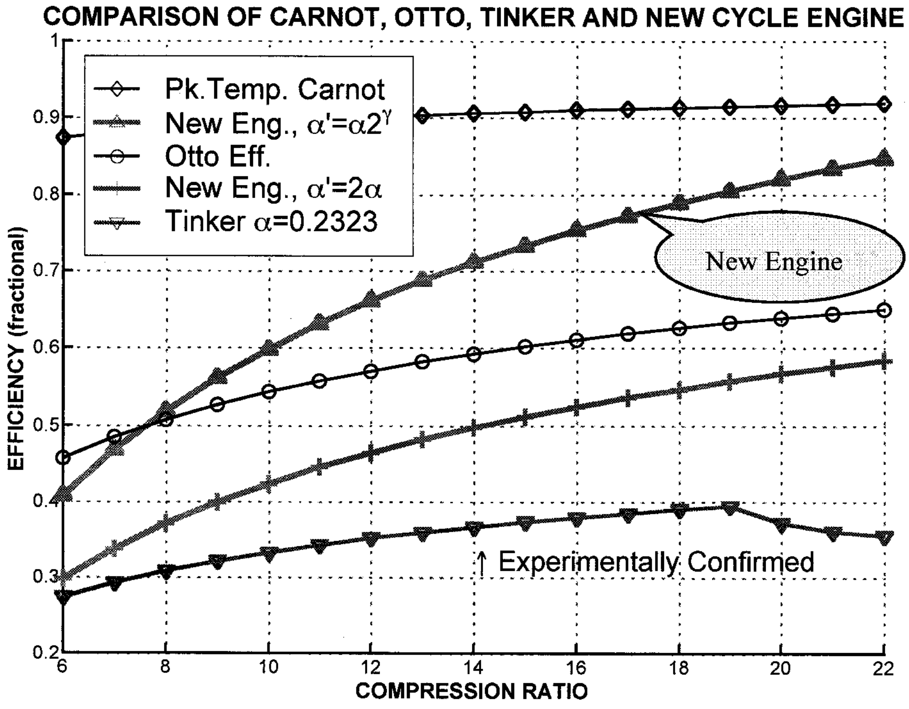
FIG. 22 shows the dramatic efficiency enhancements

One aspect not illustrated in FIG. 20 but previously alluded to is the function of the Phase angle from the spectrum of FIG. 13*b*. FIG. 22 illustrates a Phase angle of zero. But the actual spectrum specifies a Phase angle about 90 degrees. This Phase angle relates to a rotational offset of the generating point for the Trochoid, such that at an alignment of the circle origins the generating point would not be collinear. This Phase angle serves to distort the symmetry of the Trochoid from its start point to its end point, and mid way which embodies the compression phase as illustrated in FIG. 19. This Phase angle therefore has the desirable property of differentiating the working medium volume in the cylinder between the Top Dead Center (TDC) position of the Compression phase, and the TDC position of the Exhaust phase. By suitable selection of the Phase angle according to FIG. 13*b* the volume in the cylinder at TDC of the Compression phase is left with a finite volume to hold the compressed air/oxidizer and optionally with added fuel to inhibit pre-combustion or generation of pollutants from excessive high temperatures, and yet the volume at TDC of the Exhaust phase is provided to be substantially zero, thereby ensuing a maximum expunge of waste working fluid products at the end of the engine's cycle, all working to help and provide maximum efficiency in the engine. FIG. 21 further illusrtrates how a Trochoid would instantiate the desired strokes and cycle in the piston of an engine's cylinder Efficiency of the Carnot-Diesel Cycle Engine At the end of all this design work, we now want to know the resulting efficiency of the new engine. As mentioned earlier, Applicant concurs with Tinker's revised physical theory of the thermal engine, and it is used to compute efficiency estimates for our new Carnot-Diesel engine. In particular we model the efficiency of the Differential Configuration as shown in the figures above with a Compression Ratio of 10, an Expansion Ratio of 20, and other parameters as used by Tinker with appropriate modifications as described below. The results are shown in FIG. 22, where plots of efficiency versus compression ratio are shown for Otto-Diesel engines and the proposed new engine.

To examine this plot, we begin with the lowest efficiency curve and work our way up. The lowest efficiency curve (upside down triangle markers) is the computed efficiency of a conventional Otto and Diesel engines using Tinker's model with a derived exhaust pressure ratio of $\alpha$=0.2323. The exhaust pressure ratio is the ratio of the pressure at point 1 in the cycle plot of FIG. 2 (i.e. the intake manifold pressure), divided by the residual pressure in the cylinder at point 4 of FIG. 2, i.e., just before the exhaust valve opens. This pressure difference represents lost energy from the cycle that does not get converted to useful work, and instead gets vented out the exhaust pipe. This curve shows a gradual rise in efficiency to about 40%. More importantly, it shows a drop in efficiency with compression ratio above about 19:1. In fact, a more realistic calculation done by Tinker (his FIG. 3) duplicates the 17:1 compression ratio efficiency peak. That this peak efficiency is real is easily verified by looking at the compression ratios of conventional Diesels offered in the commercial market. It is well known to those skilled in the art that Diesel engines do not significantly exceed a compression ratio above 18, in excellent agreement with the efficiency limit discussed above. For these reasons, we label this curve as being "Experimentally Confirmed".

Next we look at the second least efficient curve, in FIG. 22 the New Engine curve (curve with "+" sign symbols). This curve is computed with the exact same code as the Tinker curve just described, except there have been two parameter modifications. First, instead of setting the expansion ratio equal to the compression ratio as in the Tinker curve, we set the expansion ratio equal to twice the compression ratio. This is in keeping with our mechanical model of the Differential Configuration shown in the left panels of FIGS. 14*ab*-14*b* and FIG. 15. Second, we acknowledge that with a larger expansion ratio, the aforementioned exhaust pressure ratio must be less, and since the expansion ratio is twice the compression ratio, we assume a reasonable first approximation that the pressure at the end of the power stroke is roughly half of what it was before, leading to a revised $\alpha'=2\alpha$ parameter. The resulting efficiency improvement is striking. First, and probably most significant, the compression/expansion ratio limit on efficiency is gone. We ran this simulation up to expansion ratios of 100:1 and saw no sign of this limit. Therefore, the new engine signifies prospects for a new era in design with much higher expansion ratios for higher efficiency.

The second striking feature of the curve is that the efficiency at conventional compression ratios around 19 is about 56%. This is a significant increase in efficiency and since it is based on experimentally validated equations, we actually have a legitimate right to expect these to be realizable efficiency numbers. To ensure that we have not violated Physics, the third least efficient curve (curve with "0" symbols) plots the Otto Cycle efficiency with the old efficiency equation for these expansion ratios. We see that despite the improved efficiency of the "New Cycle" curve, it still has not even reached the efficiency of the Otto Cycle engine using the old efficiency equation, which suggests there is yet more efficiency to be had.

In fact, our aforementioned estimate of $\alpha'=2\alpha$ is just that: an estimate. If we substitute the correct value of $\alpha'=\alpha 2^{Y}$ for an adiabatic expansion, we get the fourth least efficient (second most efficient) curve (curve with upward pointing triangles). This curve predicts a phenomenal increase in efficiency to over 80% at a expansion ratio of 19. This is certainly higher than the Otto Cycle efficiency, but then we should expect this because our new engine is not an Otto engine but a Carnot-like engine. Again to ensure we are not violating Physics, we plot the Carnot Cycle efficiency in the top curve of FIG. 22 (curve with diamond symbols). This curve is obtained by backing up the power stroke adiabat to the compressed volume to determine what the peak temperature must have been at peak compression, and then using that value as the hot temperature source in the Carnot Cycle efficiency equation. That the new engine efficiency curve appears to asymptotically approach the Carnot Cycle curve is also reassuring.

Examine Changing the Equation of State for Thermal Engines

The various mechanical linkages described in the previous task may go far to achieving our goal of instantiating the Carnot Cycle. However, there is another interesting variant we would like to explore, and that is by changing the equation of state for the working gas in the thermal engine. Normally this might be considered to entail a change of working gas. But for various pragmatic reasons we really don't want to do that unless absolutely necessary. Rather, we would like to produce a change of working gas response that produces a net effect of mimicking a change in the effective equation of state for the engine's working gas.

Consider the Otto Cycle engine shown in FIGS. 19*a*-19*c*. This is a standard Otto Cycle engine except that we have added a small auxiliary cylinder connected to the volume of the main cylinder. The small auxiliary cylinder, an "Idler" Piston, is backed by a spring and limited in its intrusion into the cylinder by a mechanical or other type of stop, such that the arrangement inhibits the Idler Piston motion according the pressure in the main cylinder. Additionally, the Idler Piston spring is pre-tensioned, so that a certain minimum pressure must be exerted on the Idler piston before it moves.

Figure 24:
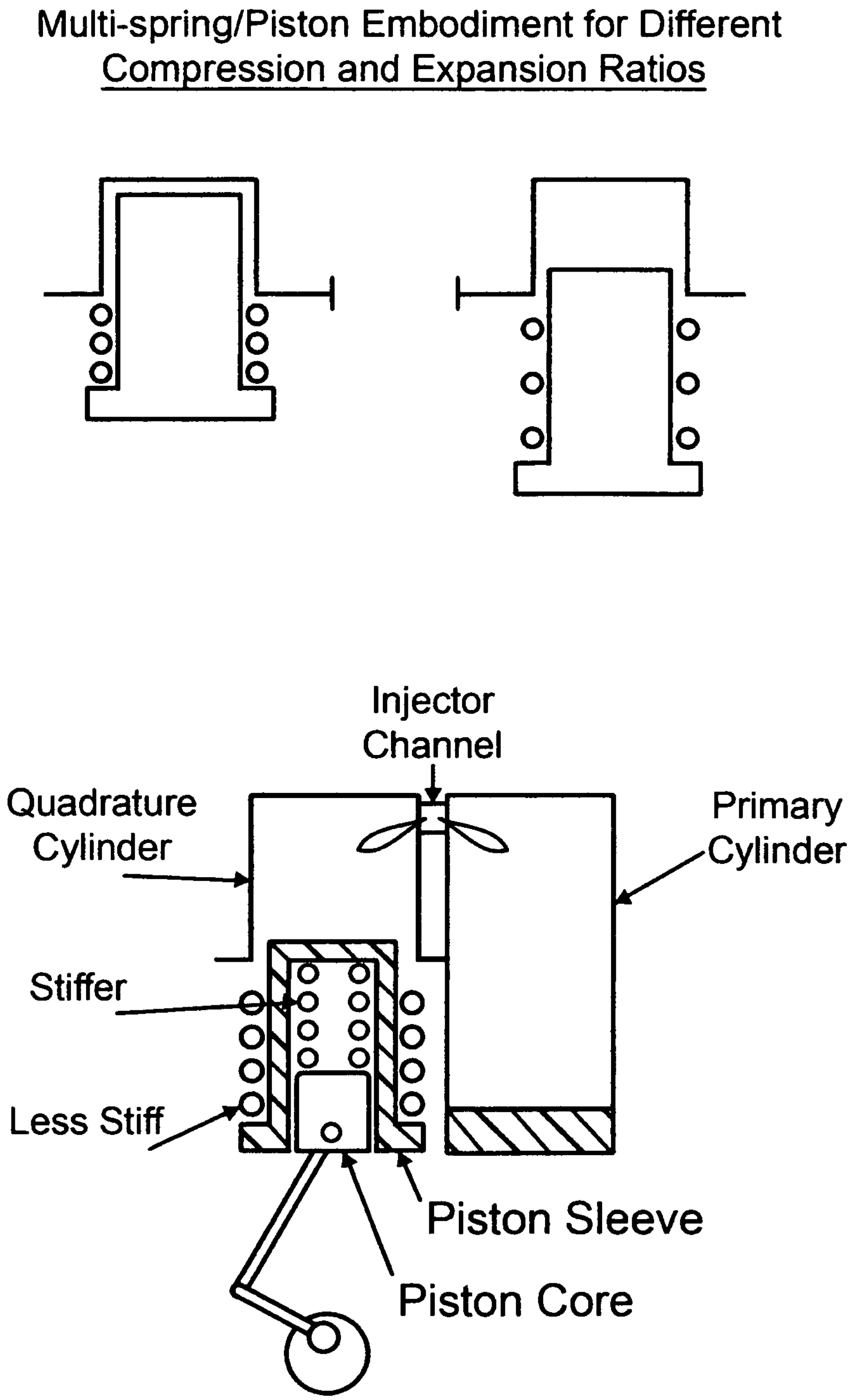
FIG. 24 shows a dual spring equation of state changed embodiment

When the pressure is low (i.e. below the pressure needed to exceed the pre-tensioned Idler spring force), the working medium follows the standard Ideal Gas Law. When the pressure gets up to a certain predetermined value, PI,min the pre-tensioned spring force is matched and the spring starts to compress with further increase in pressure. This point would happen at a point close to position "2" in FIG. 1, and with an associated state (P2, V2, T2). Any attempt to increase the pressure further couples the Idler Piston into the system, adding its displaced volume, VI to the cylinder volume VC to get the whole working gas volume. Since the Idler Cylinder's volume is related to the pressure, the pre-tensioned force of the spring and the spring constant, a potentially useful degree of flexibility is afforded for modify the cycle. Conceptually, this is similar to the Atkinson Cycle or the Miller Cycle, in that it reduces the compression stroke work and also allows the main piston to travel to the top of the cylinder. By doing so it allows a longer power stroke, and towards the later part of the power stroke, when the pressure is getting low, the Idler Piston returns the energy it absorbed during its compression, thereby enhancing both power and efficiency. Furthermore, the spring constant of the spring could be non-linear, permitting some interesting tailoring of the cylinder pressure versus displacement of the Idler piston. By use of multiple nested Idler Pistons with different spring constants and areas, a diversity of cycle paths may be created. A similar arrangement is illustrated in FIG. 24 wherein a nested pair of springs and stops serves a similar purpose.

Figure 25:
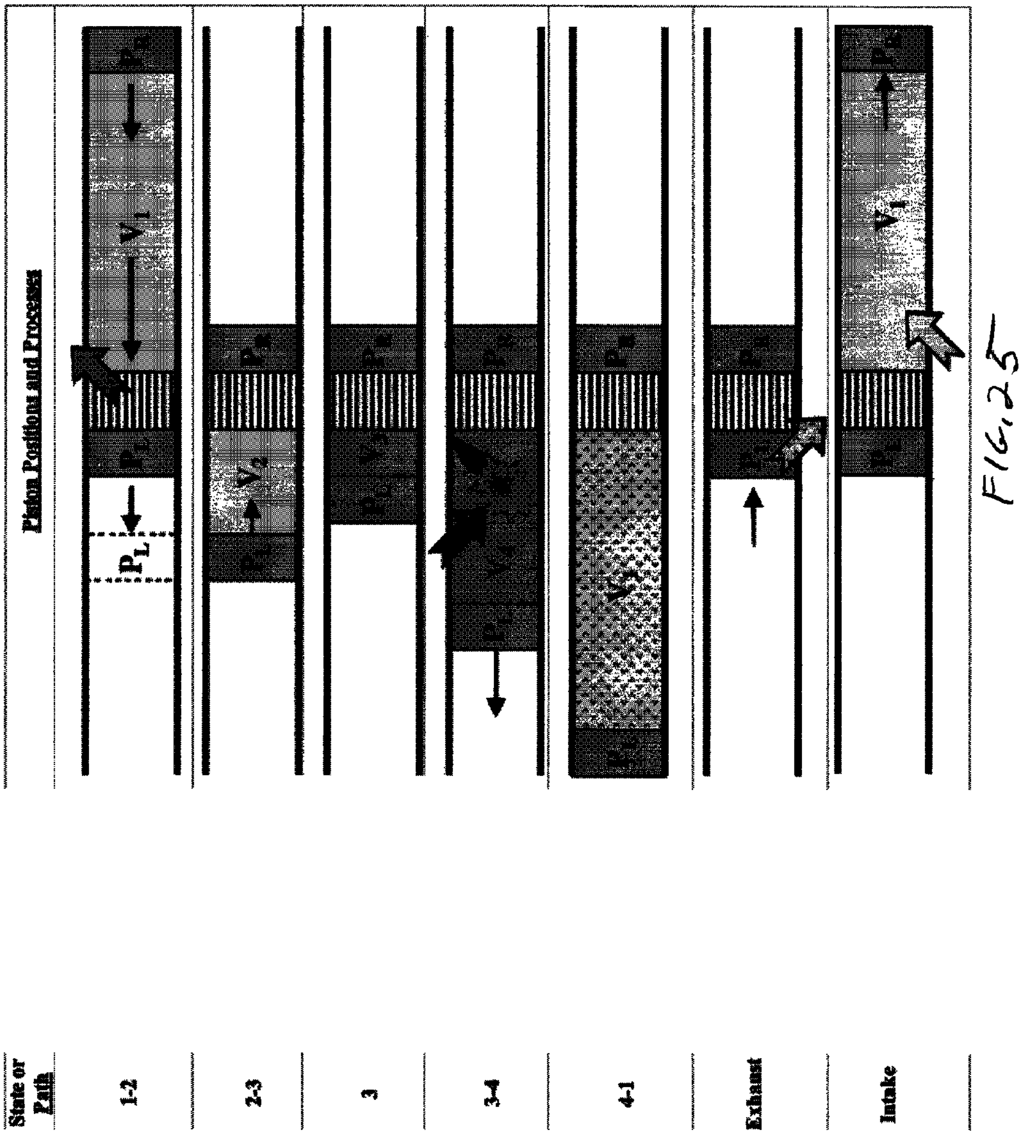
FIG. 25 shows an actual Carnot Cycle embodiment

An engine which very closely reproduces the Carnot Cycle is illustrated in FIG. 25. It is understood that the two illustrated pistons may be driven with any one or more of the myriad of driving mechanisms to include electromotive, hydraulic and mechanical means, to include such means are are disclosed within this discloser. We begin in the top panel of FIG. 25 at the state defined by position "1" in FIG. 1. This state has the lowest pressure and maximum volume. For this design concept we will use two opposed pistons.

Examination of FIG. 1 shows that the first step in the Carnot Cycle is to undergo an Isothermal cooled compression process from point "1" to point "2" in FIG. 1. We therefore introduce the "Cooler" in-between our two opposed cylinders in FIG. 25, and place it strategically to cool the gas while it undergoes compression during path 1-2. This "Cooler" is essentially a Condenser coil like in an air conditioner or a car radiator. Of course since it is inside the cylinder, it will need to be substantially sturdier than the sheet metal finned radiator in your car. More likely it is a cast metal piece bolted between the two cylinder volumes it creates, with holes drilled through it to allow the working gas to pass between the opposed pistons, and non-intersecting cooling channels that carry cooling fluid through the structure. The details are left as an engineering design exercise, potentially non-trivial, but not at all intractable.

Two key differences are now noted between this design and other thermal engines:

We have introduced a high capacity cooler INTO the working gas, and

This cooler is fed with the coldest cooling fluid possible, directly from the engine radiator This Cooler defines Tc in the Carnot Cycle, and it has nothing short of a direct impact on the net efficiency via the efficiency equation for the Carnot Cycle. Additionally, this Cooler needs to be designed in such a manner that it removes heat at a specified rate to maintain an Isothermal process from during path 1-2. Piston Pr may also be outfitted with displacement fingers to push residual gas out of the Cooler's passages upon complete movement to the left.

With the Cooler in place, the right piston, Pr and left Piston, PI, execute a coordinated displacement to the left in FIG. 25. This displacement moves all the working gas through the Cooler, cooling it as it goes through it in a substantially Isothermal process at Tc as called for by the Carnot Cycle. At the same time, the left side piston, PI, does not travel as far as the right side piston, Pr. In so doing, the working gas undergoes some compression as required of the Carnot Cycle for path 1-2 OF FIG. 1. Note that rather than using different travel distances with Pr and PI, we could effect the same gas displacement by making Pr and PI different diameters, but with the same stroke length.

We are now at point "2" of Carnot Cycle in FIG. 1, and we need to execute an adiabatic compression to move along the path 2-3. The right piston Pr remains substantially in place and the left piston PI is moved inward to compress the gas adiabatically. Since the gas cannot flow past the Cooler, it is not cooled further. This part of the cycle is substantially the same as the compression phase of other reciprocating cycles.

The system is now at point "3" of the Carnot Cycle in FIG. 1. Heat must be introduced isothermally to follow the Carnot Cycle as closely as possible. The Otto Cycle's method of igniting an air gas mixture for heat input is not acceptable because its an isochoric process. Rather, we select to add heat via a modified Diesel injection process. Whereas the normal Diesel Cycle injects a relatively constant flow of fuel to maintain a relatively constant pressure, we meter the fuel injection carefully at just the right rate to maintain a hot but isothermal process as called for by the Carnot Cycle. Note that until fairly recently, fine fuel injection control was not an option. But recent computer controlled injection technology can now meter precise amounts of fuel at precise instants in time. This allows us to carefully tailor the isothermal expansion process to the profile required to instantiate path 3-4 of the Carnot Cycle in FIG. 1. It is acknowledged that efficient burning of fuel could be a problem during this phase of the cycle. But this is assessed to be no worse a problem than already experienced in Otto and Diesel engines, and can certainly be improved to acceptable levels with some creating and careful combustion engineering.

The system is now at point "4" of the Carnot Cycle in FIG. 1. The system must now undergo an adiabatic expansion to follow the Carnot Cycle. This is done by turning off the fuel injection and allowing the left piston PI to complete the rest of its expansion adiabatically. This then brings us close to a state with the characteristics of point "1" of the Carnot Cycle in FIG. 1.

The Carnot Cycle is now complete. A pumping process is subsequently performed to bring the system back to a state where the Carnot Cycle can be repeated. This consists of opening an exhaust valve near the cooler, sweeping the left volume clear of exhaust by moving the left piston PI up to the Cooler, closing the exhaust valve, opening the intake valve on the other side of the Cooler, and retracting the right piston Pr to draw in a fresh charge of air.

The design presented here is also not necessarily mechanically optimum, but presents a design concept that can emulate a Carnot Cycle quite closely. Note that as a minimum, the mechanical movement to instantiate the above cycle could be implemented with cams.

Turbine/Ramjet/PDE Carnot Cycle Engine Concept

As it turns out, the turbine engine may be most amenable to Carnot Cycle conversion. This is because the pressure-volume curve in a turbine engine can be flexibly varied through design of the compressor stages, turbine stages and engine diameter as a function of the station position along the airflow. What is missing in turbine engines is instantiation of mechanisms to force the engine to follow the Carnot Cycle instead to the Brayton Cycle.

Figure 26:
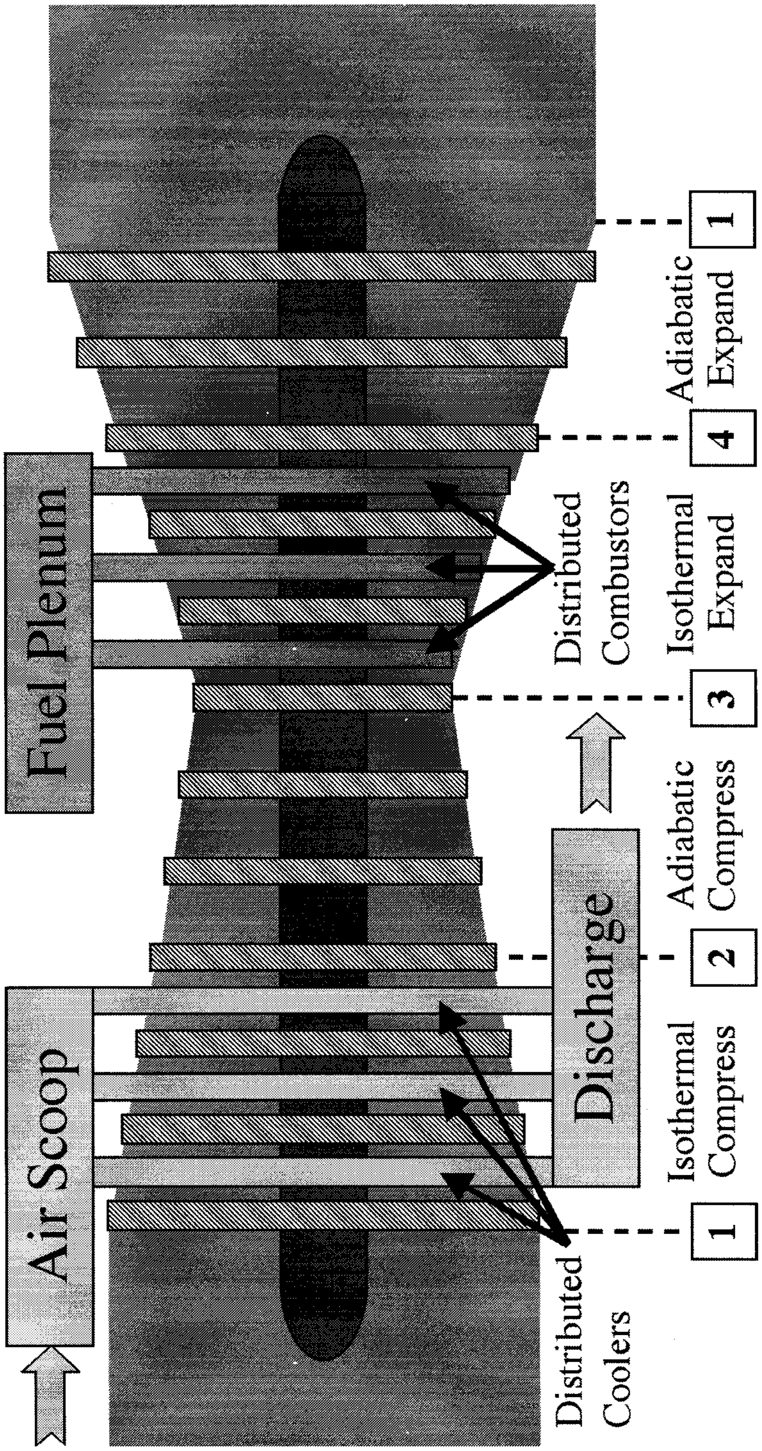
FIG. 26 shows a Carnot enhanced turbine engine

FIG. 26 illustrates the general approach to making a Carnot Cycle turbine engine. Essentially, the Carnot Cycle turbine engine is almost the same as a conventional Brayton Cycle turbine engine. There are really only two physical differences. First, the forward compressor stages are modified so that they can cool the air they are compressing, thereby instantiating the isothermal process of path 1-2 in FIG. 1. This might be done in a number of different ways, but two ways are immediately obvious. The first is to interleave cooling coils (i.e. radiators) between the compression stages to enact a distributed cooling process during initial compression. The cooling coils are cooled with outside air and are sized to remove heat as needed to maintain an isothermal compression process. The disadvantage of this approach is that the cooling coils may impose a drag penalty that could be unacceptable, particularly for aero-engines. The second approach is to use hollow compressor and/or stator blades, and pump cool outside air from a hollow center shaft out through them. This is obviously the preferred approach since it imposes no additional drag loss, and either the spinning blades of the compressor generate enough centrifugal force to provide a self-pumping action for the cooling air, or ram pressure forces cool air through the stator blades.

The other change needed is for the fuel combustor to be removed and replaced with a multitude of smaller burners that are distributed among or integrated with the forward turbine stages. This approach adds heat gradually while the gas is expanding to create the isothermal process needed for path 3-4 of the Carnot Cycle in FIG. 1. Again, there are a number of ways in which this might be done, but we differ those details to a follow-on effort since combustor technology is a major topic itself. It is sufficient at this point to acknowledge it can be done with sufficient engineering ingenuity and effort, and if it is done, we will have realized the Carnot Cycle in a turbine engine.

If we can instantiated the Carnot Cycle in a turbine engine, it is expected that it can also be instantiated in a Ramjet, since the basic processes are the same, only using ram pressure instead of an overt physical compressor section. The insights gained here may also aid in devising a more efficient PDE-like engine. For example, the air charge could be further cooled upon entry to mimic path 1-2 in FIG. 1 thereby moving the Humphrey Cycle just a little closer to the Carnot Cycle. The Pulse might also be mediated to be more isothermal and Carnot-like, perhaps by tailoring the expansion throat or by other means.

Other means that direct mechanical intervention can serve to improve efficiency in thermal engines. Early compression evaporative cooling and time/phase profile metered fuel injection can make the new engine's cycle match as closely as possible to the Carnot Cycle. There are two general classes of evaporative cooling injection that might be employed in our new engines: a full injection and a partial injection. A full injection would input the complete fuel load into the early part of the compression stroke, and a partial injection just part of it. The full injection might be a new way to fuel gasoline engines since with their lower compression ratio the fuel will not ignite upon compression but only when the spark plug fires. We will want to quantify the efficiency improvement and heat rejection improvement since this is potentially a retrofittable modification to gasoline engines, or at least a straightforward one to develop for manufacturing. The partial injection would not unload the whole fuel charge, but likely as much as possible without causing a pre-ignition event in high compression ratio engines. This also introduces a possible new way of producing a lean burn process in the engine. The partial injection will have a very long time (comparatively speaking) to evaporate and mix with the air, thereby forming a very uniform lean ratio mix. When the main injection just prior to at TDC occurs, it acts like a high fuel ratio source for the ignition, in effect acting like a stratified charge arrangement. We use these new injection schema to determine what the injector requirements need to be to implement them, and then assess the state of the art (SOTA) in injector technology to address these requirements.

There are two general approaches within the evaporative cooling injection scheme, mostly within the context of the COTS hardware. The first method is to convert a gasoline Otto engine to incorporate the evaporative cooling injection, and the second is to convert a Diesel engine into an Otto engine that incorporates the evaporative cooling injection.

The first approach would take a small gasoline engine and add an injector to the side of cylinder near the head, ensuring that the injector is flush to the surface of the cylinder to avoid contact with the piston. The carburetor or normal fuel injector would be run dry or deactivated respectively. The new injector would then become the sole source of fuel for the engine, but it would be timed to inject fuel after the intake valve has closed. The new fuel injector would nominally be of the newer electrical injecting type so that the injection timing may be easily controlled with a simple electrical signal modification. An injector evaluation kit from one of the several OEMs is the ideal source for this injector hardware.

The second approach would be to do the reverse: that is, to take a Diesel engine and turn it into a gasoline engine. The reason for doing this might be to use the injector system that is already built into the Diesel. The injector would be reposition to the side of cylinder near the head same as above. Its timing would have to be shifted by about 90 degrees to produce the injection at the proper time. In place of the fuel injector in the head, we would place a spark plug and associated after-market ignition system to ignite the fuel. A throttle or venturi limit plate would limit the air intake to lower the effective compression ratio and thereby prevent pre-ignition of the fuel.

In addition to cooling of the early compression phase via evaporative or conductive spray cooling, smart conventional cooling practice can also contribute to the efficiency of an engine. In this regard, we desire to provide extra conductive or convective cooling for the early compression phase. Counterpoised, we might also prefer to have some preferential heating for the early expansion phase. Engineers have for many years attempted to preferentially cool intake manifolds, but this is cooling that happens before the working medium is compressed. Such cooling may help increase the air/fuel charge in an engine cycle, but it does little to enhance efficiency. Instead, the desired cooling must happen in the compression phase and likewise any ancillary heating must happen in the expansion phase. One can contemplate conductive and convective cooling means wherein if the intake charge preferentially contacts one wall of a combustion chamber versus the other walls, then one could preferentially cool that wall and counterpoised, for heating the wall most in contact with the working medium for heating during the expansion phase.

Figure 27A:
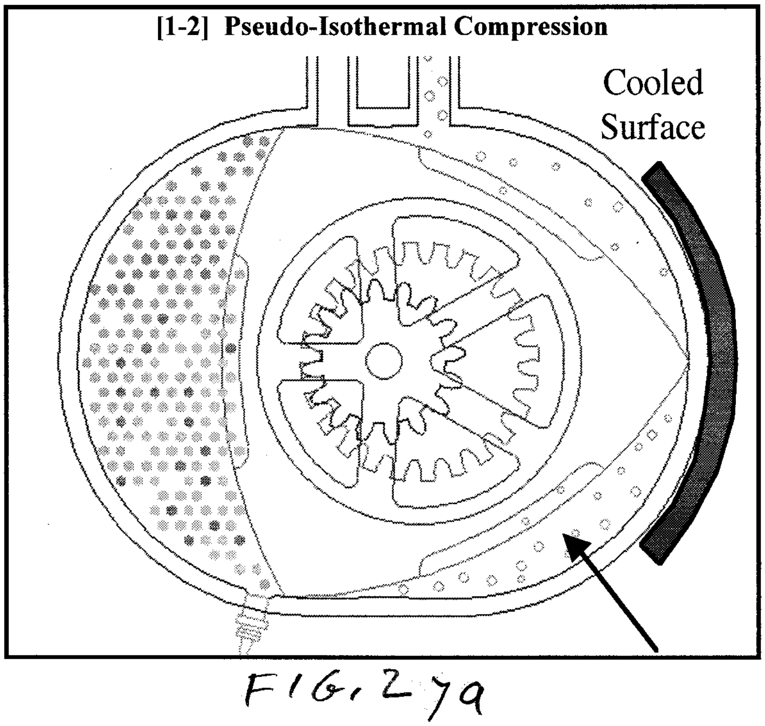
FIGS. 27*a* and 27*b* show thermally loaded enhanced Wankle engine

This approach may be difficult to realize in conventional cylindrical engines where working medium is turbulent and substantially in contact with all walls all the time. However in certain engine designs the method described above could actually be made to work quite nicely. In particular, rotary engines in general are disposed to implement and exploit this method more easily than might be done in other engines. FIG. 27*a* illustrated how the side walls of the Wankle engine's compression region could be preferrentiall cooled more than the rest of the engine to implement a preferential trans-compression phase cooling as required of the Carnot cycle. This could be done as simply as by connecting the cool output from the radiator first to this spot on the engine before going to other parts, or it could be that this spot on the engine's exterior is augmented with cooling fins, or in the extreme some other means of even lower temperature cooling may be employed. For example, the fuel might be run through cooling channels in the wall of this part of the engine to cool it. Or, some other coolant might be available in certain applications (water borne vehicles having access to copious water for example), or if the thermodynamic trades support a positive efficiency result, it might be advantageous to actually run a purposed cooling like Air Conditioner to this specific area of the engine wall to enhance the cooling during the compression phase.

Figure 27B:
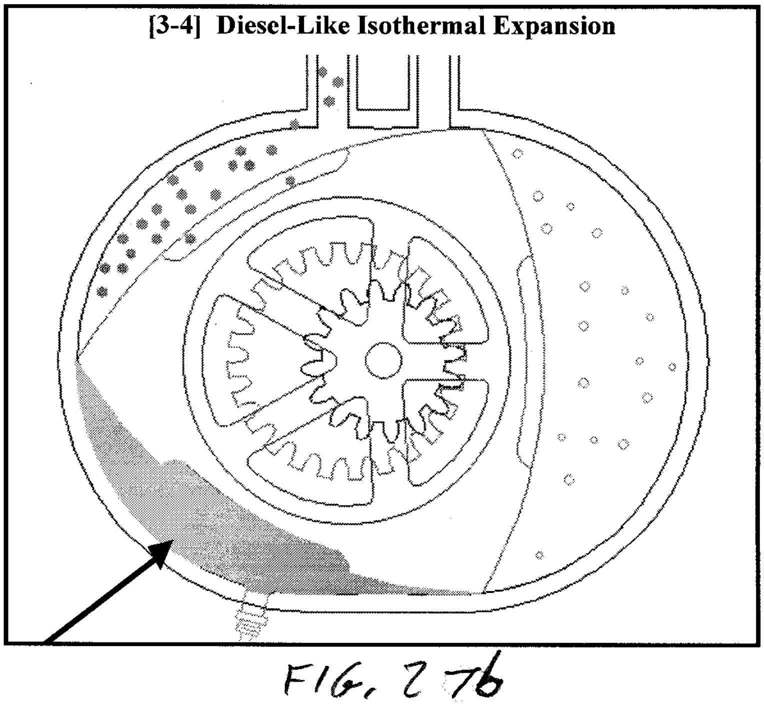

In an analogous manner additional heating could be contemplated for the early part of the expansion phase by selecting that portion of the Wankel encloure wall to heat preferentially as shown in FIG. 27*b* and embedding heating means into that wall as indicated. The heating means could be the hot side of the engine coolant flow or some impingement from the exhaust re-circulated over that section or even solar energy in a solar embodiment of such an engine.

Extreme Regenerative Miller-Like Cycle

An alternate embodiment of the concepts herein is to exploit an extreme form of Miller cycle with regeneration. We propose to use the revelations and insights described herein to design one or more entirely new classes of thermal engines with significantly higher efficiency than prior engine technologies have been able to deliver. As a spin-off of this higher efficiency we anticipate a noticeably higher power density simply because we will be extracting much more power per cycle and per unit fuel than a conventional engine. Additionally, this engine will be remarkably quieter than prior engines thereby meeting the low noise requirements of the solicitation. This lower noise output is a another spin-off benefit from the higher expansion ratio which will significantly lower the cylinder pressure at the time the exhaust valve opens (because its converting more of that pressure to work via the larger expansion ratio). A lower exhaust valve pressure differential then produces far less noise than a conventional engine that usually has hundreds of PSI pressure still in the cylinder at exhaust valve opening.

There are numerous specific embodiments that our new engine could take. All that is explicitly required is that there are two independent but coupled volume producing cyclic processes that follow the guidelines derived from FIGS. 13*a*, 13*b*, 14*a* and 14*b*. Applicant has already devised a number of mechanical instantiations, as will be described. Perhaps most promising is that this design can be retrofit to existing engines and in today's oil starved world, that could be an enormous near term and economic advantage.

Figure 28:
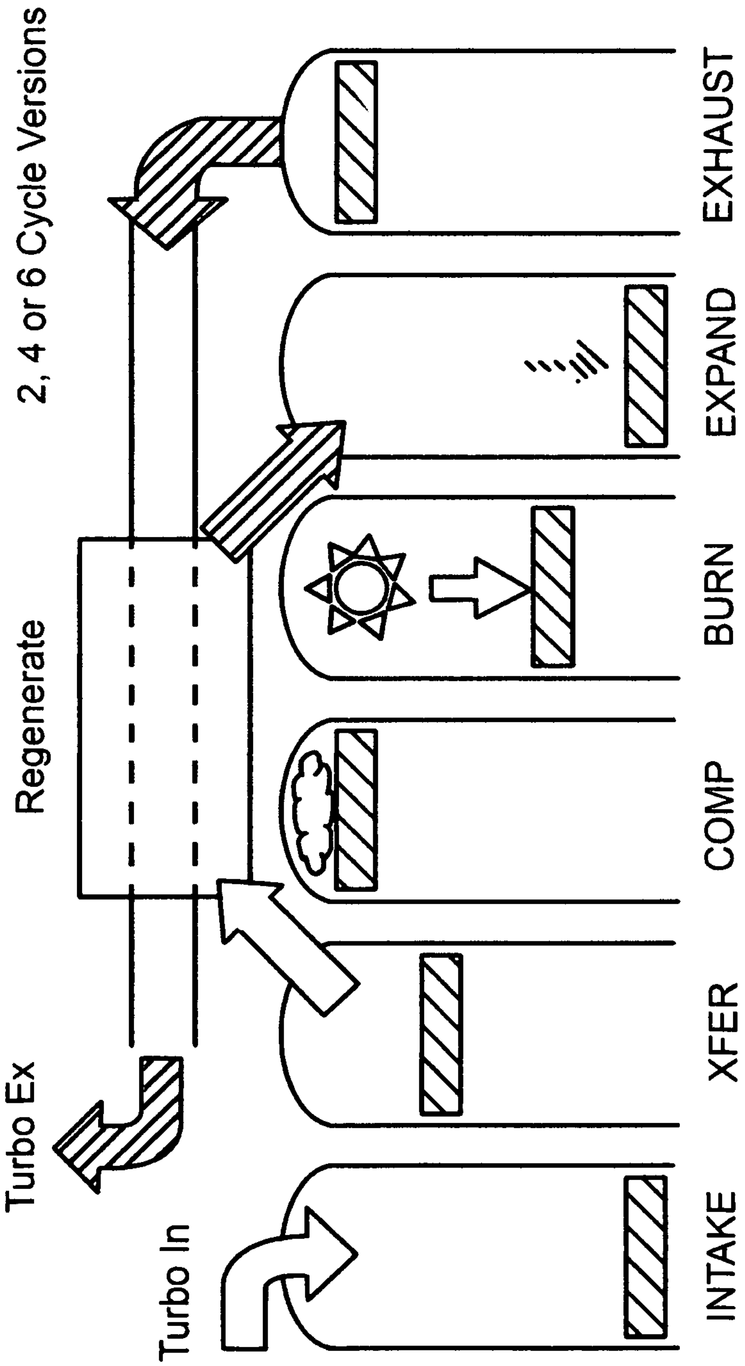
FIG. 28 shows a 4-cycle Extreme Miller Cycle with Regenerator, 7-phase

The basic operating principle is illustrated in FIG. 28 as a 4-stroke cycle 7-Phase engine. The 4 strokes are essentially the same as in the regular 4 stroke engine, but now the strokes are subdivided to include partial operations which we term phases. The phases are Intake (same as Intake stroke), Transfer (a partial compression and transfer of about ⅔rds of the gas to the Regenerator), Compression (the rest of the Compression stroke), Burn (the early high pressure part of the Power stroke), Expand (an ancillary low pressure extention and continuation of the Power stroke) and Exhaust (the same as the regular Exhaust stroke except the hot exhaust is routed to heat the Regenerator) and finally the Regerator phase, which transfer heat from the exhaust to air in a low pressure chamber.

This design may appear similar to some other designs that have been patented or are under development by others, but it is fundamentally different in the important ways guided by Tinker's revelations. The proof of this is that whereas other similar designs may claim a couple of ten percent improvement in efficiency, this design could achieve close to 75% efficiency. The key to this is that the piston "stroke" is two to three times greater than normal, and the effective compression stroke is about $1/3^{rd}$ the expansion stroke. Therefore we are doing just what Tinker suggests: minimize the compression stroke energy and maximize the expansion stroke.

Here we keep a very simple standard engine design and emulate the Tinker physics with appropriate venting control of the head valves. This design would use a 4 valve per cylinder arrangement and would repurpose the valves with appropriate ducting of vented exhaust gasses and fuel/air mixtures. Nominally, two intake valves are used to ingest air during the Intake phase. All other valves are closed. In the first part of the Compression stroke, a repurposed Exhaust valve opens to allow transfer of some low pressure partially compressed air into the regenerator. Such repurposing of the valving may be accomplished by custom ground camshafts.

After about a half to ⅔rds of the gas has been transferred, that valve closes and compression continues. The geometry of the crank shaft and piston rods is such that the compression will achieve a normal amount of compression (about 10:1) on the remaining ⅓ charge of air in the cylinder. In this way, the compression stroke can be made to look completely normal to all the engine controls, suggesting little change in the emissions control systems to accommodate these modifications.

Figure 29:
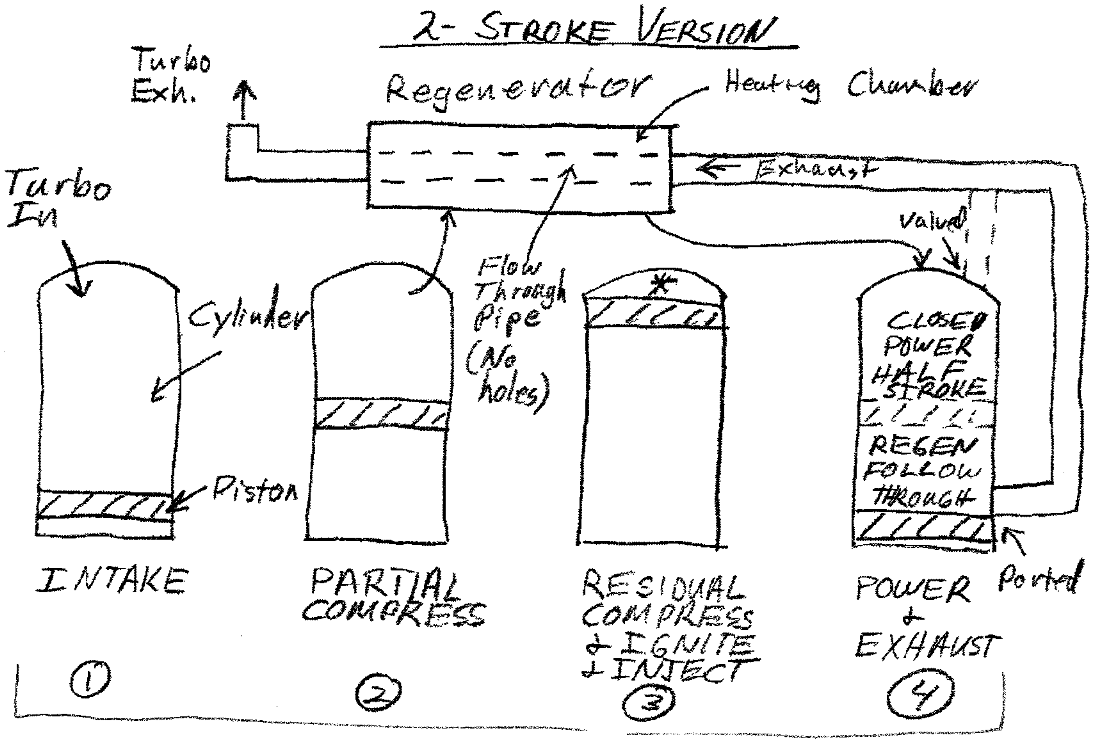
FIG. 29 shows a 2-cycle Extreme Miller Cycle with Regenerator

Once the gas is compressed, fuel is introduced via Direct Injection, just as in a Diesel. If Diesel fuel is used the compression ratio will be higher than the aforementioned factor of 10:1. In this particular illustration we are assuming Direct Injection (Diesel or Gasoline DI) although the design can be tailored to use regular port injection either through a stratified charge arrangement or by expanding the cycles into a 6-Stroke arrangement. A 2-Stroke arrangement shown in FIG. 29 is also obvious although the heating time in the regenerator will be correspondingly reduced. Regardless, after top dead center, the engine begins its burn phase with ensuing high pressure part of the Power stroke. This engine is characterized by:

a) Early part of power stroke (4) is closed valve & closed ports b) Later part of power stroke (4) is opened to regenerator's hot pressurized air c) This hot air reacts with combustion products to improve burn and reduce pollution. Also provides pressure boost.

d) Hot air from c) also helps purge cylinder, making way for fresh charge, and increases air flow for improve scavaging e) variable valving and porting can improve performance at different power levels f) Turbo is optional, but will improve performance. Turbo will need to be of low head pressure design.

Recalling that this engine has a large expansion volume (in relation to the actual compressed volume), the Burn phase will reach a point where it starts to run out of pressure. At this point, the aforementioned repurposed Exhaust valve will open again. While the engine was undergoing its latter compression stroke and early expansion stroke, the early transferred air was sitting in the regenerator absorbing heat, and developing pressure. This pressure will not be nearly as great as the high pressure part of the expansion stroke, but it will provide a welcome boost to the long power stroke and expansion phase just when it is needed. This hot air serves a second very important purpose, and that is to over oxygenate the hot gasses in the expand phase. This has the effect of burning off pollutants, thereby producing a particularly clean exhaust. As mentioned earlier, because of the large Expansion ratio, the final exhaust pressure is much lower than a traditional engine, suggesting that the noise level will be much lower in this engine.

Figure 30:
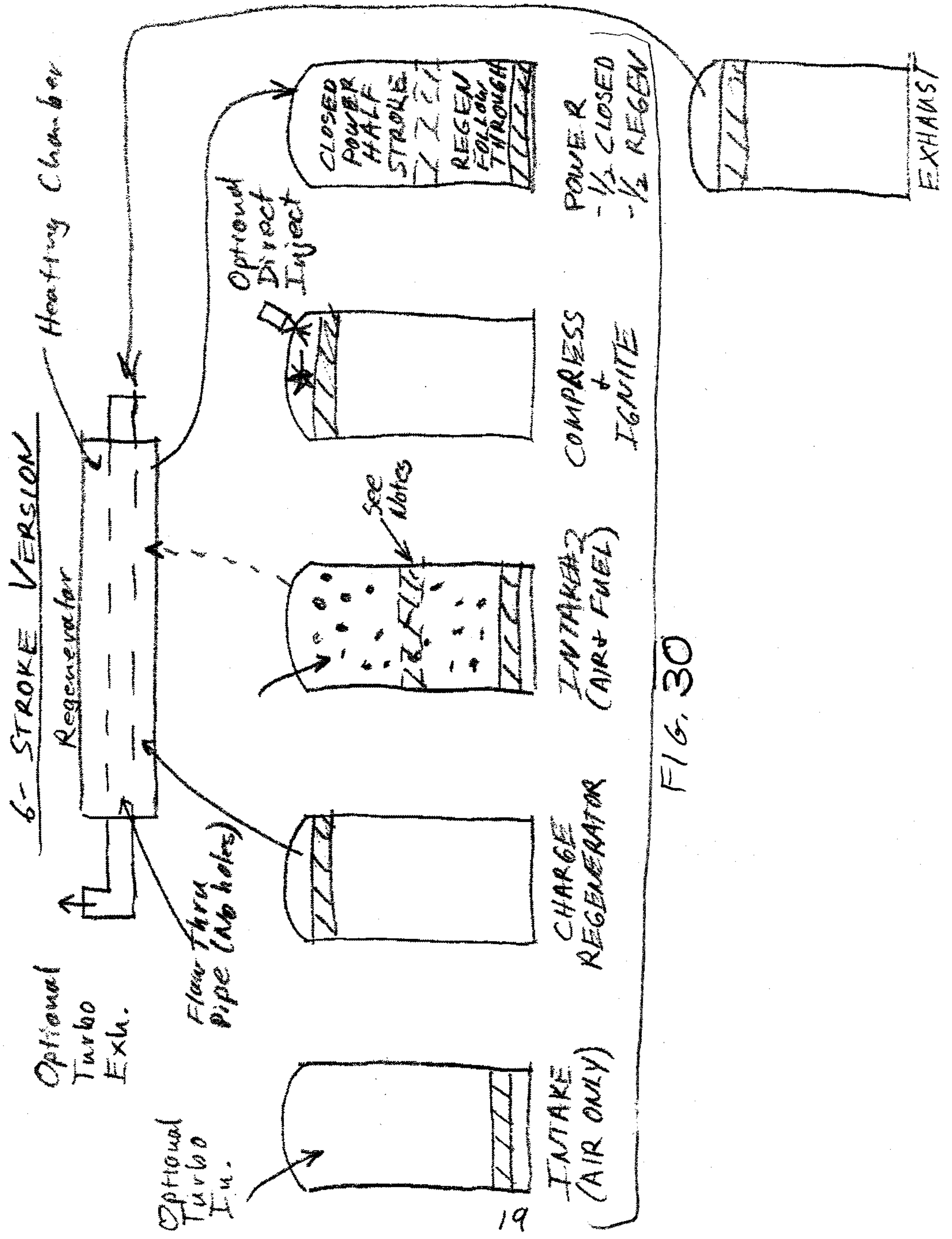
FIG. 30 shows a 6-cycle Extreme Miller Cycle with Regenerator
Figure 31:
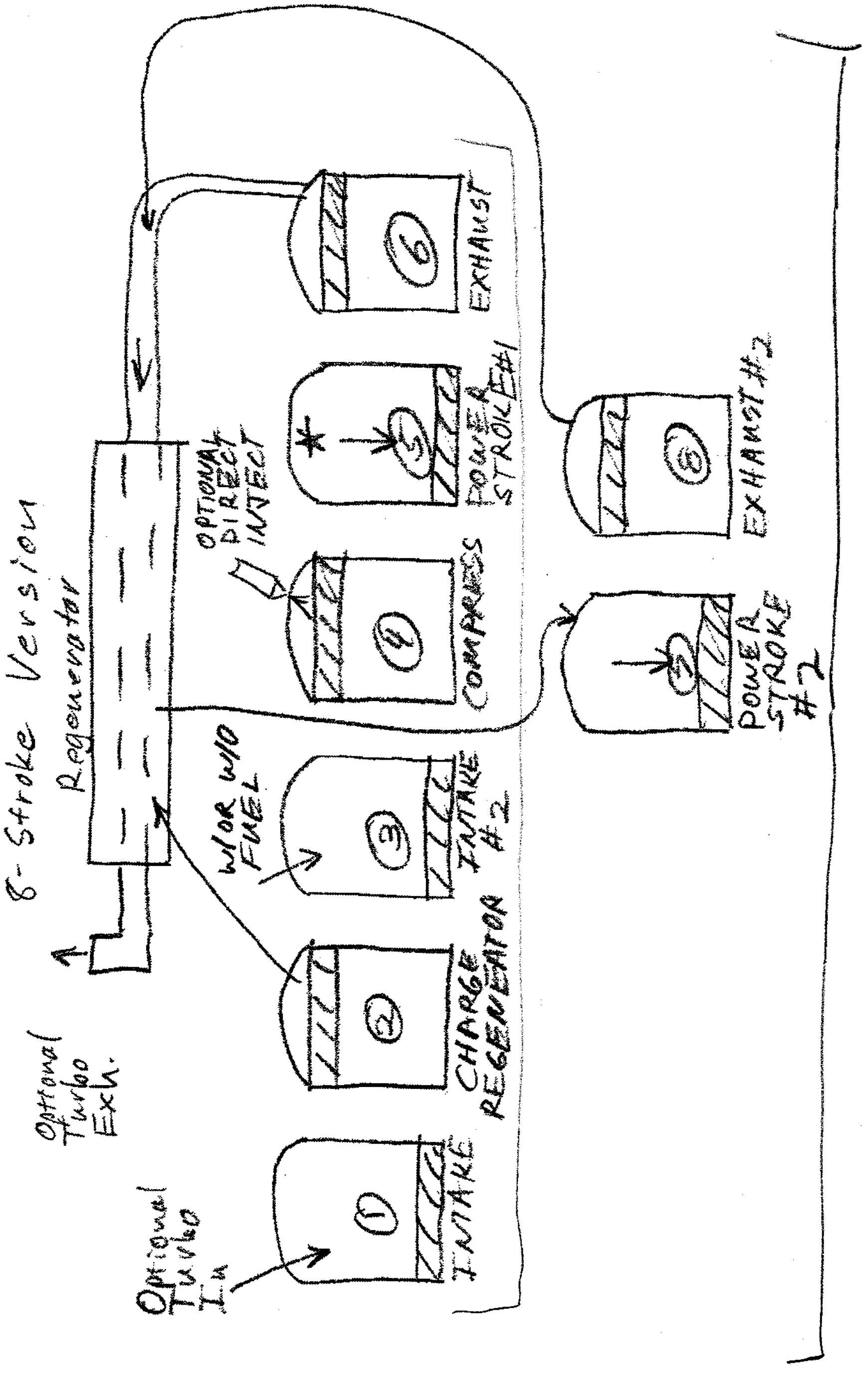
FIG. 31 shows a 8-cycle Extreme Miller Cycle with Regenerator
Figure 32:
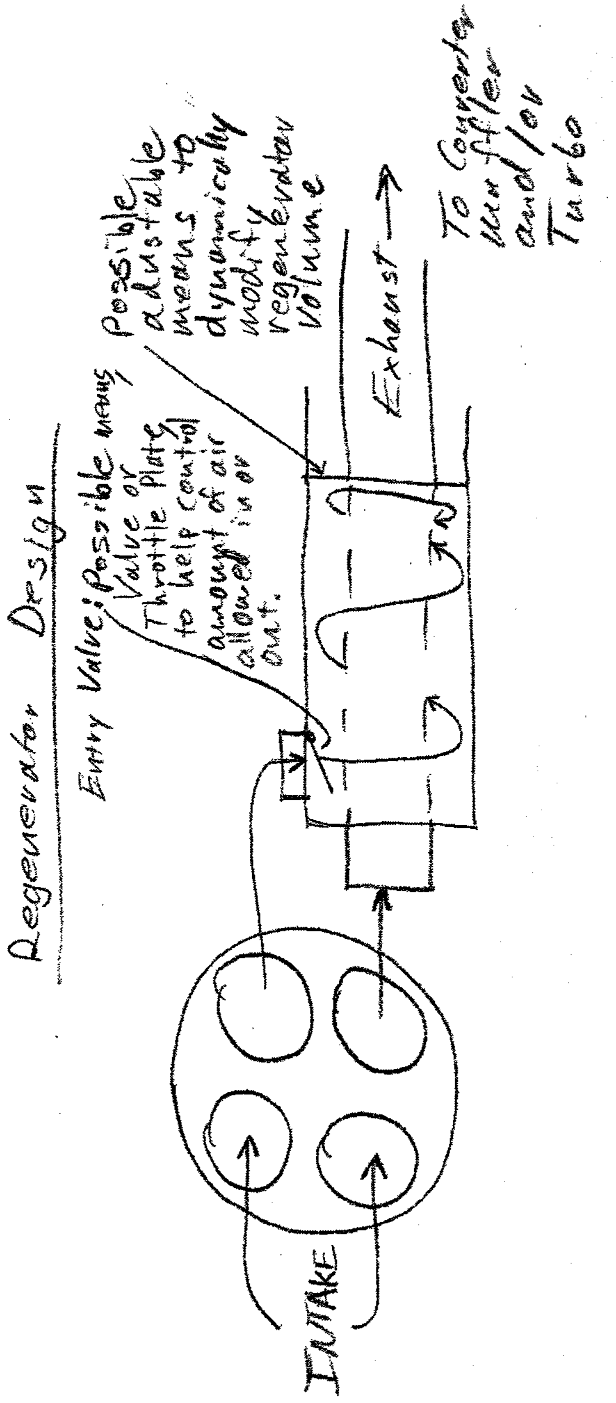
FIG. 32 shows the Regenerator design
Figure 33:
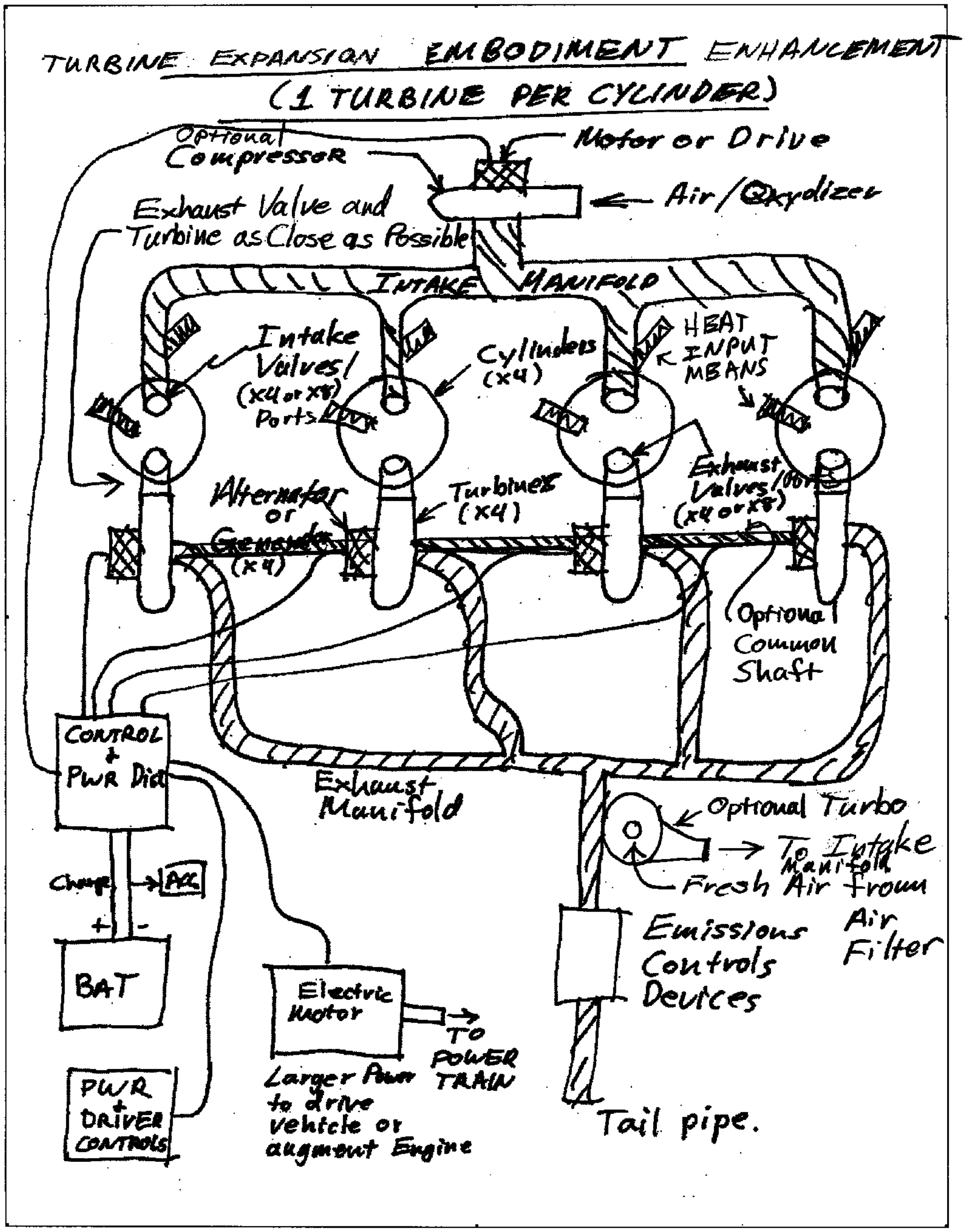
FIG. 33 shows the Turbine based Expansion Ratio enhancement 4-cylinder
Figure 34:
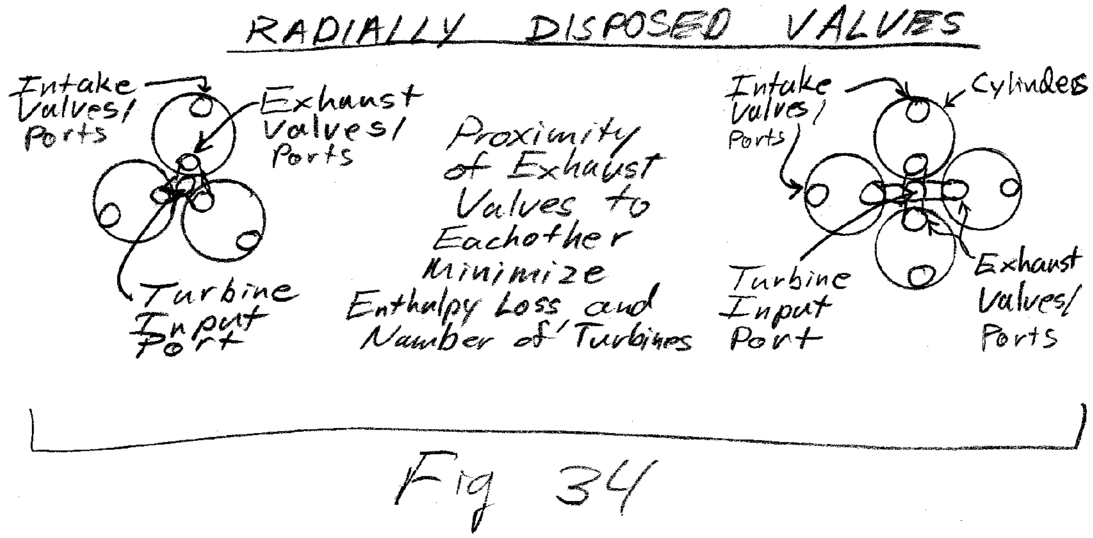
FIG. 34 shows the manner to get exhaust ports close to avoid Enthalpy loss
Figure 35:
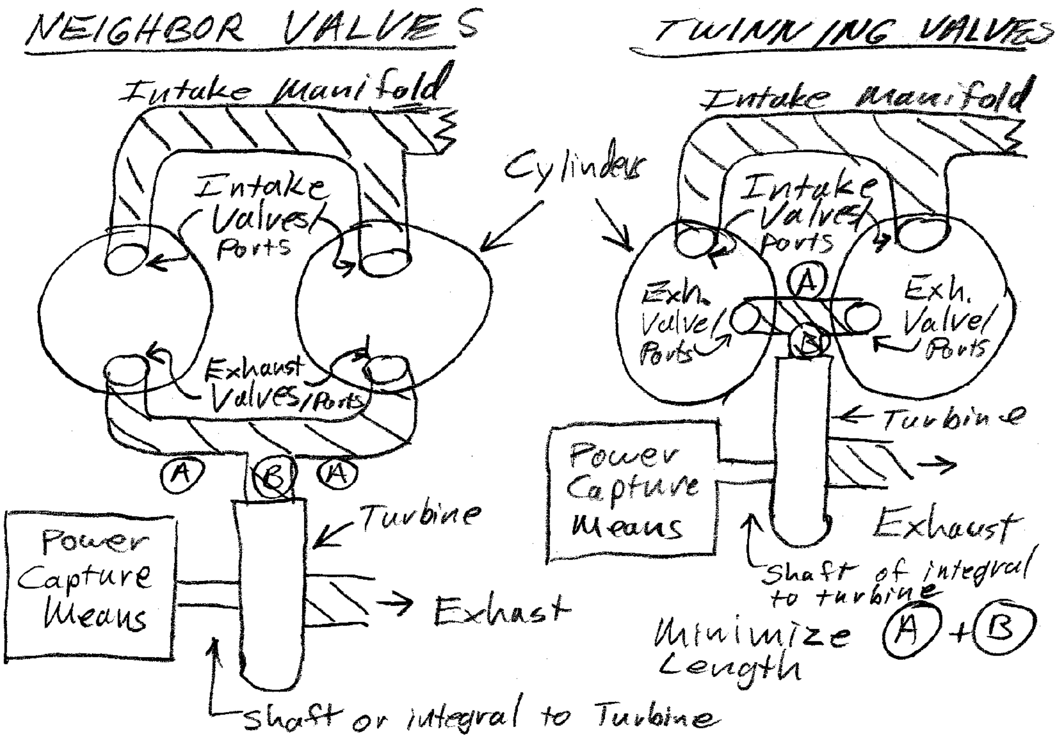
FIG. 35 shows sharing one turbine with two nearby ports
Figure 36:
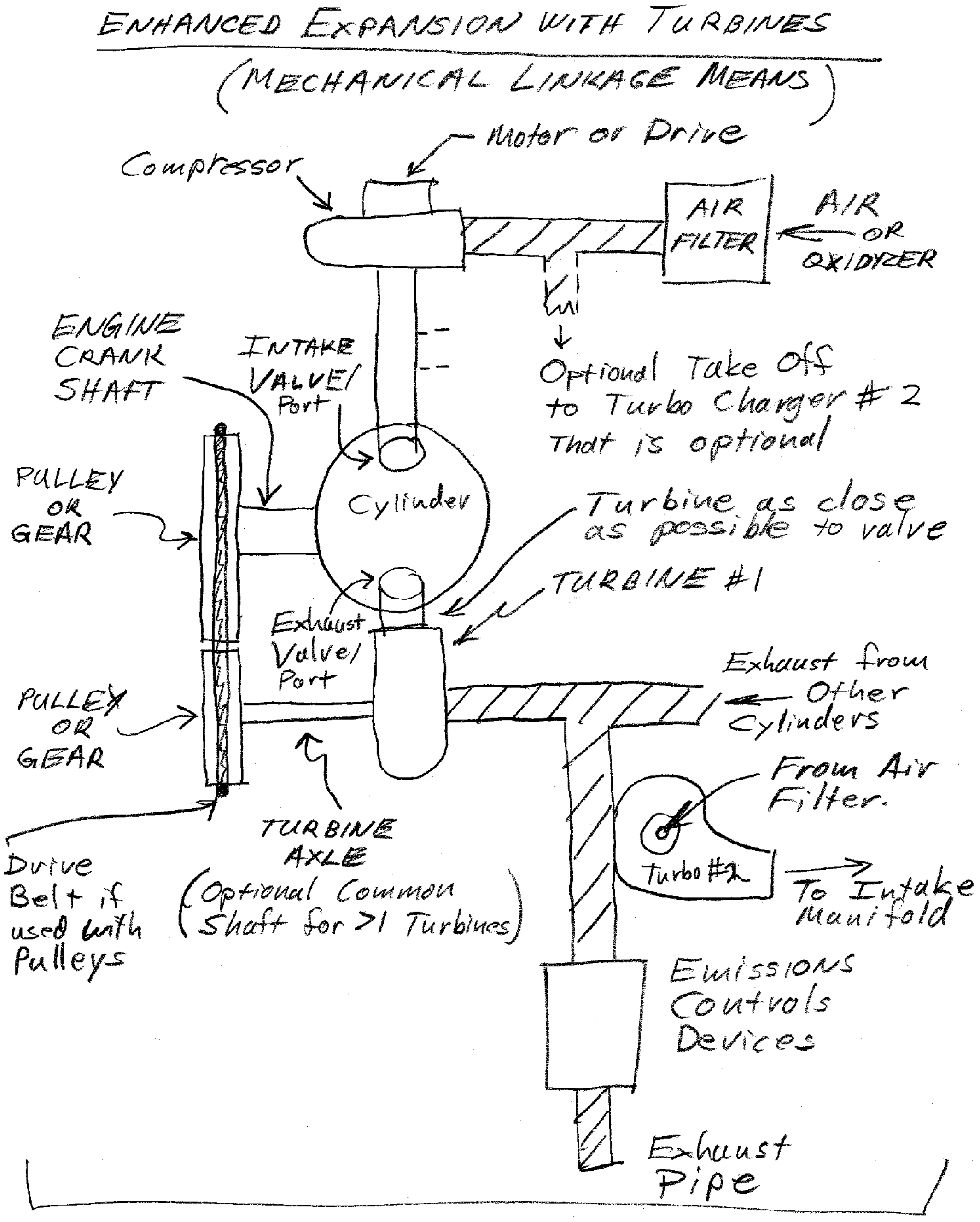
FIG. 36 shows a mechanical drive to recover the turbine power
Figure 37:
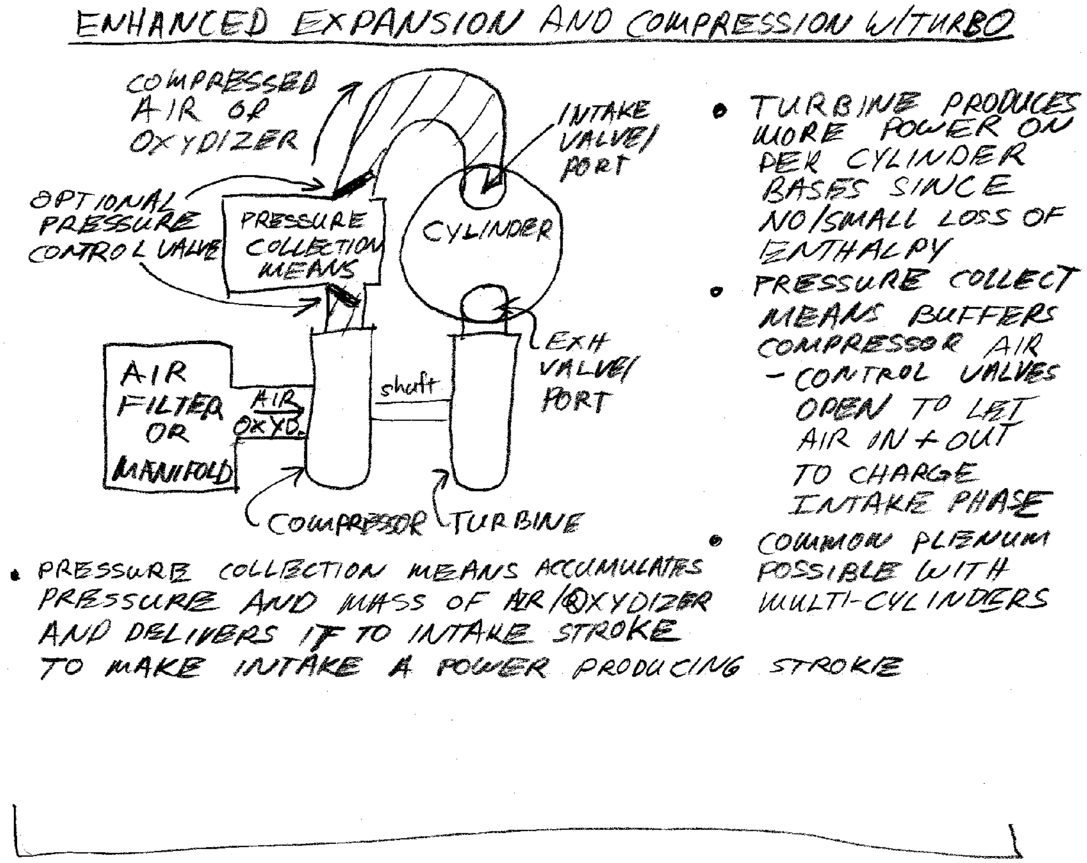
FIG. 37 shows a single cylinder version with pressure assisted intake
Figure 38:
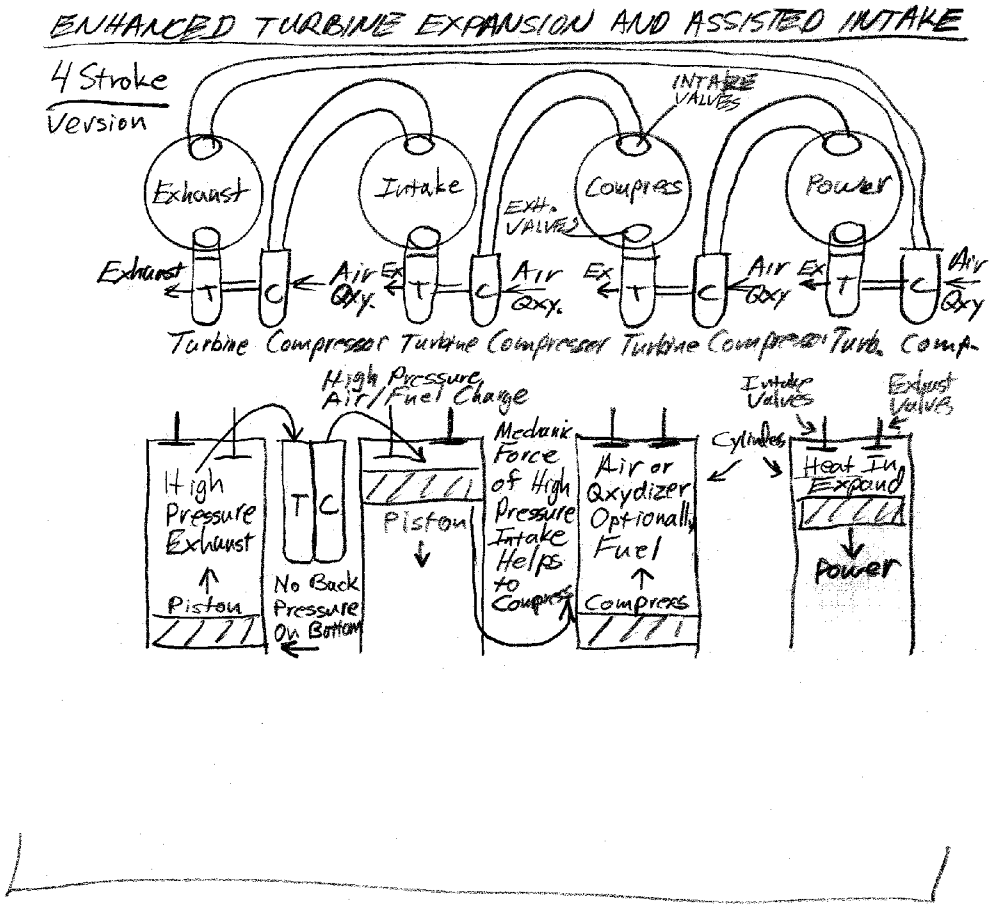
FIG. 38 shows 4-stroke version with pressure assisted intake
Figure 39:
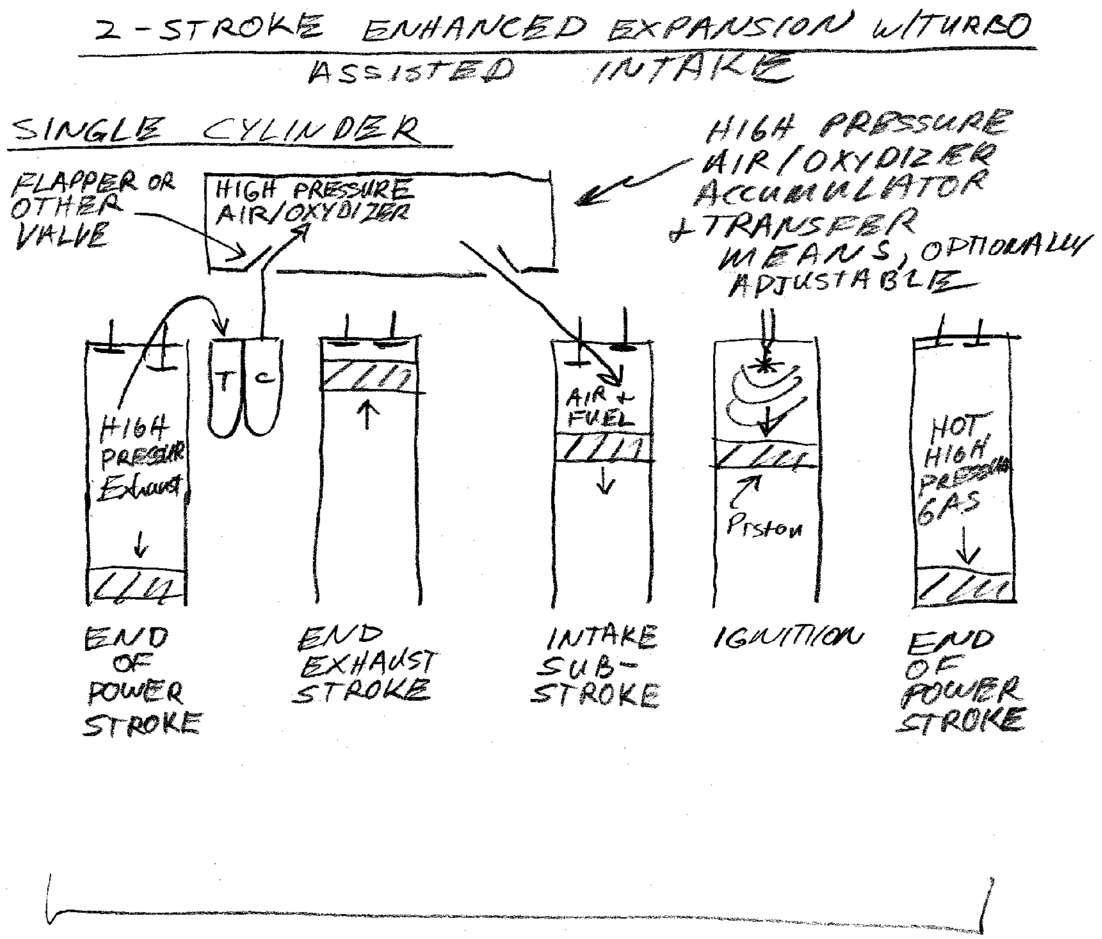
FIG. 39 shows 2-stroke version with pressure assisted intake
Figure 40:
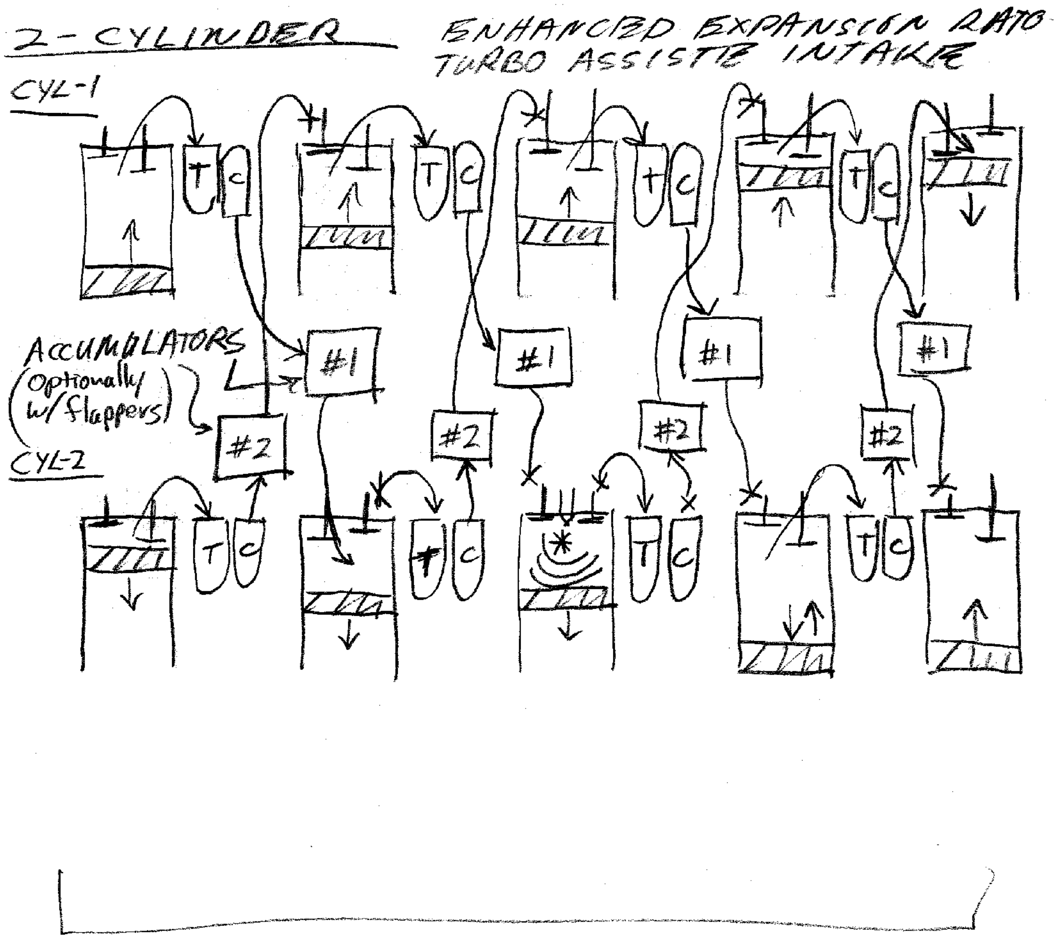
FIG. 40 shows a 2-cylcinder version with pressure assisted intake

A six and eight stroke version of this engine become apparent as illustrated in FIGS. 30 and 31 respectively. With respect to the 6-stroke version:

a) Intake #2 can allow a second additional compression into regenerator to increase its pressure and decrease compressive work b) Power stroke has 2 halves, first closed valves/ports, the second half powered by hot gas from regenerator c) Similarly to other embodiments otherwise With respect to the 8-stroke version:

a) Combines Otto/Diesel and Stirling/Erickson like cycles b) Similar to other cycles, embodiments otherwise c) Benefit is 2 power strokes per 8 cycles (just like 4 stroke Otto) but now 2nd stroke is free (no gas) and has reduced compression stroke energy needed Upon complete expansion, the other non-repurposed exhaust valve opens to release the exhaust through piping in the regenerator to keep it hot. Note that the regenerator is small. In fact, the default concept is for the regenerator to be an exterior pipe within which the exhaust pipe is passed, or vice versa. The actual embodiment of the Regenerator (FIG. 32) could literally be a new special header, or exhaust manifold, that simply replaces the stock header. As noted, modified cam shafts instantiate one level of performance (using stock rods and crankshaft) and a second modified cam shaft may be combined with new rods and crankshaft to enable maximum efficiency and performance. Some particulars of this would be:

a) This design is for 4 valve/cylinder heads. Ideal embodiment might use 5 valve head with extra valve for regenerator b) Regenerator replaces header (it becomes header)

c) Regenerator is optimized to maximize heat transfer from hot exhaust through pipe. Some options include: 1) Use of cyclonic flow around inner pipe. 2) Use of turbulence via baffles in chamber, 3) Use of fins in chamber, 4) Use of long thin/narrow chamber to maximize surface area for the volume used d) Possible entry valve could be a ball or cylinder valve with variable aperture or timing to adjust used volume in regenerator An alternate embodiment of the regenerator could use a mechanical displacer. In this regard, the addition of the displacer in the regenerator would function to move the air to a hotter section of the regenerator from its entry point which would be cooler, thus helping to ensure that the air is not prematurely heated while the valve is open from the compression means to the regeneration, as that would have an adverse impact on the compression phase efficiency.

In fact, an additional pair of strokes could be added (8-stroke engine) wherein the $7^{th}$ stroke is a Stirling-like power stroke fed from the regenerator and the 8-stroke is a Stirling-like exhaust stroke. Obviously various combinations of these strokes and cycles can be made to achieve several variations on this theme, all with improved efficiency and potentially higher performance in other parameters as well.

Turbine Enhancement of Expansion Ration

The purpose of section is to disclose yet an additional means for designing and producing a new engine that has radically higher efficiency than other engines in existence today. An additional purpose of the present invention is to also provide for a capability to quite easily retrofit existing engines to produce much higher efficiency than before the retrofit. This retrofitted efficiency is not likely to be as high as might be attained in an embodiment designed from scratch to use the teachings of this invention. But the efficiency obtained will still be a significant improvement much larger than attainable by most other means.

The fundamental principles underlying the current invention are the same as those disclosed above. The teachings of Tinker and the aforementioned disclure leads to a number of underlying principles for increasing the efficiency of thermal engines. But perhaps the most powerful of these is the principle that the Compression Ratio (Compression phase of the Otto cycle for example) of an engine need not be the same as the Expansion Ratio (Power Stroke of the Otto cycle for example), and furthermore that the Expansion Ratio should be made as large as possible in relation to the Compression Ratio. This decoupling of Compression Ratio from Expansion Ratio enables a dramatic increase in the efficiency of thermal engines of a factor of two or even more than three, depending on the specifics of the engine design.

One of the draw backs to various means of having decoupled Compression and Expansion Ratios is that such decoupling typically results in the need to develop substantially a new engine. There are some means by which an engine might be retrofit to accommodate this requirement, but they are difficult, complicated and in the end not usually economical since essentially an entire engine rebuild is needed.

An alternative method is to provide a bolt on approach that could be applied as a retrofit and also be used in production design. Achievement of this goal might be obtained through a couple of possible designs such as described in the aforementioned Provisional Patents, but another one is through a new embodiment of the familiar automotive turbo charger which is the subject of the present invention.

Operation of the conventional turbo charger is well known and well understood. Essentially an exhaust plenum collects the spent exhaust flow from the cylinders in the engine, and directs the flow to a common turbine that then drives a compressor to in turn pressurize the intake air. The pressurized intake air flows more volume through the intake system and over charges the cylinder with air or air/fuel mixture. This increases the power of the engine because more air/fuel are burned on each cycle. Interestingly, a turbocharger can also increase the efficiency of an engine. This realization has led Ford to include a combined Super Charger and Turbo Charger in their new 2009 models.

Although the Ford efficiency enhancements are notable, they are not dramatic. The reason for this is because they do not really address the core requirements for efficiency except in a serendipitous way. In fact, as designed, even this new arrangement is incapable of providing really significant improvement in efficiency.

The reason for this is two fold. First, there is no real intent to decouple the compression and expansion ratios and therefore maximal efficiency improvement is not possible and second, the turbine is in the wrong position to effect significant efficiency improvement.

In order to use the aforementioned principles, the position of the turbine must be changed. Currently the turbine is so far down stream of the exhaust valve, that only the static pressure and some minimal dynamic pressure remain in the exhaust flow to power a turbo charger. This is actually ideal for turbo charger applications because a compressor could not use much more power than what is generated in conventional turbo charger turbines.

But if we want to increase efficiency, this is not good enough. The problem is that between the distance of the exhaust valve and the turbine, the volume is about the same size as the cylinder. This means that when the exhaust valves opens, there is a huge loss of enthalpy and with that loss goes any potential of recovering the energy therein contained for useful work. Therefore, if we wish to minimize the loss of enthalpy and maximize the energy extraction for efficiency, then the turbine should be placed as close to the valve as possible, or even integrated with it. This will minimize enthalpy loss and maximize efficiency by permitting the turbine to extract the maximum amount of energy from the exhaust gas.

The mere addition of a turbine to the exhaust port then effectively increases the expansion ratio as was desired in the first place. Placing it very close to the pressurized exhaust gas ensures that there is no loss except to the mechanical output of the turbine, thus maximizing the efficiency of the additional expansion ratio that extracts additional power. Note that there is no real or significant increase in back pressure (maybe less) because when the exhaust valve opens, the intake valve is still closed ensuring all the back force is applied only to the piston, not back pressure into the intake manifold. A number of possible embodiments are disclosed in FIGS. 33-40.

Although a mechanical linkage could be provided (maybe with a torque converter and variable ratio transmission, etc.) in order to couple the extra extracted power to the drive train (and this is one embodiment of this invention), a more interesting approach is a hybrid vehicle implementation. In this case a generator/alternator is coupled to the turbine thus producing electrical power. The electrical power can drive accessories, or charge a battery or directly drive an adjunct or primary electric motor or any combination of these. An electronic controller monitors and controls and routes the electric power as needed. A hydraulic or air pump might be considered in place of the electric pump too, although these then require more divergence from the standard hybrid configuration. Basically any means that might be able to capture the power of the turbine and then route that additional power to useful purpose is a potential embodiment. Some of that power can also be used to power a compressor, so this embodiment offers the combination of both higher power and much higher efficiency.

Note that to minimize the volume in the exhaust pipe between the exhaust valve and the turbine-alternator/generator, nominally a separate turbine is needed for each cylinder, and these may in turn have individual alternator/generators or the turbines could be ganged on one/few shaft(s) to a common generator or drive train for mechanical coupling to the drive train. In the case of a V-like piston arrangement, the turbine might be placed between the cylinders and might service the exhaust ports of both cylinders, thus requiring only one turbine for the two cylinders. Similar arrangements might be possible for other geometries with the potential of one turbine providing the extra expansion ratio for all cylinders if the cylinders are disposed around the turbine to enable zero or near zero distance between the exhaust ports and the turbine. Any mix or match or even suboptimal arrangements might be contemplated where the turbine is very close to one or a couple of cylinders, but maybe farther away from the others.

REFERENCES

1. Tinker, "Occult Parasitic Energy Loss in Heat Engines", Frank A. Tinker, International Journal of Energy Research, 2007:31, 1441-1453.
2. U.S. Pat. No. 7,441,530 to Tinker.
3. US patent publication 2007/0227347, also to Tinker.
4. *Thermodynamics*, George A. Hawkins, John Wiley & Sons, New York, N.Y., 1946.
5. *Thermodynamics, Kinetic Theory, and Statistical Thermodynamics*, Francis W. Sears and Gerhard L. Salinger, Addison-Wesley, Reading, Mass., 1975.
6. *On the Efficiency of Heat Engines*, Frank A. Tinker, Da Vinci Research, LLC, PO 36683, Tucson, Ariz., 85740, (520) 219-5888, 2005. http://www.dvrhome.com/articles/Heat_Engine_Tinker.pdf
7. *A New Look at High Compression Engines*, C. F. Caris, E. E. Nelson, SAE Tech. Paper #590015.
8. *Diesel Common Rail and Advanced Fuel Injection Systems*, P. J. Dingle, M. D. Lai, SAE, 2005.
9. *Thermal Load and Surface Temp. Anal. Of a Small HSDI Diesel*, M. K. Inal, Proquest UMI, 2006.

The invention claimed is:

1. A thermal engine for more efficient production of power comprising:

a working medium in either a closed cycle or an open cycle with respect to its environment, and a series of thermocyclic phases further comprising;

a cyclic intake means for aspirating a quantity of said working medium, a cyclic compressing means for compressing said working medium, a cyclic means for reducing work of compression, with the reduction of said work of compression occurring exclusively during a single compression cycle or phase, a cyclic means for adding heat to said working medium to imbue said working medium with potential energy for the production of power, effect operation and maximize engine efficiency, said means for adding said heat being by internal combustion, external combustion or any hot heat source, and a cyclic expansion means for allowing said working medium to expand while developing mechanical energy, a cyclic means for temporarily storing energy from prior cycles of compression and/or expansion to help power said compression means for one or more subsequent cycles, a means for extracting power from said thermal engine, and a means for exhausting the spent working medium in open cycles or recovering the spent working medium in closed cycles.

2. The engine as set forth in claim 1 wherein said cyclic means for reducing work of compression further comprises a means for extracting heat during compression of said working medium.

3. The engine as set forth in claim 1 wherein said cyclic means for reducing work of compression further comprises configuring a compression ratio of said compression means smaller than an expansion ratio of said expansion means.

4. The engine as set forth in claim 1 wherein said cyclic means for reducing said work of compression further comprises holding a working medium valve open during up to about two thirds of a compression stroke, allowing up to about two thirds of said working medium to be expelled through said working medium valve, thereby reducing said work of compression by about two thirds, with further compression of said compression stroke compressing a remaining said working medium to support said cyclic means for adding heat and subsequent expansion and production of power.

5. The engine as set forth in claim 4 wherein said working medium valve is an intake working medium valve.

6. The engine as set forth in claim 4 wherein said working medium valve directs said expelled working medium to said cyclic means for temporarily storing energy.

7. The engine as set forth in claim 6 wherein said cyclic means for temporarily storing energy further comprises a pressurizable volume for receiving said expelled working medium under pressure and for releasing said pressurized working medium into an expansion volume of said cyclic expansion means during a latter portion of an expansion cycle.

8. The engine as set forth in claim 7 wherein said cyclic means for temporarily storing energy further comprises a heat transfer means for heating said expelled and pressurized working medium until released into an expansion volume during the latter portion of an expansion cycle, in order to obtain additional expansion during said latter portion of said expansion cycle, recuperating heat applied to the heat transfer means, and thereby increasing the power, torque and efficiency of the engine.

9. The engine as set forth in claim 8 wherein said heat transfer means further comprises connecting at least an exhaust from said cyclic expansion means to said heat transfer means, for heating said expelled and pressurized working medium, and recuperating heat from said exhaust.

10. The engine as set forth in claim 8 further comprising directing a heated said working medium to said cyclic expansion means to provide a boost of expansion near an end of said expansion cycle, thereby recovering work of compression of said expelled and pressurized working medium.

11. The engine as set forth in claim 1 wherein said cyclic means for adding heat adds only an amount of heat to provide less than a full expansion of said expansion means, with a remainder of heat to effect full expansion provided by said cyclic means for temporarily storing energy.

12. The engine of claim 1 further comprising a single constraining volume for said cyclic compression means and said cyclic expansion means, said volume at least as large as a maximum volume of said cyclic expansion means, and further comprising a volume modification means that sequentially instantiates each of said cyclic intake means, said cyclic compressing means, said cyclic means for reducing work of compression, said cyclic means for adding heat, said cyclic expansion means, said cyclic means for temporarily storing energy, said means for extracting power and said means for exhausting.

13. The engine of claim 12 further comprising a means to recycle heat from the exhausted working medium, or recycle heat from a separate additional adjunct heat source.

14. The engine of claim 12 wherein said constraining volume further comprises a single cylinder, with said volume modification means comprising a piston operating within said single cylinder, and configured so that a compression stroke of said piston within said single cylinder has a volume less than an expansion stroke of said piston within said single cylinder.

15. The engine of claim 14 further comprising configuring said volume modification means to expel up to about two thirds of at least said working medium from said cylinder prior to said compression stroke.

16. The engine of claim 1 further comprising a plurality of constraining volumes for said cyclic compression means and said cyclic expansion means, with a total volume of said plurality of constraining volumes being at least as large as a maximum volume of said cyclic expansion means, and further comprising a plurality of volume modification means that sequentially instantiate said cyclic intake means, said cyclic compressing means, said cyclic means for reducing work of compression, said cyclic means for adding heat, said cyclic expansion means, said cyclic means for temporarily storing energy, said means for extracting power and said means for exhausting so that said cyclic intake means, said cyclic compressing means, said cyclic means for reducing work of compression, said cyclic means for adding heat, said cyclic expansion means, said cyclic means for temporarily storing energy, said means for extracting power and said means for exhausting are distributed among said plurality of constraining volumes.

17. The engine of claim 16 further comprising a means to recycle heat from the exhausted working medium, or recycle heat from a separate additional adjunct heat source.

18. The engine of claim 16 wherein said plurality of constraining volumes further comprises a plurality of cylinders, with said plurality of associated volume modification means comprising a plurality of pistons, each operating within a respective one of said plurality of cylinders, said plurality of cylinders and respective said pistons configured to have a larger expansion stroke than a compression stroke.

19. The engine of claim 18 further comprising configuring said volume modification means to expel of up to about two thirds of at least said working medium from those said cylinders used for compression prior to said compression stroke.

* * * * *